(12) United States Patent
Haraguchi et al.

(10) Patent No.: US 12,448,513 B2
(45) Date of Patent: *Oct. 21, 2025

(54) COMPOSITION AND METHOD FOR THE PREPARATION OF SHEETS, FILMS, FIBERS, AND MOLDED PARTS

(71) Applicant: ÉCOLE POLYTECHNIQUE FÉDÉRALE DE LAUSANNE (EPFL), Lausanne (CH)

(72) Inventors: Shuichi Haraguchi, St-Sulpice Vd (CH); Holger Frauenrath, Epalinges (CH); Oguzhan Oguz, Dietlikon (CH); Daniel Görl, Denges (CH)

(73) Assignee: ÉCOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 805 days.

This patent is subject to a terminal disclaimer.

(21) Appl. No.: 17/611,015

(22) PCT Filed: May 14, 2020

(86) PCT No.: PCT/EP2020/063451
§ 371 (c)(1),
(2) Date: Nov. 12, 2021

(87) PCT Pub. No.: WO2020/229594
PCT Pub. Date: Nov. 19, 2020

(65) Prior Publication Data
US 2022/0289968 A1    Sep. 15, 2022

(30) Foreign Application Priority Data

May 15, 2019 (WO) ................ PCT/IB2019/000363

(51) Int. Cl.
*C08L 67/04* (2006.01)
*C08J 5/18* (2006.01)

(52) U.S. Cl.
CPC .......... *C08L 67/04* (2013.01); *C08J 5/18* (2013.01); *C08J 2367/04* (2013.01)

(58) Field of Classification Search
CPC ......... C08L 67/04; C08J 5/18; C08J 2367/04; Y02W 30/62; C08G 63/91; C08K 5/20
See application file for complete search history.

(56) References Cited

U.S. PATENT DOCUMENTS

| | | | |
|---|---|---|---|
| 5,977,203 A | 11/1999 | Makuuchi et al. | |
| 12,024,613 B2* | 7/2024 | Frauenrath | ............ C08K 5/20 |
| 2003/0196960 A1* | 10/2003 | Hughes | .............. B01D 39/2068 |
| | | | 210/681 |
| 2009/0318626 A1 | 12/2009 | Wisner et al. | |
| 2015/0307701 A1 | 10/2015 | Croisier et al. | |

(Continued)

FOREIGN PATENT DOCUMENTS

| | | |
|---|---|---|
| JP | H10287733 A | 10/1998 |
| JP | 200017037 A | 1/2000 |

(Continued)

OTHER PUBLICATIONS

Bonito (Bonito et al., Modulation of macrophage phenotype and protein secretion via heparin-IL-4 functionalized supramolecular elastomers, Acta Biomaterialia, vol. 71, 2018, pp. 247-260).*
Bonito (V. Bonito, et al., Modulation of macrophage phenotype and protein secretion via heparin-IL-4 functionalized supramolecular elastomers, Acta Biomaterialia 71 (2018) 247-260).*
Buwalda (S. Buwalda, et al., Stabilization of poly(ethylene glycol)-poly(e-caprolactone) star block copolymer micelles via aromatic groups for improved drug delivery properties, Journal of Colloid and Interface Science 514 (2018) 468-478).*
Bonito et al., "Modulation of macrophage phenotype and protein secretion via heparin-IL-4 functionalized supramolecular elastomers", Acta Biomaterialia, 2018, pp. 247-260, vol. 71.

(Continued)

*Primary Examiner* — Kumar R Bhushan
(74) *Attorney, Agent, or Firm* — The Webb Law Firm

(57) ABSTRACT

The invention describes a composition containing a) a functionalized polymer 10 that comprises at least one polyester segment 13 and at least one, in particular at least two, polymer aggregating segment 11, 12 capable of forming non-covalent bonds based on a supramolecular interaction, b) an aggregating additive 20 that comprises at least one additive aggregating segment 21 capable of forming non-covalent bonds based on the same supramolecular interaction as the polymer aggregating segments 11, 12, wherein the polymer aggregating segments 11, 12 and the additive aggregating segment 21 are ditopic, wherein the polymer aggregating segments 11, 12 and the additive aggregating segment 21 are designed such that they can form aggregates 31 that contain polymer aggregating segments 11, 12 and additive aggregating segments 21, and wherein the polyester segment (13) has a number average molecular weight of from 10'000 g/mol to 500'000 g/mol. The invention also describes a functionalized polymer 10 that comprises at least one polyester segment 13 and at least two polymer aggregating segments 11, 12 capable of forming non-covalent bonds based on a supramolecular interaction, wherein the polymer aggregating segments 11, 12 are ditopic and designed such that they can form aggregates and wherein the polyester segment 13 has a number average molecular weight of from 10'000 g/mol to 500'000 g/mol. The invention also describes a method for the preparation of sheets, films, fibers, or molded parts from the composition or the functionalized polymer 10 according to the invention, sheets, films, fibers, or molded parts comprising a composition or a functionalized polymer 10 according to the invention, and the use of the composition according to the invention for the preparation of sheets, films, fibers, or molded parts.

24 Claims, 4 Drawing Sheets

(56) References Cited

U.S. PATENT DOCUMENTS

| | | | |
|---|---|---|---|
| 2017/0313813 A1 | 11/2017 | Wolf et al. | |
| 2018/0015202 A1 | 1/2018 | Dankers et al. | |
| 2020/0299484 A1* | 9/2020 | Frauenrath | C08K 5/20 |

FOREIGN PATENT DOCUMENTS

| | | | |
|---|---|---|---|
| JP | 2002060601 A | 2/2002 | |
| JP | 2004269378 A | 9/2004 | |
| JP | 2017532427 A | 11/2017 | |
| WO | 2006101076 A1 | 9/2006 | |
| WO | 2014080043 A1 | 5/2014 | |
| WO | 2019096365 A1 | 5/2019 | |
| WO | 2019096870 A1 | 5/2019 | |

OTHER PUBLICATIONS

Buwalda et al., "Stabilization of poly(ethylene glycol)-poly(ε-caprolactone) star block copolymer micelles via aromatic groups for improved drug delivery properties", Journal of Colloid and Interface Science, 2018, pp. 468-478, vol. 514.

Cordier et al., "Self-healing and thermoreversible rubber from supramolecular assembly", Nature, 2008, pp. 977-980, vol. 451.

Cox et al., "Synthesis and in vitro enzyme activity of peptide derivatives of bacterial cell wall biosynthesis inhibitors", J. Chem. Soc., Perkin Trans., 2000, pp. 2023-2036, vol. 1.

Dankers et al., "Chemical and biological properties of supramolecular polymer systems based on oligocaprolactones", Biomaterials, 2006, pp. 5490-5501, vol. 27.

Fetters et al., "Chain Dimensions and Entanglement Spacings", James E. Mark: Physical Properties of Polymers Handbook 2nd edition, Chapter 25, 2006, pp. 445-452.

Guo et al., "Thieno[3,4-c]pyrrole-4,6-dione-Based Polymer Semiconductors: Toward High-Performance, Air-Stable Organic Thin-Film Transistors", J. Am. Chem. Soc., 2011, pp. 13685-13697, vol. 133.

Hirano et al., "Study on the Retention of Strength in Material from Recycled PET Bottles", Journal of the Japan Society of Material Cycles and Waste Management, 2010, pp. 165-169, vol. 21:5.

Moore et al., "Room Temperature Polyesterification", Macromolecules, 1990, pp. 65-70, vol. 23.

"The New Plastic Economy: Rethinking the future of plastics", World Economic Forum, 2016, pp. 1-36.

Ritchie, "The conflicts between strength and toughness", Nature Materials, Nov. 2011, pp. 817-822, vol. 10.

Van Beek et al., "Unidirectional Dimerization and Stacking of Ureidopyrimidinone End Groups in Polycaprolactone Supramolecular Polymers", Macromolecules, 2007, pp. 8464-8475, vol. 40.

Wisse et al., "Unusual Tuning of Mechanical Properties of Thermoplastic Elastomers Using Supramolecular Fillers", Macromolecules, 2006, pp. 7425-7432, vol. 39.

* cited by examiner

COMPOSITION AND METHOD FOR THE PREPARATION OF SHEETS, FILMS, FIBERS, AND MOLDED PARTS

CROSS-REFERENCE TO RELATED APPLICATIONS

This application is the United States national phase of International Application No. PCT/EP2020/063451 filed May 14, 2020, and claims priority to International Patent Application No. PCT/IB2019/000363 filed May 15, 2019, the disclosures of which are hereby incorporated by reference in their entirety.

BACKGROUND OF THE INVENTION

1. Field of the Invention

The present invention relates to a polymer and to a polymer composition having improved processability, formability and/or mechanical properties, as well as the processed parts thereof. Specifically, the present invention relates to a functionalized polymer that comprises at least one polyester segment and at least two polymer aggregating segments capable of forming non-covalent bonds based on a supramolecular interaction, a composition comprising a functionalized polymer that comprises at least one polyester segment and at least one, in particular at least two, polymer aggregating segments capable of forming non-covalent bonds based on a supramolecular interaction and an aggregating additive comprising at least one additive aggregating segment capable of forming non-covalent bonds based on the same supramolecular interaction as the polymer aggregating segment, as well as a non-modified polyester as an optional component. As a result of the aggregating segments of the functionalized polymer and the aggregating additive, melt processing, formability, and/or mechanical properties are improved.

2. Discussion of Related Art

The depletion of natural resources and environmental pollution are among the largest problems humanity is facing today. Plastics that are neither biodegradable nor recyclable are a particularly severe problem as they lead to persistent waste that often pollutes the environment. Therefore, the creation of a socioeconomic system that is based on reuse, recycling, and reprocessing of materials and goods is required, taking into consideration the global impact on the environment. For plastics, in particular packaging materials, a global protocol has been set in a concerted global action across industries and business sectors in order to set a direction towards the creation of an effective after-use plastics economy for capturing more materials value and increased resource productivity, which aims to greatly reduce the leakage of plastics into natural systems [Non-Patent Document 1].

One example of a successfully implemented plastics recycling stream is the simple cost-efficient recycling of PET bottles, which are collected separately from other waste streams, crushed, and cleaned. The resulting flakes are then melted and molded to produce recycled products. However, it is known that the molecular weight of the PET resin is reduced by thermal decomposition during melting, so that the strength and the formability of the resulting PET material is reduced with every product cycle and recycled products are only used in lower-value applications. Around 80% of recycled PET is used for polyester fibres for carpeting, clothing and other non-packaging applications [Non-Patent Document 1]. Thus, current plastics suffer from a degradation of the mechanical properties upon melting during recycling, which limits the possibilities to recycle current plastics materials.

One possible approach to improve the recyclability of thermally sensitive materials such as PET would be to increase the molecular weight such that the PET can be recycled more often because after the initial thermal decompositions, the molecular weight would still be large enough to use the recycled PET in higher-value applications. However, by increasing the molecular weight, also the processability of the PET is diminished significantly.

For this reason, different methods have been developed to avoid the reduction in strength and formability.

For example, Non-Patent Document 2 presents an investigation to add a virgin PET resin to a recycled PET resin. However, the problem remains that the mechanical performance of the blend des not reach the level of the virgin resin unless the latter makes up 50% or more of the composition.

Patent Document 3 reports a method using a chain extender but, depending on the conditions of use, a locally dense crosslinked body is formed, resulting in a non-remeltable gel.

On the other hand, polyester resins may also be based on biodegradable polyesters such as PLA, PBS and PBAT. These biodegradable materials are an important element for the large-scale recycling of plastics, as they allow for alternative recycling systems such as composting and generation of methane gas by the anaerobic fermentation by microorganisms. However, since biodegradable polyesters are generally inferior to PET in formability and mechanical properties, their commercialization has not significantly advanced in recent years.

For example, biodegradable polyesters generally have a low melt tension, which makes it difficult to perform stretching, foaming, and fiber drawing. Moreover, some polyesters, such as for example poly(lactic acid) or poly(butylene succinate), have insufficient mechanical properties such as impact strength and tear strength of molded articles for their target applications, and some polyesters, such as for example poly(lactic acid), have insufficient heat resistance.

For this reason, different approaches for improving strength and formability have been pursued in biodegradable polyester resins. For example, patent document 4, describes a method of adding an acrylic resin modifier to aliphatic polyester as a means to improve melt viscosity and melt tension. However, since the added acrylic resin is typically not biodegradable, the composition loses the advantage of biodegradability, as well.

Patent Literatures 5 and 6 have proposed a method of melt-kneading a biodegradable resin and a polyisocyanate to introduce a crosslinked structure and a method of introducing a crosslinked structure by radiation. However, depending on the conditions of use, a locally dense crosslinked body is formed, which results in a gel that cannot be remelted, which also impedes recycling.

Furthermore, the modification of polyesters with functional groups capable to undergo non-covalent bonding is known to have profound impact on the thermomechanical properties. For example, Non-Patent Document 7, describes PCL segments with a functional polymer end group that can dimerize via its non-covalent bonding ability, which leads to an increase in the virtual molecular weight. However, the polyester segment used in this report was low in molecular weight ($M_n$=2'000 g/mol), and the obtained polyester did not exhibit sufficient mechanical properties for practical use. Moreover, a PCL based alternating block-copolymer comprising a block based on two urea functions that can form ribbon-like structures by non-covalent bonding was reported in Non-Patent Document 8. In the molten PCL state, the addition of an additive based on the same functional group was found to enhance the formation of the supramolecular ribbons, thus resulting in a stiffer material with a Young's modulus doubled at 7 wt % content of the filler. However, the polyester segment used in this report was low in molecular weight ($M_n$=1'250 g/mol).

It is noted, that it is a requirement for almost all engineering structural materials that they are, at the same time, stiff (for shape persistence), strong, and tough (for damage tolerance). Although polymers are commonly perceived to be ductile materials, they nevertheless often show macroscopically brittle behavior at stresses below the yield stress if no mechanisms are available to relax the local stress concentrations. It follows that ductility and hence toughness may be lost if the yield stress is high, or if the material is very stiff, so that the elastic energy available to drive crack propagation is high, even at low strains. Therefore, the challenge remains to develop thermoplastic materials that provide high strength and stiffness while maintaining a high degree of ductility and toughness, properties that at first sight appear to be mutually exclusive [Non-Patent Document 9].

REFERENCES

Non-Patent Document 1: World Economic Forum, Ellen MacArthur Foundation & McKinsey Company, *The New Plastics Economy—Rethinking the Future of Plastics* (2016)
Non-Patent Document 2; *Journal of the Japan Society of Material Cycles and Waste Management*, 2010, 21, 165.
Patent Document 3; JP2017532427A
Patent Document 4; WO2006101076A1
Patent Document 5; JP2000-17037A
Patent Document 6; JPH10287733A
Non-Patent Document 7; *Macromolecules* 2007, 40, 8464.
Non-Patent Document 8; *Macromolecules* 2006, 39, 7425.
Non-Patent Document 9: *Nat. Mater.* 2011, 10, 817.

SUMMARY OF THE INVENTION

It is an object of the present invention to provide polymer materials, in particular polyester materials with good mechanical properties and good processability. Preferably the materials are biodegradable to at least 50 wt. %. Preferably, the materials have a good formability. A particular object of the present invention is to provide a polymer material, in particular a polyester material, that shows improved formability, processability, and/or improved room temperature mechanical properties, in particular stiffness, strength and toughness.

By using the present invention, some or all of the drawbacks of the prior art can be overcome. In particular, some or all of the difficulties and drawbacks of the prior art can be overcome by the composition(s) described herein functionalized polymer described herein, the method described herein the sheet, film, fiber, or molded part described herein. In particular, by using the present invention, plastics with an improved processability, improved formability and/or improved mechanical properties, in particular at room temperature, can be achieved.

DETAILED DESCRIPTION OF THE INVENTION

Figure 1:
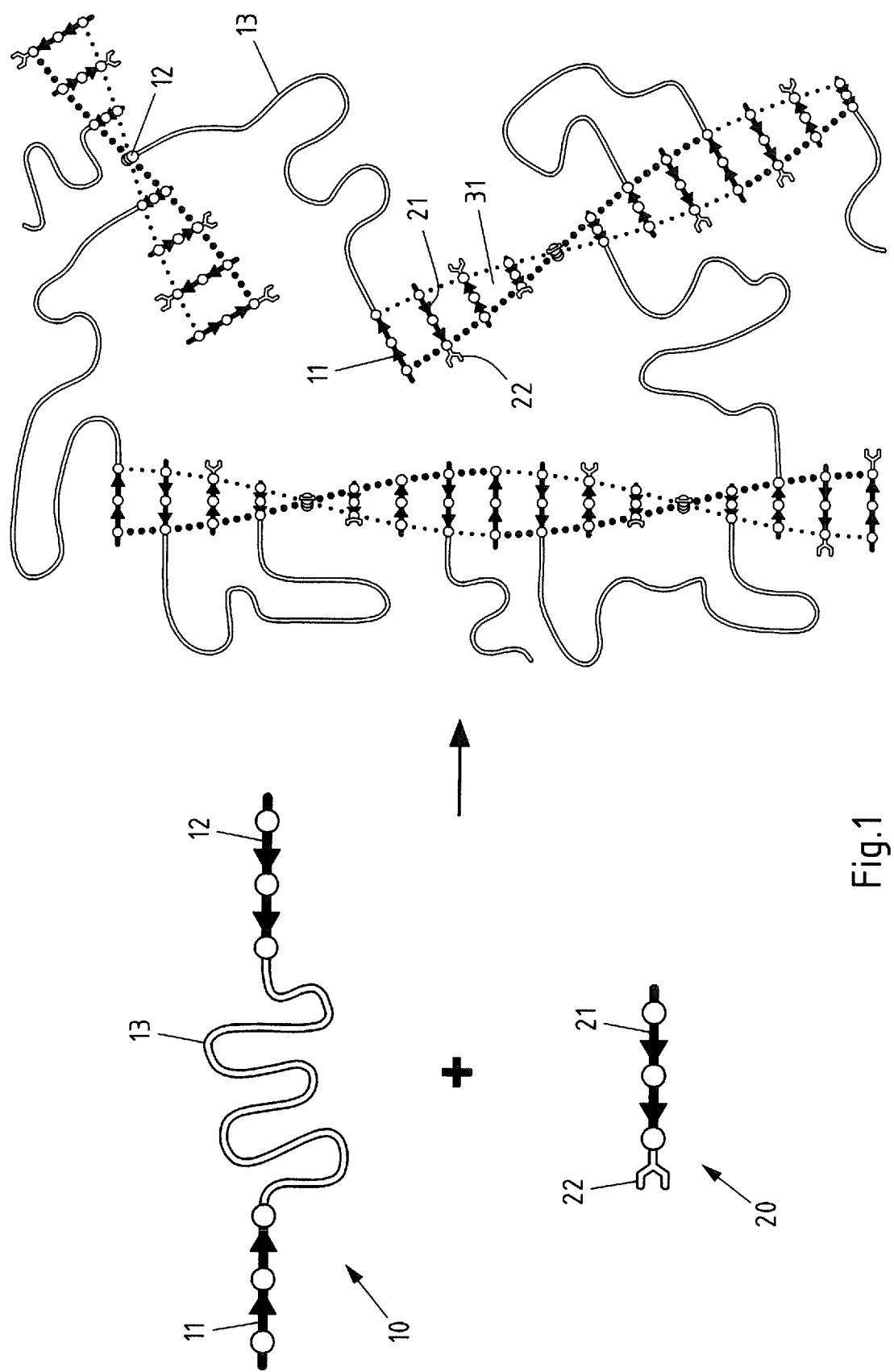
FIG. 1 shows a schematic and exemplary overview of how the composition according to the invention can be obtained.

The present invention provides a composition containing
a. a functionalized polymer 10 that comprises at least one polyester segment 13 and at least one, in particular at least two, polymer aggregating segment 11, 12 capable of forming non-covalent bonds based on a supramolecular interaction,
b. an aggregating additive 20 that comprises at least one additive aggregating segment 21 capable of forming non-covalent bonds based on the same supramolecular interaction as the polymer aggregating segments 11, 12,
wherein the polymer aggregating segment 11, 12 and the additive aggregating segment 21 are ditopic,
wherein the polymer aggregating segment 11, 12 and the additive aggregating segment 21 are designed such that they can form aggregates 31 that contain polymer aggregating segments 11, 12 and additive aggregating segments 21, and wherein the polyester segment 13 has a number average molecular weight of from 10'000 g/mol to 500'000 g/mol.

A ditopic segment contains at least two interaction sites from which non-covalent bonds can be formed, wherein the segment contains at least one unsaturated interaction site when the segment has already formed an aggregate with another segment. Preferably, a ditopic segment is a segment that contains two bonding regions each comprising at least one interaction site capable of forming non-covalent bonds, wherein the bonding regions are arranged such that the at least one interaction site of one of the bonding regions remains unsaturated when the segment has already formed an aggregate with another segment via the other bonding region. Preferably, the at least two interactions sites of a ditopic segment are distributed over the two bonding regions. Ditopic segments can particularly aggregate with two other segments. The non-covalent bonds formed in one of the bonding regions of the segment can be based on the same or on a different supramolecular interaction as the non-covalent bonds formed in the other bonding region. Preferably, non-covalent bonds formed in one of the bonding regions of the ditopic segment are based on the same supramolecular interaction as the non-covalent bonds formed in the other bonding region. Thus, according to an embodiment of the invention, the polymer aggregating segments 11, 12 and the additive aggregating segment 21 are ditopic, wherein the non-covalent bonds formed in one of the bonding regions of the ditopic segment are based on the same supramolecular interaction as the non-covalent bonds formed in the other bonding region. More preferably, the angle between the non-covalent bonds formed from two interaction sites of a ditopic segment is from 90° to 180°, more preferably from 170° to 180°. This helps in forming aggregates 31 that extend in at least one direction. The non-covalent bonds formed from the interaction sites can be preferably based on the same or on a different supramolecular interaction, preferably they are based on the same supramolecular interaction. An example for a ditopic segment is an oligopeptide, such as dialanine, or a multifunctional cyclic moiety containing one or more —C(=O)—NH— groups such as benzene tricarboxamide. In an oligopeptide and in a multifunctional cyclic moiety containing one or more —C(=O)—NH— groups, the —C(=O)— and —NH— groups are distributed over the two bonding regions of the oligopeptide or of the multifunctional cyclic moiety, which allows for aggregation via these two bonding regions independently of one another.

Without wishing to be bound by scientific theory, it is believed that the polymer aggregating segments 11, 12 of the functionalized polymer 10 and the additive aggregating segment 21 of the aggregating additive 20 form aggregates via non-covalent bonds based on the same supramolecular interaction shared by the polymer aggregating segments 11, 12 and the additive aggregating segment 21. The aggregates are believed to be extended in at least one and at most two directions, to be of nanoscopic size in at most two and at least one direction, and to be well-dispersed in the composition. In this way, it is believed that these aggregates serve as physical cross-links in the composition. Without wishing to be bound by scientific theory, it is believed that, for a functionalized polymer 10 that comprises at least two polymer aggregating segments 11, 12, these physical crosslinks form a network, which improves the mechanical properties and helps to increase the softening temperatures of these compositions.

It is believed that the aggregating additives 20 serve the primary purpose to establish certain minimum concentrations of aggregating segments, particularly in case of the higher molecular weight polymers, so that nanostructure formation based on their self-complementary interactions is reinforced. It is further believed that, because the polyester segment 13 has a molecular weight of from 10'000 to 500'000 g/mol, the polymer chains are entangled. This is believed to significantly increase the mechanical properties.

As a result of the present invention, the processability of the composition and of the functionalized polymer can be improved. At the same time, the formability may be improved, thus resulting in materials that can be processed with a wide range of processing methods, in particular processing methods for thermoplastic resins, and formed using different forming methods, such as blow molding, foaming, thermoforming, injection molding, fiber spinning, sheet pressing or film cast. Moreover, the resulting formed objects such as films, sheets, fibers, or molded parts, may have improved mechanical properties in particular at room temperature. In this respect, it is possible to achieve materials and/or formed objects that, at the same time, have improved yield strength and improved toughness.

With the present invention, it is possible to adjust the total concentration of the combined segments capable of non-covalent bonding of the functionalized polymer 10 and the aggregating additive 20 in the composition independently of the molecular weight of the functionalized polymer 10. As a result, the softening temperature of the resulting material can be chosen irrespective of the nature and the molecular weight of the functionalized polymer 10 and independently of its mechanical properties. Moreover, the nanoscopic size of the aggregates formed by co-assembly of the polymer aggregating segments 11, 12 and the additive aggregating segment 21, and their good dispersion in the composition are believed to ensure that the mechanical and thermal stability of the aggregates is significantly higher than that of physical cross-links in classical thermoplastic resins, at equal or even significantly lower weight fractions.

The present invention provides a composition containing
a. a functionalized polymer 10 that comprises at least one polyester segment 13 and at least one, in particular at least two, polymer aggregating segment 11, 12 capable of forming non-covalent bonds based on a supramolecular interaction,
b. an aggregating additive 20 that comprises at least one additive aggregating segment 21 capable of forming non-covalent bonds based on the same supramolecular interaction as the polymer aggregating segment 11, 12,
wherein the polymer aggregating segment 11, 12 and the additive aggregating segment 21 are ditopic,
wherein the polymer aggregating segment 11, 12 and the additive aggregating segment 21 are designed such that they can form aggregates 31 that contain polymer aggregating segments 11, 12 and additive aggregating segments 21, and wherein the polyester segment 13 has a number average molecular weight of from 10'000 g/mol to 500'000 g/mol.

According to another embodiment of the invention, the aggregating additive 20 is monodisperse.

Preferably, for a monodisperse compound, all molecules in a sample of the compound are uniform. For example, all molecules have the same molecular weight with the exception of molecular weight differences caused by the incorporation of different isotopes. For example, ethane is a monodisperse compound, whereas polystyrene is not. Preferably, for a monodisperse residue in a compound, this residue is uniform in all molecules of a sample of a compound. For example, in the amine $(C_2H_5)$—NH-polystyrene, the ethyl residue is monodisperse, whereas the polystyrene residue is not.

According to another preferred embodiment, the invention provides for a composition containing
a. a functionalized polymer 10 that comprises at least one polyester segment 13 and at least two polymer aggregating segments 11, 12 capable of forming non-covalent bonds based on a supramolecular interaction,
b. an aggregating additive 20 that comprises at least one additive aggregating segment 21 capable of forming non-covalent bonds based on the same supramolecular interaction as the polymer aggregating segments 11, 12,
wherein the polymer aggregating segments 11, 12 and the additive aggregating segment 21 are ditopic,
wherein the polymer aggregating segments 11, 12 and the additive aggregating segment 21 are designed such that they can form aggregates 31 that contain polymer aggregating segments 11, 12 and additive aggregating segments 21, and
wherein the polyester segment 13 has a number average molecular weight of from 10'000 g/mol to 500'000 g/mol and the aggregating additive 20 is monodisperse.

According to an embodiment of the invention, the composition contains a further polyester. The further polyester is preferably non-functionalized. If the composition contains a further polyester, this polyester is preferably of the same type as the polyester segment 13 of the functionalized polymer 10. The optional further polyester is also described in more detail below. For example, if the polyester segment 13 of the functionalized polymer 10 is poly(epsilon-caprolactone), the further polymer is preferably poly(epsilon-caprolactone).

Structure of the Functionalized Polymer 10

The functionalized polymer 10 can have different architectures. For example, it may be a linear polymer, a branched polymer or a multiarm star polymer. Preferably, the functionalized polymer 10 is a functionalized polyester. Preferably, the functionalized polymer is a linear or a branched polymer, in particular a linear or branched polyester. Preferably, the functionalized polymer 10 comprises two polymer aggregating segments 11, 12, in particular as terminal groups. The functionalized polymer 10 may comprise the at least one, in particular the at least two, polymer aggregating segments 11, 12 along the backbone of the functionalized polymer 10, as terminal group(s), or as side group(s). Preferably, the functionalized polymer 10 comprises the at least one, in particular the at least two polymer aggregating segments 11, 12 as terminal group(s). According to an embodiment of the invention, the functionalized polymer 10 is a linear or branched polymer and/or comprises two polymer aggregating segments 11, 12, in particular as terminal groups. For branched polymers, the terminal groups are preferably located at the termini of the main chain of the polymer. The main chain of a polymer is in particular the longest chain of the polymer. According to another embodiment of the invention, the functionalized polymer 10 is a linear or branched difunctional polyester comprising two polymer aggregating segments 11, 12, wherein the two polymer aggregating segments 11, 12 are terminal groups of the functionalized polymer 10. For example, the functionalized polymer 10 may have the structure X-Q-X, wherein X represents the polymer aggregating segments 11, 12 and Q represents the polyester segment 13. Q may be a linear or a branched polyester segment 13. Linear or branched difunctional polyesters comprising two polymer aggregating segments 11, 12 as terminal groups, in particular with a structure X-Q-X, wherein X represents the polymer aggregating segments 11, 12 and Q represents the polyester segment are synthetically most straightforward to access.

According to another embodiment of the invention, the functionalized polymer 10 comprises the at least one, in particular at least two, polymer aggregating segments 11, 12 as side groups, in particular as side groups along the polyester segment 13 of the functionalized polymer 10. In this case, the functionalized polymer 10 may comprise more than 2 polymer aggregating segments 11, 12, in particular 3 to 100 segments capable of forming non-covalent bonds. A polymer with this architecture may be called a side-functional polymer. For example, the functionalized polymer 10 can be a side-functional polymer with the structure $U'_x$-ran-$(U''(-X))_y$, that is, a random copolymer of repeating units U' and repeating units U" carrying the segment X capable of forming covalent bonds.

According to an embodiment of the invention, the functionalized polymer 10 is a linear or branched or a multiarm star copolymer as defined above and the composition further contains a side-functional polymer as defined above. In this way, the concentration of polymer aggregating segments 11, 12 can be increased locally in a simple way.

According to an embodiment of the invention, the functionalized polymer 10 contains 5 or less, 4 or less, 3 or less, 2 or less, or exactly 1 polyester segment(s) 13.

The mechanical properties of the materials obtained from the composition or the functionalized polymer according to the invention are strongly dependent on the molecular weight of the functionalized polymer 10. Since, as a consequence of the chosen approach, the softening temperature of the material no longer depends on the molecular weight of the polyester matrix, the molecular weight of the functionalized polymer 10 can be chosen from a broad range of molecular weights, for instance a number average molecular weight $M_n$=10'000 g/mol to 1'000'000 g/mol. Thus, according to an embodiment of the invention, the functionalized polymer 10 has a number average molecular weight of from 10'000 g/mol to 1'000'000 g/mol, in particular of from 20'000 g/mol to 500'000 g/mol or from 55'000 g/mol to 99'000 g/mol.

In the functionalized polymer 10, the main part of the molecular weight is preferably contributed by the polyester segment 13. The at least one, in particular at least two, polymer aggregating segments 11, 12 are preferably designed such that they make a small contribution to the molecular weight of the functionalized polymer 10. Thus, according to an embodiment of the invention, the polyester segment 13 has a number average molecular weight of from 20'000 to 500'000 g/mol, in particular from 30'000 to 300'000 g/mol or from 40'000 to 200'000 g/mol or from 50'000 to 100'000 g/mol or from 55'000 to 95'000 g/mol. The number average molecular weight may be represented by $M_n$. With the aforementioned molecular weights, good processability and/or good mechanical properties, in particular at room temperature can be achieved. It was found that in particular for molecular weights from 55'000 to 95'000 g/mol, materials and formed objects from the composition or the functionalized polymer had good mechanical properties, in particular at room temperature. On the other hand, the composition of the functionalized polymer could be processed well. Preferably however, the lower limit of the molecular weight of the polyester segment 13 is above the entanglement molecular weight of the respective polymer in order to account for good elastic behavior of the material; more preferably, the lower limit of the molecular weight of the polyester segment 13 is at least five times the entanglement molecular weight of the respective polyester, so that an entanglement network can be formed.

The entanglement molecular weights differ from polymer type to polymer type, but are typically on the order of Me=2000 g/mol to 19000 g/mol (in each case number average molecular weights). Examples of entanglement molecular weights can be found in L. J. Fetters, D. J. Lohse, R. H. Colby, *Chain Dimensions and Entanglement Spacings*, in *Physical Properties of Polymers Handbook*, $2^{nd}$ edition, J. E. Mark, ed., Ch. 25, 2007; Polymer Handbook, 4th edition, J. Brandrup, E. H. Immergut, E. A. Grulke, eds, Wiley, 2003.

Even more preferably, the lower limit of the molecular weight of the polyester segment 13 exceeds the molecular weight threshold where the changes in mechanical properties with increasing molecular weight start to level off, so above a number average molecular weight $M_n$=20000 g/mol to 30000 g/mol. At the same time, in order to not reduce the concentration of the polymer aggregating segments 11, 12 more than necessary (which would require the addition of more aggregating additive 20), the preferred molecular weight of polyester segment 13 should not be chosen too far above the molecular weight threshold where the changes in mechanical properties with increasing molecular weight start to level off, because further molecular weight increases typically do not result in changed properties. If the molecular weight of the polyester segment 13 is too high, the resulting composition or the functionalized polymer 10 may be difficult to process. Hence, a particularly preferred number average molecular weight for the polyester segment 13 are 55'000 to 95'000 g/mol, and even more preferred are 60'000 g/mol to 95'000 g/mol, and especially preferred 70'000 to 90'000 g/mol.

Various kinds of polyesters are suitable as polyester segment 13.

According to an embodiment of the invention, the polyester segment 13 is an aromatic-aliphatic copolyester, an aliphatic copolyester, an aliphatic polyester, a polylactone, or a polyhydroxyalkanoate. Preferably, the polyester segment 13 is selected from the group consisting of poly(ethylene terephthalate) (PET), poly(butylene terephthalate) (PBT), poly(ethylene furanoate) (PEF), poly(butylene furanoate) (PBF), poly(trimethylene terephthalate) (PTT), poly(ethylene naphthalate) (PEN), poly(butylene adipate terephthalate) (PBAT), poly(butylene-sebacate-co-butylene terephthalate) (PBSeT), poly(butylene succinate) (PBS), poly(ethylene succinate) (PES), poly(butylene succinate adipate) (PBSA), poly(butylene succinate-co-butylene terephthalate) (PBST), poly(lactic acid) (PLA), poly(L-lactic acid) (PLLA), poly(D-lactic acid) (PDLA), poly(DL/-lactic acid) (PDLLA), poly(glycolic acid) (PGA), poly(caprolactone) (PCL), poly(hydroxybutyrate) (P3HB), poly(hydroxybutyrate-co-hydroxyhexanoate) (PHBH), poly(3-hydroxybutyrate-co-3-hydroxyvalerate) (PHBV), and copolymers thereof.

Moreover, the kind of polymer used for the polyester segment 13 also depends on the purpose the resulting material should serve. Thus according to an embodiment of the invention, the polyester segment 13 is an aromatic-aliphatic copolyester or an aliphatic polyester. According to this embodiment, the polyester segment 13 is preferably selected from the group consisting of poly(ethylene terephthalate) (PET), poly(butylene terephthalate) (PBT), poly(ethylene furanoate) (PEF), poly(butylene furanoate) (PBF), poly(trimethylene terephthalate) (PTT), poly(ethylene naphthalate) (PEN), and copolymers thereof.

According to another embodiment of the invention, the polyester segment 13 is an aromatic-aliphatic copolyester or an aliphatic polyester that is biodegradable according to DIN EN 13432, in particular DIN EN 13432:2000, such as poly(butylene adipate terephthalate) (PBAT), poly(butylene succinate) (PBS), or poly(butylene-sebacate-co-butylene terephthalate) (PBSeT) or copolymers thereof.

According to another embodiment of the invention, the polyester segment 13 is an aliphatic polyester. According to this embodiment, the polyester segment 13 is preferably selected from the group consisting of poly(lactic acid) (PLA), poly(L-lactic acid) (PLLA), poly(D-lactic acid) (PDLA), poly(DL-lactic acid) (PDLLA), poly(glycolic acid) (PGA), poly(caprolactone) (PCL), poly(hydroxybutyrate) (P3HB), poly(hydroxybutyrate-co-hydroxyhexanoate) (PHBH), poly(3-hydroxybutyrate-co-3-hydroxyvalerate) (PHBV), poly(butylene succinate) (PBS), poly(butylene succinate adipate) (PBSA), poly(ethylene succinate) (PES), and copolymers thereof.

According to a preferred embodiment, the polyester segment 13 is a poly(caprolactone), more preferably poly(epsilon-caprolactone).

According to a preferred embodiment, the polyester segment 13 is poly(ethylene terephthalate) (PET).

According to a preferred embodiment, the polyester segment 13 is poly(butylene terephthalate) (PBT).

According to a preferred embodiment, the polyester segment 13 is poly(ethylene furanoate) (PEF).

According to a preferred embodiment, the polyester segment 13 is poly(butylene furanoate) (PBF).

According to a preferred embodiment, the polyester segment 13 is a poly(lactic acid) (PLA).

According to a preferred embodiment, the polyester segment 13 is poly(butylene succinate) (PBS).

According to a preferred embodiment, the polyester segment 13 is poly(hydroxybutyrate-co-hydroxyhexanoate) (PHBH).

According to a preferred embodiment, the polyester segment 13 is selected from the group consisting of poly(epsilon-caprolactone), poly(ethylene terephthalate) (PET), poly(butylene terephthalate) (PBT), poly(ethylene furanoate) (PEF), poly(butylene furanoate) (PBF), poly(lactic acid) (PLA), poly(butylene succinate) (PBS), and poly(hydroxybutyrate-co-hydroxyhexanoate) (PHBH).

By selecting the polyester segment 13, the composition and/or the functionalized polymer 10 can be tailored to the requirements of the specific application.

Structure of the Additives

The aggregating additive 20 contains at least one additive aggregating segment 21 capable of forming non-covalent bonds based on the same supramolecular interaction as the polymer aggregating segments 11, 12. The aggregating additive 20 may contain more than one additive aggregating segment 21 capable of forming non-covalent bonds, for example two, three, four, or five additive aggregating segments 21. If the aggregating additive 20 contains more than one additive aggregating segment 21, these additive aggregating segments 21 may be different from each other or identical, preferably they are identical. According to an embodiment of the invention, the aggregating additive 20 contains multiple additive aggregating segments 21 attached as side groups to a polyester segment. According to another embodiment of the invention, the aggregating additive 20 contains 2 to 5, in particular 2 to 4, additive aggregating segments 21. According to a preferred embodiment of the invention, the aggregating additive 20 contains exactly one additive aggregating segment 21. Aggregating additives 20 containing exactly one additive aggregating segment 21 are easily accessible. Moreover, they can be more easily dispersed in the composition according to the invention.

In addition to the at least one additive aggregating segment 21, the aggregating additive 20 may comprise one or more additional groups 22. These additional groups 22 may serve various purposes, for example, to increase the solubility of the aggregating additive 20 in the composition, but they may also serve other purposes, for example imparting another functionality such as flame retardancy. Preferably, the additional groups 22 do not interfere with the capability of the additive aggregating segment 21 of the aggregating additive 20 to form aggregates with the polymer aggregating segments 11, 12 and/or with other additive aggregating segments 21 of other aggregating additives 20. More preferably, the additional groups 22 serve to increase the solubility of the aggregating additive 20 in the composition. According to an embodiment of the invention, the aggregating additive 20 comprises at least one, in particular 1 to 3, additional group(s) 22, in particular as terminal groups. According to another embodiment of the invention, the aggregating additive 20 comprises two additional groups 22. If the aggregating additive 20 comprises more than one additional group, these groups may be different from each other or identical, preferably they are different from each other.

Additional groups 22 in the aggregating additive 20 may be incorporated into the aggregating additive 20 in different ways. For example, they may be incorporated as terminal groups, as side groups or as groups within the backbone of the aggregating additive 20. The aggregating additive 20 may also have a linear structure or may have a structure based on a multifunctional cyclic or polycyclic and/or branched moiety.

According to an embodiment of the invention, the aggregating additive 20 comprises at least one, in particular 2 to 6, additional groups 22, in particular as terminal groups. The additional groups 22, in particular the terminal groups 22, of the aggregating additive 20 may be different from each other or identical. An aggregating additive 20 with a linear structure advantageously comprises two additional groups 22, in particular two terminal groups 22, wherein the additional groups 22, in particular the terminal groups 22, are preferably different from each other. An aggregating additive with a structure based on a multifunctional cyclic or polycyclic and/or branched moiety advantageously comprises 3 to 6 additional groups 22, in particular 3 to 6 terminal groups 22, wherein the additional groups 22, in particular the terminal groups 22, are preferably identical.

In principle, various chemical groups can be used as additional groups 22 of the aggregating additive 20. Advantageously, the additional groups 22 of the aggregating additive 20 do not interfere or hinder the aggregation of the additive aggregating segment 21 with other additive aggregating segments 21 of other aggregating additives 20 or with polymer aggregating segments 11, 12. The additional groups 22 may be monodisperse or polydisperse. Preferably, the at least one additional group 22 is monodisperse and/or has a molecular weight of less than 500 g/mol, in particular less than 400 g/mol or less than 300 g/mol or less than 200 g/mol or less than 100 g/mol. Monodisperse additional groups 22 particularly allow to achieve higher softening temperatures of the composition.

Good results were obtained when the additional groups 22, in particular the terminal groups 22, of the aggregating additive 20 are branched hydrocarbon groups with 1 to 30 carbon atoms. According to an embodiment of the invention, the additional groups 22, in particular the terminal groups 22, are selected from the group consisting of a hydrocarbon group with 1 to 30 carbon atoms, a $C_1$ to $C_{30}$ alkyl group, in particular methyl group, ethyl group, propyl group, butyl group, pentyl group, hexyl group, heptyl group, octyl group, nonyl group, decyl group, undecyl group, dodecyl group, a $C_4$ to $C_{20}$ aromatic moiety, in particular phenyl group, diisopropylphenyl group, di-tert.-butylphenyl group, benzyl group, diisopropylbenzyl group, di-tert.-butylbenzyl group, a branched hydrocarbon group with 1 to 26 carbon atoms, in particular 2-ethylhexyl group, 2-butyloctyl group, 2-hexyldecyl group, 2-octyldodecyl group, 2-decyltetradecyl group, 2-hexyloctanyl group, 2-octyldecyl group, 1-methylethyl group, 1-ethylpropyl group, 1-propylbutyl group, 1-butylpentyl group, 1-pentylhexyl group, 1-hexylheptyl group, 1-heptyloctyl group, 1-octylnonyl group, 1-nonyldocyl group, 1-docylundecyl group, 1-undecyldodecyl group, and 1-dodecyltridecyl group.

Preferably, the additional groups 22, in particular the terminal groups 22, are selected from the group consisting of 2-ethylhexyl group, 2-butyloctyl group, 2-hexyldecyl group, 2-octyldodecyl group, 2-decyltetradecyl group, 2-hexyloctanyl group, 2-octyldecyl group, 1-methylethyl group, 1-ethylpropyl group, 1-propylbutyl group, 1-butylpentyl group, 1-pentylhexyl group, 1-hexylheptyl group, 1-heptyloctyl group, 1-octylnonyl group, 1-nonyldocyl group, 1-docylundecyl group, 1-undecyldodecyl group, and 1-dodecyltridecyl group.

According to an embodiment of the invention, the aggregating additive 20 has a linear structure and comprises two terminal groups 22 that can be any group miscible in the composition, in particular with the polyester segment 13. The two terminal groups 22 can be identical or not. In particular, the two terminal groups 22 can be of any chemical nature as long as both, or one of them, provides solubility in the composition, more particularly in the polyester matrix provided by the polyester segment 13 and optionally a further non-functionalized polyester. Preferably the two terminal groups 22 are apolar moieties such as $C_1$ to $C_{30}$ hydrocarbon groups, more preferably branched $C_1$ to $C_{30}$ alkyl groups, even more preferably selected from the additional groups 22 listed above. Preferably, the terminal groups 22 are not identical and one of the terminal groups is of as low as possible steric demand. In this way, it can be avoided that this terminal group countervails co-aggregation of the additive aggregating segment 21 of the aggregating additive 20 with the polymer aggregating segments 11, 12. Advantageously, the second terminus is designed such that it provides sufficient solubility in the polyester and for processing purposes, but is preferably not subject to specific intermolecular interactions. Preferably, the first terminal group is a $C_1$ to $C_{12}$ alkyl group, more preferably a methyl group, and the second terminal group is a $C_1$ to $C_{30}$ hydrocarbon fragment, in particular a group selected from the group consisting of a hydrocarbon group with 1 to 30 carbon atoms, a $C_1$ to $C_{30}$ alkyl group, in particular methyl group, ethyl group, propyl group, butyl group, pentyl group, hexyl group, heptyl group, octyl group, nonyl group, decyl group, undecyl group, dodecyl group, a $C_4$ to $C_{20}$ aromatic moiety, in particular phenyl group, diisopropylphenyl group, di-tert.-butylphenyl group, benzyl group, diisopropylbenzyl group, di-tert.-butylbenzyl group, a branched hydrocarbon group with 1 to 26 carbon atoms, in particular 2-ethylhexyl group, 2-butyloctyl group, 2-hexyldecyl group, 2-octyldodecyl group, 2-decyltetradecyl group, 2-hexyloctanyl group, 2-octyldecyl group, 1-methylethyl group, 1-ethylpropyl group, 1-propylbutyl group, 1-butylpentyl group, 1-pentylhexyl group, 1-hexylheptyl group, 1-heptyloctyl group, 1-octylnonyl group, 1-nonyldocyl group, 1-docylundecyl group, 1-undecyldodecyl group, and 1-dodecyltridecyl group. Preferably, the $C_1$ to $C_{30}$ hydrocarbon fragment is branched in order to reduce the crystallization tendency of the hydrogen bonding units for the sake of improved miscibility with the polyester matrix. According to a preferred embodiment, one of the terminal groups 22 of the aggregating additive 20 is selected from the group consisting of 2-ethylhexyl group, 2-butyloctyl group, 2-hexyldecyl group, 2-octyldodecyl group, 2-decyltetradecyl group, 2-hexyloctanyl group, 2-octyldecyl group, 1-methylethyl group, 1-ethylpropyl group, 1-propylbutyl group, 1-butylpentyl group, 1-pentylhexyl group, 1-hexylheptyl group, 1-heptyloctyl group, 1-octylnonyl group, 1-nonyldocyl group, 1-docylundecyl group, 1-undecyldodecyl group, and 1-dodecyltridecyl group, preferably 2-ethylhexyl or 2-octyldodecyl, more preferably 2-octyldodecyl, in particular for an aggregating additive 20 that comprises a diglycine or dialanine in the at least one additive aggregating segment 21. In this preferred embodiment, the aggregating additive 20 comprises a methyl group as second terminal group 22 and the additive aggregating segment 21 further comprises an —NH— group and a —C(=O)— group that connect the 2-ethylhexyl or the 2-octyldodecyl group and the methyl group with the dialanine, respectively. However, when the additive aggregating segment 21 of the aggregating additive 20 is a larger oligopeptide such as acetylated triglycine or acetylated trialanine, a larger residue may be required as terminal group 22 due to the lower solubility of the acetylated trialanine.

According to another embodiment of the invention, the aggregating additive 20 is based on a multifunctional cyclic or polycyclic and/or branched moiety and comprises 3 to 6 terminal groups 22 that can be any group miscible in the composition, in particular with the polyester segment 13. The 3 to 6 terminal groups 22 are preferably identical. In particular, the 3 to 6 terminal groups 22 can be of any chemical nature as long as they provide solubility in the composition, more particularly in the polyester matrix provided by the polyester segment 13 and optionally a further non-functionalized polyester. Preferably the 3 to 6 terminal groups 22 are apolar moieties such as $C_1$ to $C_{30}$ hydrocarbon groups, more preferably selected from the group consisting of a hydrocarbon group with 1 to 30 carbon atoms, a $C_1$ to $C_{30}$ alkyl group, in particular methyl group, ethyl group, propyl group, butyl group, pentyl group, hexyl group, heptyl group, octyl group, nonyl group, decyl group, undecyl group, dodecyl group, a $C_4$ to $C_{20}$ aromatic moiety, in particular phenyl group, diisopropylphenyl group, di-tert.-butylphenyl group, benzyl group, diisopropylbenzyl group, di-tert.-butylbenzyl group, a branched hydrocarbon group with 1 to 26 carbon atoms, in particular 2-ethylhexyl group, 2-butyloctyl group, 2-hexyldecyl group, 2-octyldodecyl group, 2-decyltetradecyl group, 2-hexyloctanyl group, 2-octyldecyl group, 1-methylethyl group, 1-ethylpropyl group, 1-propylbutyl group, 1-butylpentyl group, 1-pentylhexyl group, 1-hexylheptyl group, 1-heptyloctyl group, 1-octylnonyl group, 1-nonyldocyl group, 1-docylundecyl group, 1-undecyldodecyl group, and 1-dodecyltridecyl group. Preferably the 3 to 6 terminal groups 22 are 2-octyldodecyl groups.

The aggregating additive 20 may have a molecular weight of from 50 g/mol to 2000 g/mol. Preferably, the aggregating additive 20 has a molecular weight of from 50 g/mol to 1900 g/mol, in particular from 50 g/mol to 1800 g/mol or from 50 g/mol to 1700 g/mol or from 50 g/mol to 1600 g/mol or from 50 g/mol to 1500 g/mol or from 50 g/mol to 1400 g/mol or from 50 g/mol to 1300 g/mol or from 50 g/mol to 1200 g/mol or from 50 g/mol to 1100 g/mol or from 50 g/mol to 1000 g/mol or from 100 g/mol to 800 g/mol or from 150 g/mol to 700 g/mol or from 150 g/mol to 600 g/mol. When the aggregating additive 20 has a molecular weight in the aforementioned ranges, compositions with a high and sharp softening point can be achieved, as a high concentration of the aggregating segments 11, 12, 21 can be achieved at low contents of the aggregating additive 20.

The aggregating additive 20 can be monodisperse or polydisperse. Preferably, the aggregating additive 20 is monodisperse. With monodisperse aggregating additives 20, higher softening temperatures of the composition and sharper softening transitions can be achieved, at equal or lower weight fractions of the additive in the composition.

The composition or the functionalized polymer according to the invention are particularly suited for the preparation of materials or as a material in various applications. For example, materials from the composition or the functionalized polymer according to the invention can be used as packaging materials. The materials from the composition are used at different temperatures. The temperature at which they are most commonly used may also be called the operating temperature. For example a material that is most commonly used at temperatures of 80° C. is used at an operating temperature of 80° C. According to an embodiment of the invention, the melting temperature of the aggregating additive 20 is at least 30° C., more particularly at least 40° C. or at least 50° C., higher than the operating temperature at which materials from the composition according to the invention will be used. The melting temperature may also be called melting point. The melting point can be determined by differential scanning calorimetry (DSC) heating scans at a heating rate of 10 K/min. The melting temperature may also be called the dissociation temperature, $T_d$. The melting or dissociation temperature $T_d$ in a composition may in particular be determined by differential scanning calorimetry, in particular at a heating rate of 10 K/min. The higher the melting temperature of the additive is above the operating temperature, the lower is the amount of additive that is required in order to achieve a material with a high softening temperature $T_s$. The softening temperature $T_s$ may in particular be the temperature where the loss factor in oscillatory shear rheology becomes tan δ≥1. The softening temperature $T_s$ may in particular be determined using oscillatory shear-rheological temperature sweeps, in particular using a parallel plate rheometer with a gap from 0.4 to 0.6 mm at a cooling rate of 3° C./min, a fixed radial frequency of 1 rad/s, and a strain amplitude of 0.1% during the measurement after annealing to 120° C. to 200° C. for 20 min. Preferably, the softening temperature $T_s$ of a material for a thermoplastic resin from the composition is higher than the operating temperature at which it will be used.

According to a preferred embodiment of the invention, the aggregating additive 20 has a melting point that is at least 10° C., in particular at least 20° C., or at least 30° C., higher than the melting point of the polyester segment 13, if the polyester segment 13 is semicrystalline and/or has a melting point; or at least 10° C., in particular at least 20° C., or at least 30° C. higher than the glass transition temperature of the polyester segment 13, if the polyester segment 13 is amorphous and/or has a glass transition temperature and no melting point. The glass transition temperature can be determined by DSC as explained above. Usually, the glass transition temperature appears in a DSC graph as a step.

Structure of the Polymer Aggregating Segments 11, 12 and the Additive Aggregating Segment 21

In particular, the polymer aggregating segments 11, 12 and the at least one additive aggregating segment 21 can be the same or different but preferably, they are both capable of cooperative self-assembly by the same supramolecular interactions. In this way, the polymer aggregating segments 11, 12 and the additive aggregating segment 21 can form aggregates incorporating both the polymer aggregating segments 11, 12 and the additive aggregating segment 21 by co-assembly. Examples of supramolecular interactions include hydrogen bonding interactions, ion-dipole interactions, dipole-dipole interactions, interactions between pi-systems, and interactions between a cation and a pi-system. Non-covalent bonds based on supramolecular interactions are preferably formed between chemical functional groups. Examples of such chemical functional groups include carboxylic acid groups, amide groups, urethane groups, urea groups, aromatic groups, perfluoroaromatic groups, hydroxyl groups, amine groups, and a trialkyl ammonium residue. Non-covalent bonds based on the same supramolecular interaction may be formed between different or identical chemical functional groups. For example in the case of hydrogen bonding, a hydrogen bond may be formed between an amide group and a urethane group as an example for a non-covalent bond based on the same supramolecular interaction, wherein the non-covalent bond is formed between different chemical functional groups. A hydrogen bond may also be formed between two amide groups as an example for a non-covalent bond based on the same supramolecular interaction, wherein the non-covalent bond is formed between identical chemical functional groups.

According to an embodiment of the invention, the polymer aggregating segments 11, 12 and the additive aggregating segment 21 each contain at least two interaction sites from which a non-covalent bond is formed.

According to another embodiment of the invention, the non-covalent bonds that can be formed by the polymer aggregating segments 11, 12 and the additive aggregating segment 21 are selected from the group consisting of hydrogen bonds, bonds between ions and dipoles, bonds between dipoles, bonds between a cation and a pi-system, and bonds between pi-systems, in particular selected from the group consisting of hydrogen bonds and bonds between dipoles, more particularly hydrogen bonds. According to another embodiment of the invention, the supramolecular interaction, on which the non-covalent bonds that may be formed by the polymer aggregating segments 11, 12 and the additive aggregating segment 21 are based, is selected from the group consisting of hydrogen bonding interactions, ion-dipole interactions, dipole-dipole interactions, interactions between a cation and a pi-system, and interactions between pi-systems, in particular selected from the group consisting of hydrogen bonding interactions and dipole-dipole interactions, more particularly hydrogen bonding interactions. The aforementioned supramolecular interactions, in particular hydrogen bonding, allow to achieve higher softening temperatures of the composition.

For good formation of aggregates 31 in the composition, it is preferable that the supramolecular interactions chosen to affect the co-assembly of the polymer aggregating segments 11, 12 and the additive aggregating segment 21 are neither too weak to not allow for meaningful aggregation, nor too strong to prohibit error correction by reversible, dynamic dissociation and re-association; a suitable range of binding energies for this purpose is 20-100 kJ/mol per interaction site. Thus, according to an embodiment of the invention, each non-covalent bond has a binding energy of from 20 kJ/mol to 100 kJ/mol.

The polymer aggregating segments 11, 12 and the additive aggregating segment 21 are ditopic. The polymer aggregating segments 11, 12 and the additive aggregating segment 21 are preferably ditopic and self-complementary. Preferably, in a ditopic and self-complementary segment, the type and arrangement of the interaction sites in the segment are designed such that, when two segments aggregate via one of the bonding regions of each segment, all the interactions sites of the aggregated bonding regions are saturated, in particular they all have formed non-covalent bonds. More preferably, in a ditopic and self-complementary segment, the type and arrangement of the interaction sites in the segment are designed such that, when two segments aggregate, all interaction sites of one segment, from which non-covalent bonds with an angle from 0° to 45° between these covalent bonds are formed, are saturated. An example for a ditopic and self-complementary segment is a dialanine unit or a benzene tricarboxamide unit. In an aggregate formed from two dialanine units, all interaction sites of one of the bonding regions of each dialanine unit have formed non-covalent bonds and are, thus, saturated. The same applies to an aggregate formed from two benzene tricarboxamide units. Ditopic molecules have also been defined by P. Cordier et al., in Nature 2008, 451, 977.

With the aid of ditopic and self-complementary polymer aggregating segments 11, 12 and additive aggregating segment 21, aggregates 31 with a periodic placement of the polymer aggregating segments 11, 12 and/or the additive aggregating segment 21 along at least one extended dimension can be formed from a large number of polymer aggregating segments 11, 12 and/or additive aggregating segment 21 as repeating units. In this way, the successive replacement of polymer aggregating segments 11, 12 with additive aggregating segments 21 in the co-assembled aggregates does not result in a breakage of physical network points that makes up the rubbery network and thus to a weakening of the material. Such a rubbery network may even give rise to a rubbery plateau in temperature-dependent shear rheology at elevated temperatures, in particular above the melting or glass transitions of the polymer. Such a rubbery plateau may improve the processing of a material, in particular due to increased melt elasticity.

Thus, according to an embodiment of the invention, the polymer aggregating segments 11, 12 and the additive aggregating segment 21 comprise identical chemical functional groups that are capable of forming non-covalent bonds based on a supramolecular interaction, in particular the same number of chemical functional groups that are capable of forming non-covalent bonds based on a supramolecular interaction. In particular, the polymer aggregating segments 11, 12 and the additive aggregating segment 21 comprise identical chemical functional groups that are capable of forming hydrogen bonds, in particular the same number of chemical functional groups that are capable of forming hydrogen bonds, more particularly the same number of hydrogen bond donors and hydrogen bond acceptors. Preferably, the polymer aggregating segments 11, 12 and the additive aggregating segment 21 comprise the same number of amide (—NH—C(=O)—) groups.

The polymer aggregating segments 11, 12 and the additive aggregating segment 21 may be complementary and/or identical, in particular complementary and identical, more particularly the polymer aggregating segments 11, 12 and the additive aggregating segment 21 may be self-complementary and/or identical, more particularly self-complementary and identical.

Preferably, the supramolecular interactions in the ditopic segments 11, 12, 21, in particular in the ditopic and self-complementary segments 11, 12, 21, that are the origin of the co-assembly of the polymer aggregating segments 11, 12 and the additive aggregating segment 21 should be specific, of limited range, and oriented in space, so that aggregates with a well-defined geometry are formed that are well dispersed in the polyester matrix.

According to an embodiment of the invention, the polymer aggregating segments 11, 12 and the additive aggregating segment 21 each contain donor sites and/or acceptor sites as interaction sites from which non-covalent bonds are formed. Preferably, the self-complementary, ditopic supramolecular interactions of the polymer aggregating segments 11, 12 and the additive aggregating segment 21 should each comprise an electronically conjugated donor and acceptor function, such as a dipole. Advantageously, the polymer aggregating segments 11, 12 and the additive aggregating segment 21 each contain at least one donor site and at least one acceptor site as interaction sites from which non-covalent bonds are formed, in particular wherein the at least one donor site and at least one acceptor site are electronically conjugated. An example of a donor site and an acceptor site that are electronically conjugated, is an amide (—NH—C(=O)—) group. If the polymer aggregating segments 11, 12 and the additive aggregating segment 21 each contain more than one donor and one acceptor site, it is preferred that all the donor and acceptor sites are electronically conjugated in donor-acceptor site pairs. Preferably, a donor site and an acceptor site may be combined in a chemical functional group, for example a chemical functional group that simultaneously provides a hydrogen bond donor and a hydrogen bond acceptor site. Preferably, in each of the ditopic polymer aggregating segments 11, 12 and additive aggregating segment 21, two interaction sites that are not in the same bonding region of the segment are electronically conjugated. Thus, when the ditopic polymer aggregating segments 11, 12 and additive aggregating segment 21 each contain one or more pairwise electronically conjugated donor and acceptor sites, preferably, the donor site and the acceptor site in each electronically conjugated donor and acceptor site pair are distributed over the two bonding regions of the respective ditopic segment. In this way, the co-assembly of the polymer aggregating segments 11, 12 and the additive aggregating segment 21 into aggregates becomes cooperative, which serves to increase their dissociation temperature and decrease the dissociation temperature range. Examples of a ditopic segment that contains pairwise electronically conjugated donor and acceptor sites, wherein the donor and acceptor site in each donor and acceptor site pair are distributed over the two bonding regions of the ditopic segment are segments comprising amide groups or urethane groups or urea groups, in particular oligopeptides, oligoamides, oligourethanes, oligoureas, and multifunctional cyclic or polycyclic and/or branched moieties, wherein the multifunctional cyclic or polycyclic and/or branched moiety comprises at least three amide or urethane or urea groups.

It is therefore preferable for the polymer aggregating segments 11, 12 and the at least one additive aggregating segment 21 to provide one or more such chemical functional groups. According to an embodiment of the invention, the polymer aggregating segments 11, 12 and the additive aggregating segment 21 each contain at least one, in particular 2 to 10 or 2 to 5, chemical functional groups that, in particular provide a donor site and an acceptor site as interaction sites from which non-covalent bonds are formed, in particular wherein the donor site and the acceptor site are electronically conjugated. In this way, their co-assembly can be adjusted more easily to result in aggregation but still allow for error correction by dynamic dissociation and re-association. Preferably, the polymer aggregating segments 11, 12 and the additive aggregating segment 21 each contain 2 to 10 or 2 to 5 chemical functional groups that provide self-complementary, ditopic, electronically conjugated donor and acceptor sites.

According to an embodiment of the invention, the supramolecular interaction is a hydrogen bonding interaction. Preferably, the additive aggregating segment 21 and the polymer aggregating segment 11, 12 each comprise at least one hydrogen bond donor and at least one hydrogen bond acceptor.

Various chemical functional groups can be used that provide an electronically conjugated donor and acceptor site. Advantageous are chemical functional groups that each simultaneously provide an electronically conjugated hydrogen bond donor and a hydrogen bond acceptor site, particularly in the form of —C(=Y)—NH functions that can be part of a —C(=Y)—NH— function, a —O—C(=Y)—NH— function, or a —NH—C(=Y)—NH— function, wherein in each case, Y is selected from the group consisting of NH, S, and O, preferably O. Thus, according to an embodiment of the invention, the additive aggregating segment (21) and/or the polymer aggregating segment (11, 12) independently comprise(s) at least one chemical functional group selected from the group consisting of peptide (—C(=O)—NH—), amide (—C(=O)—NH—), urethane (—O—C(=O)—NH—), urea (—NH—C(=O)—NH—), thiopeptide (—C(=S)—NH—), thioamide (—C(=S)—NH—), thiourethane (—O—C(=S)—NH—), thiourea (—NH—C(=S)—NH—), —C(=NH)—NH—, —C(=NH)—NH—, —O—C(=NH)—NH—, and —NH—C(=NH)—NH—, in particular selected from the group consisting of peptide (—C(=O)—NH—), amide (—C(=O)—NH—), urethane (—O—C(=O)—NH—), and urea (—NH—C(=O)—NH—) and/or is/are selected from the group consisting of an oligopeptide and/or an oligoamide and/or an oligourethane and/or an oligourea and/or a multifunctional cyclic or polycyclic and/or branched moiety comprising at least two, in particular at least three, chemical functional groups independently selected from the group consisting of —C(=O)—NH—, —C(=S)—NH—, —C(=NH)—NH—, —NH—C(=O)—, —NH—C(=S)—, —NH—C(=NH)—, —NH—C(=O)—O—, —NH—C(=S)—O—, —NH—C(=NH)—O—, —NH—C(=O)—S—, —NH—C(=S)—S—, —NH—C(=NH)—S—, —NH—C(=O)—NH—, —NH—C(=S)—NH—, —NH—C(=NH)—NH—, —O—C(=O)—NH—, —O—C(=S)—NH—, —O—C(=NH)—NH—, —S—C(=O)—NH—, —S—C(=S)—NH—, and —S—C(=NH)—NH—, in particular from the group consisting of —C(=O)—NH—, —NH—C(=O)—, —O—C(=O)—NH—, —NH—C(=O)—O—, and —NH—C(=O)—NH—, more particularly from the group consisting of —C(=O)—NH— and —NH—C(=O)—.

In the present application, peptide (—C(=O)—NH—) bonds or groups and amide (—C(=O)—NH—) bonds or groups are considered to be the same.

According to another embodiment of the invention, the donor and acceptor site of the chemical functional group of the polymer aggregating segments 11, 12 and the additive aggregating segment 21 are capable of forming hydrogen bonds, in particular wherein the chemical functional group is selected from the group consisting of peptide (—C(=O)—NH—), amide (—C(=O)—NH—), urethane (—O—C(=O)—NH—), urea (—NH—C(=O)—NH—), thiopeptide (—C(=S)—NH—), thioamide (—C(=S)—NH—), thiourethane (—O—C(=S)—NH—), thiourea (—NH—C(=S)—NH—), —C(=NH)—NH—, —O—C(=NH)—NH—, and —NH—C(=NH)—NH—, more preferably selected from the group consisting of peptide (—C(=O)—NH—), amide (—C(=O)—NH—), urethane (—O—C(=O)—NH—), and urea (—NH—C(=O)—NH—), most preferably selected from the groups consisting of peptide (—C(=O)—NH—) and amide (—C(=O)—NH—). A segment that contains at least one of the aforementioned chemical functional groups is a ditopic segment that contains at least two interactions sites from which non-covalent bonds, in particular hydrogen bonds, can be formed.

Thus, according to an embodiment, the invention provides for a composition containing
  a. a functionalized polymer 10 that comprises at least one polyester segment 13 and at least one, in particular at least two, polymer aggregating segment 11, 12 (each) comprising at least one chemical functional group selected from the group consisting of peptide (—C(=O)—NH—), amide (—C(=O)—NH—), urethane (—O—C(=O)—NH—), urea (—NH—C(=O)—NH—), thiopeptide (—C(=S)—NH—), thioamide (—C(=S)—NH—), thiourethane (—O—C(=S)—NH—), thiourea (—NH—C(=S)—NH—), —C(=NH)—NH—, —O—C(=NH)—NH—, and —NH—C(=NH)—NH—, more preferably selected from the group consisting of peptide (—C(=O)—NH—), amide (—C(=O)—NH—), urethane (—O—C(=O)—NH—), and urea (—NH—C(=O)—NH—), most preferably selected from the groups consisting of peptide (—C(=O)—NH—) and amide (—C(=O)—NH—);

b. an aggregating additive 20 that comprises at least one additive aggregating segment 21 comprising at least one chemical functional group selected from the group consisting of peptide (—C(=O)—NH—), amide (—C(=O)—NH—), urethane (—O—C(=O)—NH—), urea (—NH—C(=O)—NH—), thiopeptide (—C(=S)—NH—), thioamide (—C(=S)—NH—), thiourethane (—O—C(=S)—NH—), thiourea (—NH—C(=S)—NH—), —C(=NH)—NH—, —O—C(=NH)—NH—, and —NH—C(=NH)—NH—, more preferably selected from the group consisting of peptide (—C(=O)—NH—), amide (—C(=O)—NH—), urethane (—O—C(=O)—NH—), and urea (—NH—C(=O)—NH—), most preferably selected from the groups consisting of peptide (—C(=O)—NH—) and amide (—C(=O)—NH—).

wherein the polymer aggregating segment 11, 12 and the additive aggregating segment 21 are designed such that they can form aggregates 31 that contain polymer aggregating segments 11, 12 and additive aggregating segments 21, and wherein the polyester segment 13 has a number average molecular weight of from 10'000 g/mol to 500'000 g/mol. According to this embodiment, the aggregating additive 20 is preferably monodisperse.

If the polymer aggregating segments 11, 12 and the additive aggregating segment 21 each contain more than one chemical functional group, these chemical functional groups may be different from each other or identical. It is particularly preferable that these chemical functional groups are placed at defined distances along the polymer aggregating segments 11, 12 and the additive aggregating segment 21, so that the polymer aggregating segments 11, 12 and the additive aggregating segment 21 can co-assemble in-register in spite of the specific, short range, and geometrically defined nature of the supramolecular interactions.

According to another embodiment of the invention, the polymer aggregating segments 11, 12 and the additive aggregating segment 21 each comprise an oligopeptide and/or an oligoamide and/or an oligourethane and/or an oligourea and/or a multifunctional cyclic or polycyclic and/or branched moiety comprising at least two, in particular at least three, chemical functional groups independently selected from the group consisting of —C(=O)—NH—, —C(=S)—NH—, —C(=NH)—NH—, —NH—C(=O)—, —NH—C(=S)—, —NH—C(=NH)—, —NH—C(=O)—O—, —NH—C(=S)—O—, —NH—C(=NH)—O—, —NH—C(=O)—S—, —NH—C(=S)—S—, —NH—C(=NH)—S—, —NH—C(=O)—NH—, —NH—C(=S)—NH—, —NH—C(=NH)—NH—, —O—C(=O)—NH—, —O—C(=S)—NH—, —O—C(=NH)—NH—, —S—C(=O)—NH—, —S—C(=S)—NH—, and —S—C(=NH)—NH—, in particular from the group consisting of —C(=O)—NH—, —NH—C(=O)—, —O—C(=O)—NH—, —NH—C(=O)—O—, and —NH—C(=O)—NH—, more particularly from the group consisting of —C(=O)—NH— and —NH—C(=O)—. Preferably, the polymer aggregating segments 11, 12 and the additive aggregating segment 21 each comprise an oligopeptide and/or an oligoamide.

A segment that comprises at least an oligopeptide and/or an oligoamide and/or an oligourethane and/or an oligourea and/or a multifunctional cyclic or polycyclic and/or branched moiety as described above is a ditopic segment that contains at least two interactions sites from which non-covalent bonds, in particular hydrogen bonds, can be formed.

Thus, according to an embodiment, the invention provides for a composition containing a. a functionalized polymer 10 that comprises at least one polyester segment 13 and at least one, in particular at least two, polymer aggregating segment 11, 12 (each) comprising an oligopeptide and/or an oligoamide and/or an oligourethane and/or an oligourea and/or a multifunctional cyclic or polycyclic and/or branched moiety comprising at least two, in particular at least three, chemical functional groups independently selected from the group consisting of —C(=O)—NH—, —C(=S)—NH—, —C(=NH)—NH—, —NH—C(=O)—, —NH—C(=S)—, —NH—C(=NH)—, —NH—C(=O)—O—, —NH—C(=S)—O—, —NH—C(=NH)—O—, —NH—C(=O)—S—, —NH—C(=S)—S—, —NH—C(=NH)—S—, —NH—C(=O)—NH—, —NH—C(=S)—NH—, —NH—C(=NH)—NH—, —O—C(=O)—NH—, —O—C(=S)—NH—, —O—C(=NH)—NH—, —S—C(=O)—NH—, —S—C(=S)—NH—, and —S—C(=NH)—NH—, b. an aggregating additive 20 that comprises at least one additive aggregating segment 21 comprising an oligopeptide and/or an oligoamide and/or an oligourethane and/or an oligourea and/or a multifunctional cyclic or polycyclic and/or branched moiety comprising at least two, in particular at least three, chemical functional groups independently selected from the group consisting of —C(=O)—NH—, —C(=S)—NH—, —C(=NH)—NH—, —NH—C(=O)—, —NH—C(=S)—, —NH—C(=NH)—, —NH—C(=O)—O—, —NH—C(=S)—O—, —NH—C(=NH)—O—, —NH—C(=O)—S—, —NH—C(=S)—S—, —NH—C(=NH)—S—, —NH—C(=O)—NH—, —NH—C(=S)—NH—, —NH—C(=NH)—NH—, —O—C(=O)—NH—, —O—C(=S)—NH—, —O—C(=NH)—NH—, —S—C(=O)—NH—, —S—C(=S)—NH—, and —S—C(=NH)—NH—, wherein the polymer aggregating segment 11, 12 and the additive aggregating segment 21 are designed such that they can form aggregates 31 that contain polymer aggregating segments 11, 12 and additive aggregating segments 21, and wherein the polyester segment 13 has a number average molecular weight of from 10'000 g/mol to 500'000 g/mol. According to this embodiment, the aggregating additive 20 is preferably monodisperse.

Preferably, the oligopeptide contains from 1 to 10, in particular from 2 to 5, peptide units, the oligoamide contains from 1 to 10, in particular from 2 to 5, amide units, the oligourethane contains from 1 to 10, in particular from 2 to 5, urethane units, the oligourea contains from 1 to 10, in particular from 2 to 5, urea units and/or the multifunctional cyclic or polycyclic and/or branched moiety contains from 2 to 6, in particular 3 chemical functional groups independently selected from the group consisting of —C(=O)—NH—, —C(=S)—NH—, —C(=NH)—NH—, —NH—C(=O)—, —NH—C(=S)—, —NH—C(=NH)—, —NH—C(=O)—O—, —NH—C(=S)—O—, —NH—C(=NH)—O—, —NH—C(=O)—S—, —NH—C(=S)—S—, —NH—C(=NH)—S—, —NH—C(=O)—NH—, —NH—C(=S)—NH—, —NH—C(=NH)—NH—, —O—C(=O)—NH—, —O—C(=S)—NH—, —O—C(=NH)—NH—, —S—C(=O)—NH—, —S—C(=S)—NH—, and —S—C(=NH)—NH—, in particular from the group consisting of —C(=O)—NH—, —NH—C(=O)—, —O—C(=O)—NH—, —NH—C(=O)—O—, and —NH—C(=O)—NH—, more particularly from the group consisting of —C(=O)—NH— and —NH—C(=O)—.

In the above embodiments, the at least two, in particular at least three, chemical functional groups of the multifunctional cyclic or polycyclic and/or branched moiety are preferably identical and selected from the group consisting of —C(=O)—NH—, —C(=S)—NH—, —C(=NH)—NH—, —NH—C(=O)—, —NH—C(=S)—, —NH—C(=NH)—, —NH—C(=O)—O—, —NH—C(=S)—O—, —NH—C(=NH)—O—, —NH—C(=O)—S—, —NH—C(=S)—S—, —NH—C(=NH)—S—, —NH—C(=O)—NH—, —NH—C(=S)—NH—, —NH—C(=NH)—NH—, —O—C(=O)—NH—, —O—C(=S)—NH—, —O—C(=NH)—NH—, —S—C(=O)—NH—, —S—C(=S)—NH—, and —S—C(=NH)—NH—, in particular from the group consisting of —C(=O)—NH—, —NH—C(=O)—, —O—C(=O)—NH—, —NH—C(=O)—O—, and —NH—C(=O)—NH—, more particularly from the group consisting of —C(=O)—NH— and —NH—C(=O)—.

The units of the oligopeptide, the oligoamide, the oligourethane and the oligourea may be made up from building blocks selected from the group consisting of natural amino acids, synthetic amino acids, diacids, diamines, isocyanates, alcohols, amines, and mixtures thereof. The natural amino acids are known to the skilled person. Natural amino acids include in particular alanine and glycine. Synthetic amino acids preferably have the structure HOOC—$R^1$—$NH_2$, wherein $R^1$ is a hydrocarbon group with 2 to 15 carbon atoms, in particular they are selected from the group consisting of beta-alanine, 3-aminopropanoic acid, 4-aminobutanoic acid, 5-aminopentanoic acid, 6-aminohexanoic acid, p-aminobenzoic acid, or m-aminobenzoic acid. Diacids preferably have the structure HOOC—$R^2$—COOH, wherein $R^2$ is a hydrocarbon group with 1 to 15 carbon atoms, in particular they are selected from the group consisting of malonic acid, succinic acid, glutaric acid, adipic acid, pimelic acid, suberic acid, azelaic acid, sebacoic acid, undecandedioic acid, dodecanedioic acid, tridecanedioic acid, tetradecanedioic acid, p-terephthalic acid, m-terephthalic acid, napthalene-2,6-dicarboxylic acid, napthalene-1,5-dicarboxylic acid, and 1,1'-biphenyl-4,4'-dicarboxylic acid. Diamines preferably have the structure $H_2N$—$R^3$—$NH_2$, wherein $R^3$ is a hydrocarbon group with 1 to 15 carbon atoms, in particular they are selected from the group consisting of tetramethylene diamine, pentamethylene diamine, hexamethylene diamine, heptamethylene diamine, octamethylene diamine, nonamethylene diamine, decamethylene diamine, p-phenylene diamine, m-phenylene diamine, 1,3-bis(aminomethyl)benzene, 1,4-bis(aminomethyl)benzene, 1,3-bis(aminomethyl)cyclohexane, 1,4-bis(aminomethyl)cyclohexane, and 4,4'-diamino-1,1'-biphenyl. Diisocyanates preferably have the structure OCN—$R^4$—NCO, wherein $R^4$ is a hydrocarbon group with 1 to 15 carbon atoms, in particular they are selected from the group consisting of hexamethylene diisocyanate, toluene diisocyanate, and diphenylmethylene diisocyanate. Diols preferably have the structure HO—$R^5$—OH, wherein $R^5$ is a hydrocarbon group with 2 to 15 carbon atoms, in particular they are selected from the group consisting of ethanediol, propane-1,2-diol, propane-1,3-diol, butane-1,4-diol, pentane-1,5-diol, 1,4-dihydroxybenzene, 4,4'-dihydroxy-1,1'-biphenyl, and bisphenol A.

It is apparent for one skilled in the art which of the aforementioned repeating units are applicable to the oligopeptide, the oligoamide, the oligourethane, and the oligourea. In particular, it is apparent for one skilled in the art that oligopeptides can be obtained by combining amino acids, oligoamides can be obtained by combining amino acids and/or diacids and/or diamines, oligourethanes can be obtained by combining diisocyanates with diols and oligoureas can be obtained by combining diisocyanates with diamines. Of course, other combinations are conceivable, such as diamines with diacids and diisocyanates to provide a mixed oligoamide-oligourea.

The multifunctional cyclic or polycyclic and/or branched moiety comprising at least two, in particular at least three, chemical functional groups independently selected from the group consisting of —C(=O)—NH—, —C(=S)—NH—, —C(=NH)—NH—, —NH—C(=O)—, —NH—C(=S)—, —NH—C(=NH)—, —NH—C(=O)—O—, —NH—C(=S)—O—, —NH—C(=NH)—O—, —NH—C(=O)—S—, —NH—C(=S)—S—, —NH—C(=NH)—S—, —NH—C(=O)—NH—, —NH—C(=S)—NH—, —NH—C(=NH)—NH—, —O—C(=O)—NH—, —O—C(=S)—NH—, —O—C(=NH)—NH—, —S—C(=O)—NH—, —S—C(=S)—NH—, and —S—C(=NH)—NH—, can be made up from the respective polycarboxylic acid or polyamine derivatives or polyol or polythiol derivatives or derivatives with different functional groups as building blocks. In particular, the multifunctional cyclic or polycyclic and/or branched moiety may be based on amides derived from polycarboxylic acids or on amides and ureas derived from polyamines or on urethanes derived from polyols.

Polycarboxylic acids preferably have the structure $R^6$—$(COOH)_a$, wherein $R^6$ is a hydrocarbon group with 2 to 20 carbon atoms and a is an integer from 3 to 6, in particular they are selected from the group consisting of benzene-1,3,5-tricarboxylic acid, benzene-1,2,4-tricarboxylic acid, benzene-1,2,4,5-tetracarboxylic acid, benzene-1,2,3,4,5-pentacarboxylic acid, benzene-1,2,3,4,5,6-hexacarboxylic acid, 1,1'-biphenyl-3,4',5-tricarboxylic acid, 1,1'-biphenyl-3,3',5,5'-tetracarboxylic acid, [1,1':4',1"]terphenyl-3,3'",5,5"-tetracarboxylic acid, 1,3,5-tris(4-carboxyphenyl)benzene, 1,2,4,5-tetrakis(4-carboxyphenyl)benzene, 3,3',5,5'-tetracarboxydiphenylmethane, 1,3,5-s-triazine-2,4,6-tricarboxylic acid, 2,4,6-tris(4-carboxyphenyl)-1,3,5-triazine, cyclohexane-1,3,5-tricarboxylic acid, cyclohexane-1,2,4-tricarboxylic, cyclohexane-1,2,4,5-tetracarboxylic acid, cyclohexane-1,2,3,4,5,6-hexacarboxylic acid, 1,2,3,4-cyclopentanetetracarboxylic acid, 1,2,3,4-cyclobutanetetracarboxylic acid, 1,1,2-ethanetricarboxylic acid, 1,2,3-propanetricarboxylic acid, 2-hydroxy-1,2,3-propanetricarboxylic acid (citric acid), 1,2,4-butanetricarboxylic acid, 1,2,3,4-butanetetracarboxylic acid, and 1,3,5-pentanetricarboxylic acid.

Polyamines preferably have the structure $R^7$—$(NH_2)_b$, wherein $R^7$ is a hydrocarbon group with 2 to 20 carbon atoms and b is an integer from 3 to 6, in particular they are selected from the group consisting of 1,3,5-triaminobenzene, 1,2,4-triaminobenzene, 2,4,6-triaminotoluene, 1,2,4,5-tetraaminobenzene, 1,3,5-tris(aminomethyl)benzene, 1,2,4,5-tetrakis(aminomethyl)benzene, 1,3,5-triaminocyclohexane, 3,3',4,4'-tetraamino-1,1'-biphenyl, N,N,N-tris(2-aminoethyl)amine, N,N,N-tris(3-aminopropyl)amine, and N,N,N',N'-tetrakis(3-aminopropyl)-1,4-butanediamine.

Polyols preferably have the structure $R^8$—$(OH)_c$, wherein $R^8$ is a hydrocarbon group with 2 to 20 carbon atoms and c is an integer from 3 to 6, in particular they are selected from the group consisting of 1,3,5-trihydroxybenzene and its derivatives, in particular 2,4,6-trihydroxybenzoic acid, 1,2, 4-trihydroxybenzene and its derivatives, in particular 2,4,5-trihydroxybenzoic acid, 1,2,3-trihydroxybenzene and its derivatives, in particular 3,4,5-trihydroxybenzoic acid and 2,3,4-trihydroxybenzoic acid, 2,4,6-trihydroxytoluene, 3,4, 5-trihydroxytoluene, 2,3,5,6-tetrahydroxy-1,4-quinone, 1,3, 5-trihydroxycyclohexane, 1,2,3,4,5,6-hexahydroxycyclohexane, 1,1,1-tris(hydroxymethyl)methane, 1,1,1-tris (hydroxymethyl) ethane, 1,1,1-tris(hydroxymethyl)propane, and pentaerythritol.

It is apparent to the person skilled in the art how to prepare amides, urethanes, or ureas from the aforementioned building blocks. In particular, it is apparent for one skilled in the art that amides can be prepared by combining the above polycarboxylic acids with amines or by combining the above polyamines with carboxylic acid derivatives, urethanes can be prepared by combining the above polyols with isocyanates, and ureas can be prepared by combining the above polyamines with isocyanates. Moieties with mixed functionalities can of course be prepared by combining a molecule with different functionalities with the respective amines, carboxylic acid derivatives or isocyanates, for example by combining citric acid with an amine and with an isocyanate.

According to an embodiment of the invention, the polymer aggregating segment(s) 11, 12 and the additive aggregating segment 21 each comprise an oligopeptide and/or an oligoamide and/or an oligourethane and/or an oligourea and/or a multifunctional cyclic or polycyclic and/or branched moiety comprising at least two, in particular at least three, chemical functional groups independently selected from the group consisting of —C(=O)—NH—, —C(=S)—NH—, —C(=NH)—NH—, —NH—C(=O)—, —NH—C(=S)—, —NH—C(=NH)—, —NH—C(=O)—O—, —NH—C(=S)—O—, —NH—C(=NH)—O—, —NH—C(=O)—S—, —NH—C(=S)—S—, —NH—C(=NH)—S—, —NH—C(=O)—NH—, —NH—C(=S)—NH—, —NH—C(=NH)—NH—, —O—C(=O)—NH—, —O—C(=S)—NH—, —O—C(=NH)—NH—, —S—C(=O)—NH—, —S—C(=S)—NH—, and —S—C(=NH)—NH—, in particular from the group consisting of —C(=O)—NH—, —NH—C(=O)—, —O—C(=O)—NH—, —NH—C(=O)—O—, and —NH—C(=O)—NH—, more particularly from the group consisting of —C(=O)—NH— and —NH—C(=O)—, wherein the oligopeptide, the oligoamide, the oligourethane, the oligourea, or the multifunctional cyclic or polycyclic and/or branched moiety are made up from the respective building blocks as described above.

According to another embodiment of the invention, the polymer aggregating segment(s) 11, 12 and the additive aggregating segment 21 each comprise an oligopeptide and/or an oligoamide and/or an oligourea and/or a multifunctional cyclic or polycyclic and/or branched moiety comprising at least two, in particular at least three, chemical functional groups independently selected from the group consisting of —C(=O)—NH—, —C(=S)—NH—, —C(=NH)—NH—, —NH—C(=O)—, —NH—C(=S)—, —NH—C(=NH)—, —NH—C(=O)—O—, —NH—C(=S)—O—, —NH—C(=NH)—O—, —NH—C(=O)—S—, —NH—C(=S)—S—, —NH—C(=NH)—S—, —NH—C(=O)—NH—, —NH—C(=S)—NH—, —NH—C(=NH)—NH—, —O—C(=O)—NH—, —O—C(=S)—NH—, —O—C(=NH)—NH—, —S—C(=O)—NH—, —S—C(=S)—NH—, and —S—C(=NH)—NH—, in particular from the group consisting of —C(=O)—NH—, —NH—C(=O)—, —O—C(=O)—NH—, —NH—C(=O)—O—, and —NH—C(=O)—NH—, more particularly from the group consisting of —C(=O)—NH— and —NH—C(=O)—, wherein the oligopeptide, the oligoamide, the oligourea, or the multifunctional cyclic or polycyclic and/or branched moiety are made up from the respective building blocks as described above.

According to another embodiment of the invention, the polymer aggregating segments 11, 12 and the additive aggregating segment 21 each comprise a moiety with the structure $(—C(=O)—R^9—NH—)_d$ or with the structure $(—C(=O)—R^{10}—C(=O)NH—R^{11}—NH—)_e$ or with the structure $(—C(=O)—NH—R^{12}—NH—C(=O)—O—R^{13}—O—)_f$ or with the structure $(—C(=O)—NH—R^{14}—NH—C(=O)—NH—R^{15}—NH—)_g$, or with the structure $D(—Z—)_o$, wherein d is an integer from 1 to 10, in particular from 2 to 5, and $R^9$ is $—C_6H_4—$ or $(—CR^{16}H—)_n$, wherein h is an integer from 1 to 6, in particular 1 or 2, and each $R^{16}$ is independently H or Me, e is an integer from 1 to 10, in particular from 2 to 5, and $R^{10}$ is $—C_6H_4—$ or $(—CH_2—)_i$, wherein i is an integer from 1 to 6, and $R^{11}$ is $—C_6H_4—$ or $—CH_2C_6H_4CH_2—$ or $(—CH_2—)_j$, wherein j is an integer from 1 to 6, f is an integer from 1 to 10, in particular from 2 to 5, and $R^{12}$ is $—C_6(Me)H_3—$ or $(—CH_2—)_k$, wherein k is an integer from 1 to 6, and $R^{13}$ is $—C_6H_4—$ or $(—CH_2—)_l$, wherein l is an integer from 1 to 6, g is an integer from 1 to 10, in particular from 2 to 5, and $R^{14}$ is $—C_6(Me)H_3—$ or $(—CH_2—)_x$, wherein z is an integer from 1 to 6, and $R^{15}$ is $—C_6H_4—$ or $—CH_2C_6H_4CH_2—$ or $(—CH_2—)_y$, wherein y is an integer from 1 to 6, is an integer from 3 to 6, in particular 3, D is a benzene or a cyclohexane or a 1,3,5-triazine moiety and each Z is independently selected from the group consisting of —C(=O)—NH—, —C(=NH)—NH—, —NH—C(=O)—, —NH—C(=NH)—, —NH—C(=O)—O—, —NH—C(=NH)—O—, —NH—C(=O)—NH—, —NH—C(=NH)—NH—, and —O—C(=O)—NH—, more preferably from the group consisting of —C(=O)—NH—, —NH—C(=O)—, —O—C(=O)—NH—, —NH—C(=O)—O—, and —NH—C(=O)—NH—, even more preferably from the group consisting of —C(=O)—NH— and —NH—C(=O)—. In this embodiment, all —Z— are preferably identical.

In addition to interaction sites that stem from the building blocks of monovalent, divalent, or multivalent oligomers or the multifunctional cyclic or polycyclic and/or branched moiety, the polymer aggregating segment(s) 11, 12 and the additive aggregating segment 21 may each also contain chemical functional groups that may provide an additional interaction site. Preferably the additional chemical functional groups are independently selected from the group consisting of —O—, —NH—, —S—, —C(=O)—, —C(=S)—, and —C(=NH)—, more preferably from the group consisting of —NH— and —C(=O)—. Preferably, the polymer aggregating segments 11, 12 and the additive aggregating segment 21 contain 1 or 2 additional chemical functional groups.

According to an embodiment of the invention, the polymer aggregating segment(s) 11, 12 and the least one additive aggregating segment 21 are linear. According to this embodiment, the polymer aggregating segment(s) 11, 12 are polydisperse or monodisperse, in particular monodisperse, and/or the at least one additive aggregating segment 21 is polydisperse or monodisperse, in particular monodisperse.

For example, the polymer aggregating segments 11, 12 and the at least one additive aggregating segment 21 can be based on monodisperse oligomers with a precise number n of repeating units and a defined molar mass, or they can be short polydisperse segments, that is, a mixture of oligomers with different numbers n of repeating units and a molar mass distribution with a number-average degree of polymerization ñ=1-10. Preferably, the polymer aggregating segments 11, 12 and the additive aggregating segment 21 are based on monodisperse oligomers, because their aggregation, in particular their cooperative, in-register self-assembly then results in geometrically defined aggregates with higher dissociation temperatures and sharper dissociation transitions with reduced hysteresis at the same or even smaller length of the polymer aggregating segments 11, 12 and the additive aggregating segment 21 and/or the same or even smaller total concentration of the polymer aggregating segments 11, 12 and additive aggregating segment 21 in the material, because polydisperse mixtures would be subject to a melting point depression and inhomogeneity mostly originating in the increased contribution of the interfacial energy between the aggregates and the polyester matrix that is disfavorable for aggregation. For example, the polymer aggregating segments 11, 12 and the additive aggregating segment 21 may comprise or consist of a monovalent, divalent, or multivalent oligomer, in particular a monodisperse oligomer. A divalent oligomer may in particular have the structure —$U_n$— that can be an oligopeptide, oligoamide, oliogurethane, or oligourea, where the building blocks for the n repeating units U can be chosen from any natural or synthetic amino acids, diacids, diamines, diols, and/or diisocyanates. Different types of repeating units U can also be combined. The preferred number of repeating units U is n=1-10. The segments should not contain more than 10 units because deaggregation would occur at too high temperatures, aggregation would occur on too slow time scales, error correction by reversible, dynamic dissociation and re-association would be kinetically hindered.

The polymer aggregating segment(s) 11, 12 and the additive aggregating segments 21 can be chosen to be different or identical. If the polymer aggregating segments 11, 12 and the least one additive aggregating segment 21 are linear and different, then they should preferably have the same number n or number-average number ñ of repeating units, which will ensure better cooperative, in-register co-assembly and thus comparably higher dissociation temperatures and sharper dissociation transitions with reduced hysteresis. Even more preferred are combinations of the polymer aggregating segments 11, 12 and the additive aggregating segment 21 with the same number n or number-average number ñ of repeating units that place the chemical functional groups responsible for co-assembly at the same distances, which will again ensure better cooperative, in-register co-assembly and thus comparably higher dissociation temperatures and sharper dissociation transitions with reduced hysteresis. Even more preferably, the polymer aggregating segments 11, 12 and the additive aggregating segment 21 are chosen to be identical, which will even further ensure better cooperative, in-register co-assembly and thus comparably higher dissociation temperatures and sharper dissociation transitions with reduced hysteresis, because mixtures in which the polymer aggregating segments 11, 12 are different from the additive aggregating segment 21 would be subject to a melting point depression of the resulting aggregates.

Thus, preferably the polymer aggregating segment(s) 11, 12 and the additive aggregating segment 21 comprise an oligopeptide, an oligoamide, an oligourethane, and/or an oligourea that are as defined above. More preferably, the polymer aggregating segment(s) 11, 12 and the additive aggregating segment 21 comprise an oligopeptide, an oligoamide, and/or an oligourea that are as defined above.

According to another embodiment of the invention, the polymer aggregating segment(s) 11, 12 and the additive aggregating segment 21 each comprise a group with the structure $D(-Z-)_x$, wherein D is a multifunctional cyclic or polycyclic and/or branched moiety, Z is selected from the group consisting of —C(=O)—NH—, —C(=S)—NH—, —C(=NH)—NH—, —NH—C(=O)—, —NH—C(=S)—, —NH—C(=NH)—, —NH—C(=O)—O—, —NH—C(=S)—O—, —NH—C(=NH)—O—, —NH—C(=O)—S—, —NH—C(=S)—S—, —NH—C(=NH)—S—, —NH—C(=O)—NH—, —NH—C(=S)—NH—, —NH—C(=NH)—NH—, —O—C(=O)—NH—, —O—C(=S)—NH—, —O—C(=NH)—NH—, —S—C(=O)—NH—, —S—C(=S)—NH—, —S—C(=NH)—NH—, preferably from the group consisting of —C(=O)—NH—, —NH—C(=O)—, —O—C(=O)—NH—, —NH—C(=O)—O—, and —NH—C(=O)—NH—, more preferably from the group consisting of —C(=O)—NH— and —NH—C(=O)—, and x is an integer from 2 to 6. Preferably, the multifunctional cyclic or polycyclic and/or branched moiety is as defined above. According to a preferred embodiment, the polymer aggregating segment(s) 11, 12 and the additive aggregating segment 21 each comprise a group with the structure $D(-C(=O)-NH-)_3$ or $D(-NH-C(=O)-)_3$, wherein D is a benzene or a cyclohexane or a 1,3,5-triazine core.

The polymer aggregating segment(s) 11, 12 and the additive aggregating segment 21 can be chosen to be chiral or achiral. If the polymer aggregating segment(s) 11, 12 and the additive aggregating segment 21 are linear, they are preferably chiral. It is believed that the co-assembly of linear chiral segments into extended nanostructures is associated with the emergence of supramolecular helicity, which suppresses lateral interactions and thus supports the formation of nanostructures with only one extended dimension. If the chiral or achiral polymer aggregating segment(s) 11, 12 and the additive aggregating segment 21 are based on a cyclic or polycyclic and/or branched core, this core should be chosen so as to favor the formation of nanostructures with only one extended dimension. In either case, this formation of nanostructures with only one extended dimension is deemed favorable because it favors dispersion of the aggregates 31 formed from the polymer aggregating segments 11, 12 and the additive aggregating segment 21 in the polyester matrix and disfavors the possibility for the aggregating additive 20 to crystallize in the matrix based on the self-assembly of its at least one additive aggregating segment 21 without an interaction with the polymer aggregating segments 11, 12, which would result in phase segregation and inferior macroscopic properties.

For the functionalized polymer 10 according to the invention, the aforementioned features of the polymer aggregating segments 11, 12 likewise apply.

The Composition

The polymer aggregating segment(s) 11, 12 and the additive aggregating segment 21 are designed such that they can form aggregates 31 that contain polymer aggregating segments 11, 12 and additive aggregating segments 21. Preferably, the aggregates 31 are formed by hydrogen bonding. According to an embodiment of the invention, aggregates 31 that contain polymer aggregating segments 11, 12 and additive aggregating segments 21 are formed in the composition. The aggregates 31 may in particular be formed in the composition during preparation of the composition. More particularly, the aggregates 31 may be formed during mixing of the functionalized polymer 10 and the aggregating additive 20 and optional further components. Preferably, the mixing is conducted in solution or in the melt. Thus, according to an embodiment of the invention, the composition contains aggregates 31 that contain polymer aggregating segments 11, 12 and additive aggregating segments 21.

Preferably, the aggregates 31 extend in one or in two dimensions, in particular in one dimension. An aggregate 31 that extends in one or in two dimensions may in particular have a large number, more particularly at least 30 or at least 50, of repeating units in this dimension or in these dimensions. On the other hand, an aggregate 31 that extends in one or in two dimensions may in particular have in the dimensions or in the dimension in that it does not extend, a small number, more particularly less than 5, of repeating units, in particular 2 or 1 repeating units.

The repeating units in this case may in particular be the polymer aggregating segments 11, 12 and the additive aggregating segment 21. If the polymer aggregating segments 11, 12 and the additive aggregating segment 21 are linear, the structure may be a tape or a ladder either of which may be twisted, in which the polymer aggregating segments 11, 12 and the additive aggregating segments 21 form the rungs of the ladder. Two or more such tapes or ladders may further aggregate with their faces to form a fibrillar aggregate. According to an embodiment, the aggregates 31 are tape-like structures. According to another embodiment, the aggregates 31 are fibrillar aggregates.

The tape-like or fibrillar aggregates 31 may be extended in one dimension, in particular they may have one characteristic length on the length scale above 50 nm, more particularly above 100 nm. In the other two dimensions, the size of the tape-like or fibrillar aggregates 31 may be limited by the small number of repeating units, in particular less than 5 repeating units, more particularly 2 or 1 repeating units. Accordingly, the tape-like or fibrillar aggregates 31 may have a diameter of below 20 nm, in particular below 10 nm in the other two dimensions.

In another embodiment, the polymer aggregating segments 11, 12 and the additive aggregating segment 21 give rise to a lamellar structure that extends in two dimensions. According to this embodiment, the aggregates 31 are lamellar structures. The lamellar structures may in particular have two characteristic lengths on the length scale above 50 nm, in particular above 100 nm. In the other dimension, the size of the lamellar aggregates 31 may be limited by the small number of repeating units, in particular less than 5 repeating units, more particularly 2 or 1 repeating units. Accordingly, the lamellar aggregates 31 may have a thickness below 20 nm, in particular below 10 nm. Both for the tape-like or fibrillary aggregates 31 and for the lamellar aggregates 31, the repeating units may in particular be the polymer aggregating segments 11, 12 and the additive aggregating segment 21.

Preferably, at least 50 wt %, more preferably at least 60 wt % or at least 70 wt % or at least 80 wt % or at least 90 wt % of the aggregating additive 20, in each case based on the total weight of the aggregating additive 20 in the composition, is present in the composition as part of aggregates 31 that also contain polymer aggregating segments 11, 12.

The composition according to the invention contains the functionalized polymer 10 and the aggregating additive 20. The composition may consist of the functionalized polymer 10 and the aggregating additive 20. The composition may contain only one type of aggregating additive 20 or several different types of aggregating additives 20 that are as described herein. In addition, the composition may contain a further polymer and/or other additives. The composition may in particular contain a non-functionalized polyester. If the composition contains a non-functionalized polyester, it is preferably miscible with or identical to the polyester segment 13. According to an embodiment of the invention, the composition contains a non-functionalized polyester selected from the group consisting of poly(ethylene terephthalate) (PET), poly(butylene terephthalate) (PBT), poly(ethylene furanoate) (PEF), poly(butylene furanoate) (PBF), poly(trimethylene terephthalate) (PTT), poly(ethylene naphthalate) (PEN), poly(butylene adipate terephthalate) (PBAT), poly(butylene-sebacate-co-butylene terephthalate) (PBSeT), poly(butylene succinate) (PBS), poly(ethylene succinate) (PES), poly(butylene succinate adipate) (PBSA), poly(butylene succinate-co-butylene terephthalate) (PBST), poly(lactic acid) (PLA), poly(L-lactic acid) (PLLA), poly(D-lactic acid) (PDLA), poly(DL-lactic acid) (PDLLA), poly(glycolic acid) (PGA), poly(caprolactone) (PCL), poly(hydroxybutyrate) (P3HB), poly(hydroxybutyrate-co-hydroxyhexanoate) (PHBH), poly(3-hydroxybutyrate-co-3-hydroxyvalerate) (PHBV), and mixtures and copolymers thereof. The composition may also contain a further additive selected from the group consisting of inorganic fillers, organic fillers, pigments, dyes, flame retardants, weathering agents, antioxidants and mixtures thereof. If the composition contains a further polymer, this polymer is preferably of the same type as the polyester segment 13 of the functionalized polymer 10. For example, if the polyester segment 13 of the functionalized polymer 10 is a poly(caprolactone), the further polymer is preferably a poly(caprolactone). For the molecular weight of the further polymer, the provisions concerning the polyester segment 13 shall apply.

The composition according to the invention may contain the functionalized polymer 10 in different amounts. Thus, the composition may contain the functionalized polymer 10 in an amount of 10 to 99 wt. %, in particular 20 to 99.9 wt. % or, in particular 30 to 99.9 wt. % or 40 to 99.9 wt. % or 50 to 99.9 wt. % or 60 to 99.9 wt. % or 60 to 99 wt. % or 60 to 98 wt. % or 60 to 97 wt. % or 60 to 96 wt. % or 60 to 95 wt. % or 70 to 95 wt. % or 80 to 95 wt. %, based on the total weight of the composition. The composition may contain the functionalized polymer in the aforementioned amounts in particular in the case when the composition only contains the functionalized polymer 10 and the aggregating additive 20.

The composition may also contain the functionalized polymer 10 in an amount of 10 to 99.9 wt. %, in particular 10 to 99 wt. % or 10 to 95 wt. % or 10 to 90 wt. % or 10 to 85 wt. % or 10 to 80 wt. % or 10 to 75 wt. % or 15 to 75 wt. % or 15 to 70 wt. % or 15 to 65 wt. % or 15 to 60 wt. % or 15 to 55 wt. % or 15 to 50 wt. %, based on the total weight of the composition. The composition may contain the functionalized polymer in the aforementioned amounts in particular in the case when the composition contains further components in addition to the functionalized polymer 10 and the aggregating additive 20.

The composition may contain the aggregating additive 20 in different amounts. Preferably, the composition comprises 20 wt. % or less, in particular 15 wt. % or less or 10 wt. % or less or 8 wt. % or less or 6 wt. % or less or 5 wt. % or less or 4 wt. % or less or 3 wt. % or less or 2 wt. % or less, based on the total weight of the composition. According to another embodiment of the invention, the composition comprises the aggregating additive in an amount from 0.1 to 20 wt %, more preferably from 0.1 to 10 wt %, even more preferably from 0.1 to 5 wt %, based on the total weight of the composition.

The composition may contain a non-functionalized polyester in different amounts. According to an embodiment of the invention, the composition contains a non-functionalized polyester in an amount of 10 wt. % or more, 20 wt. % or more, 30 wt. % or more, 40 wt. % or more, or 50 wt. % or more, based on the total weight of the composition.

An important parameter for the composition according to the invention is the total concentration of the polymer aggregating segments 11, 12 and the additive aggregating segment 21 in the composition. The total concentration of the polymer aggregating segments 11, 12 and the additive aggregating segment 21 is calculated as Total concentration of the polymer aggregating segments 11, 12 and the additive aggregating segment 21= (Weight of the polymer aggregating segments 11, 12 in the composition+weight of the additive aggregating segment 21 in the composition)/(total weight of the composition).

Preferably, the total concentration of the polymer aggregating segments 11, 12 and the additive aggregating segment 21 in the composition ranges from 0.1 wt % to 20 wt %, preferably from 1 wt % to 20 wt % or from 1 wt % to 15 wt % of from 1 wt % to 10 wt % or from 1 wt % to 5 wt %.

Preferred Embodiments

According to a preferred embodiment, the invention provides for a composition containing
a. a functionalized polymer 10 that comprises at least one polyester segment 13 and at least one, in particular at least two, polymer aggregating segment 11, 12 capable of forming non-covalent bonds based on a supramolecular interaction,
b. an aggregating additive 20 that comprises at least one additive aggregating segment 21 capable of forming non-covalent bonds based on the same supramolecular interaction as the polymer aggregating segments 11, 12,
wherein the polymer aggregating segment 11, 12 and the additive aggregating segment 21 are ditopic,
wherein the polymer aggregating segment 11, 12 and the additive aggregating segment 21 are designed such that they can form aggregates 31 that contain polymer aggregating segments 11, 12 and additive aggregating segments 21, wherein the polyester segment 13 has a number average molecular weight of from 10'000 g/mol to 500'000 g, and
wherein the composition contains the functionalized polymer 10 in an amount of from 10 wt. % to 99.9 wt. %, based on the total weight of the composition.

According to another preferred embodiment, the invention provides for a composition containing
a. a functionalized polymer 10 that comprises at least one polyester segment 13 and at least two polymer aggregating segments 11, 12 capable of forming hydrogen bonds,
b. an aggregating additive 20 that comprises at least one additive aggregating segment 21 capable of forming hydrogen bonds,
wherein the polymer aggregating segment 11, 12 and the additive aggregating segment 21 are preferably ditopic,
wherein the polymer aggregating segment 11, 12 and the additive aggregating segment 21 are designed such that they can form aggregates 31 that contain polymer aggregating segments 11, 12 and additive aggregating segments 21, and wherein the polyester segment 13 has a number average molecular weight of from 10'000 g/mol to 500'000 g.

According to another preferred embodiment, the invention provides for a composition containing
a. a functionalized polymer 10 that comprises at least one polyester segment 13 and at least one, in particular at least two, polymer aggregating segment 11, 12 capable of forming non-covalent bonds based on a supramolecular interaction,
b. an aggregating additive 20 that comprises at least one additive aggregating segment 21 capable of forming non-covalent bonds based on the same supramolecular interaction as the polymer aggregating segments 11, 12,
wherein the polymer aggregating segment 11, 12 and the additive aggregating segment 21 are ditopic,
wherein the polymer aggregating segment 11, 12 and the additive aggregating segment 21 are designed such that they can form aggregates 31 that contain polymer aggregating segments 11, 12 and additive aggregating segments 21, wherein the polyester segment 13 has a number average molecular weight of from 10'000 g/mol to 500'000 g/mol, and
wherein the polyester segment 13 is poly(epsilon-caprolactone).

According to another preferred embodiment, the invention provides for a composition containing
a. a functionalized polymer 10 that comprises at least one polyester segment 13 and at least one, in particular at least two, polymer aggregating segment 11, 12 capable of forming non-covalent bonds based on a supramolecular interaction,
b. an aggregating additive 20 that comprises at least one additive aggregating segment 21 capable of forming non-covalent bonds based on the same supramolecular interaction as the polymer aggregating segments 11, 12,
wherein the polymer aggregating segment 11, 12 and the additive aggregating segment 21 are ditopic,
wherein the polymer aggregating segment 11, 12 and the additive aggregating segment 21 are designed such that they can form aggregates 31 that contain polymer aggregating segments 11, 12 and additive aggregating segments 21, and wherein the polyester segment 13 has a number average molecular weight of from 55'000 g/mol to 95'000 g/mol.

According to another preferred embodiment, the invention provides for a composition containing
a. a functionalized polymer 10 that comprises at least one polyester segment 13 and at least one, in particular at least two, polymer aggregating segment 11, 12 capable of forming non-covalent bonds based on a supramolecular interaction,
b. an aggregating additive 20 that comprises at least one additive aggregating segment 21 capable of forming non-covalent bonds based on the same supramolecular interaction as the polymer aggregating segments 11, 12,
wherein the polymer aggregating segment 11, 12 and the additive aggregating segment 21 are ditopic,
wherein the polymer aggregating segment 11, 12 and the additive aggregating segment 21 are designed such that they can form aggregates 31 that contain polymer aggregating segments 11, 12 and additive aggregating segments 21, wherein the polyester segment 13 has a number average molecular weight of from 10'000 g/mol to 500'000 g/mol, and wherein the composition contains a non-functionalized polyester.

According to another preferred embodiment, the invention provides for a composition containing a. a functionalized polymer 10 that comprises at least one polyester segment 13 and at least one, in particular at least two, polymer aggregating segment 11, 12 capable of forming non-covalent bonds based on a supramolecular interaction, b. an aggregating additive 20 that comprises at least one additive aggregating segment 21 capable of forming non-covalent bonds based on the same supramolecular interaction as the polymer aggregating segments 11, 12, wherein the polymer aggregating segment 11, 12 and the additive aggregating segment 21 are ditopic, wherein the polymer aggregating segment 11, 12 and the additive aggregating segment 21 are designed such that they can form aggregates 31 that contain polymer aggregating segments 11, 12 and additive aggregating segments 21, wherein the polyester segment 13 has a number average molecular weight of from 10'000 g/mol to 500'000 g/mol, and wherein the composition contains a further additive selected from the group consisting of inorganic fillers, organic fillers, pigments, dyes, flame retardants, weathering agents, antioxidants and mixtures thereof.

Preferably, in the preferred embodiments above, the polymer aggregating segment(s) 11, 12 and the additive aggregating segment 21 are capable of hydrogen bonding, in particular they independently comprise 2 to 4 peptide (—C(=O)—NH—) or amide (—C(=O)—NH—) groups. Such aggregating segments have proven to yield compositions that can be processed in flexible ways and yield materials with improved mechanical properties, in particular at room temperature.

Further, the details described above for the functionalized polymer 10, the aggregating additives 20, the polymer aggregating segment(s) 11, 12, the additive aggregating segments 21, and the composition also apply to the preferred embodiments above. Moreover, more specific examples of aggregating additives 20, functionalized polymers 10, and compositions thereof are described below.

According to a preferred embodiment of the invention, the aggregating additive 20 has the structure R'—X'—R" where X' is the additive aggregating segment 21 capable of forming non-covalent bonds, and R' and R" are terminal groups 22 that preferably serve to provide solubility of the aggregating additive 20 in the composition, more preferably, R' and R" are selected from the additional groups 22 listed above.

According to another preferred embodiment of the invention, the aggregating additive 20 has the structure $R^{20}$-$A^1$-$U^1$—C(=O)—$R^{21}$, wherein $R^{20}$ is a branched alkyl group selected from the group consisting of 2-ethylhexyl group, 2-butyloctyl group, 2-hexyldecyl group, 2-octyldodecyl group, 2-decyltetradecyl, 2-hexyloctanyl, 2-octyldecyl, 1-methylethyl, 1-ethylpropyl, 1-propylbutyl, 1-butylpentyl, 1-pentylhexyl, 1-hexylheptyl, 1-heptyloctyl, 1-octylnonyl, 1-nonyldocyl, 1-docylundecyl, 1-undecyldodecyl, and 1-dodecyltridecyl, preferably a 2-ethylhexyl group or a 2-octyldodecyl group, $A^1$ is a covalent bond, —C(=O)—, —O— or —NH—, preferably —NH—, $U^1$ is an oligopeptide containing 1 to 5 natural and/or synthetic amino acids, in particular alanine, glycine, beta-alanine, 3-aminopropanoic acid, 4-aminobutanoic acid, 5-aminopentanoic acid, 6-aminohexanoic acid, p-aminobenzoic acid, or m-aminobenzoic acid, preferably containing 2 to 5 alanine, and $R^{21}$ is selected from the group consisting of methyl group, ethyl group, propyl group, butyl group, pentyl group, and hexyl group, preferably a methyl group.

According to another preferred embodiment of the invention, the aggregating additive 20 has the structure $R^{20}$-$A^1$-$U^2$—$B^1$—$R^{21}$, wherein $R^{20}$, $A^1$ and $R^{21}$ are as defined above, $B^1$ is selected from the group consisting of a covalent bond, —C(=O)—, —NH—, and —O—, and $U^2$ is an oligoamide containing 1 to 5 repeating units made up from diacids and diamines, preferably made up from malonic acid, succinic acid, glutaric acid, adipic acid, pimelic acid, suberic acid, azelaic acid, sebacoic acid, undecandedioic acid, dodecanedioic acid, tridecanedioic acid, tetradecanedioic acid, p-terephthalic acid, m-terephthalic acid, napthalene-2,6-dicarboxylic acid, napthalene-1,5-dicarboxylic acid, 1,1'-biphenyl-4,4'-dicarboxylic acid, tetramethylene diamine, pentamethylene diamine, hexamethylene diamine, heptamethylene diamine, octamethylene diamine, nonamethylene diamine, decamethylene diamine, p-phenylene diamine, m-phenylene diamine, 1,3-bis(aminomethyl)benzene, 1,4-bis(aminomethyl)benzene, 1,3-bis(aminomethyl)cyclohexane, 1,4-bis(aminomethyl)cyclohexane, and 4,4'-diamino-1,1'-biphenyl.

According to another preferred embodiment of the invention, the aggregating additive 20 has the structure $R^{20}$-$A^2$-$U^3$—$B^2$—$R^{21}$, wherein $R^{20}$, $R^{21}$ are as defined above, $A^2$ is selected from the group consisting of a covalent bond, —C(=O)—, —NH—, and —O—, preferably —NH— or —O—, $B^2$ is selected from the group consisting of a covalent bond, —C(=O)—, —NH—, and —O—, preferably —NH— or —O—, and $U^3$ is an oligourethane containing 1 to 5 repeating units made up from diisocyanates and diols, preferably made up from hexamethylene diisocyanate, toluene diisocyanate, diphenylmethylene diisocyanate, ethanediol, propane-1,2-diol, propane-1,3-diol, butane-1,4-diol, pentane-1,5-diol, benzene-1,4-diol, and bisphenol A.

According to another preferred embodiment of the invention, the aggregating additive 20 has the structure $R^{20}$-$A^2$-$U^4$—$B^2$—$R^{21}$, wherein $R^{20}$, $A^2$, $B^2$, and $R^{21}$ are as defined above, and $U^4$ is an oligourea containing 2 to 5 repeating units made up from diisocyanates and diamines, preferably made up from hexamethylene diisocyanate, toluene diisocyanate, diphenylmethylene diisocyanate, tetramethylene diamine, pentamethylene diamine, hexamethylene diamine, heptamethylene diamine, octamethylene diamine, nonamethylene diamine, decamethylene diamine, p-phenylene diamine, m-phenylene diamine, 1,3-bis(aminomethyl)benzene, 1,4-bis(aminomethyl)benzene, 1,3-bis(aminomethyl)cyclohexane, 1,4-bis(aminomethyl)cyclohexane, and 4,4'-diamino-1,1'-biphenyl.

According to another preferred embodiment of the invention, the aggregating additive 20 has the structure $D^1(-Z^1-R^{22})_3$, wherein each $R^{22}$ is selected from the group consisting of methyl group, ethyl group, propyl group, butyl group, pentyl group, hexyl group, heptyl group, octyl group, nonyl group, decyl group, undecyl group, dodecyl group, phenyl group, diisopropylphenyl group, di-tert.-butylphenyl group, benzyl group, diisopropylbenzyl group, di-tert.-butylbenzyl group, 2-ethylhexyl group, 2-butyloctyl group, 2-hexyldecyl group, 2-octyldodecyl group, 2-decyltetradecyl group, 2-hexyloctanyl group, 2-octyldecyl group, 1-methylethyl group, 1-ethylpropyl group, 1-propylbutyl group, 1-butylpentyl group, 1-pentylhexyl group, 1-hexylheptyl group, 1-heptyloctyl group, 1-octylnonyl group, 1-nonyldocyl group, 1-docylundecyl group, 1-undecyldodecyl group, and 1-dodecyltridecyl group, preferably selected from the group consisting of 2-ethylhexyl group, 2-butyloctyl group, 2-hexyldecyl group, 2-octyldodecyl group, 1-pentylhexyl group, 1-hexylheptyl group, and 1-heptyloctyl group, more preferably a 2-octyldodecyl group, $D^1$ is a benzene or cyclohexane or 1,3,5-triazine moiety, preferably a benzene core, and $Z^1$ is selected from the group consisting of $-C(=O)-NH-$, $-NH-C(=O)-$, $-NH-C(=O)-O-$, $-O-C(=O)-NH-$, and $-NH-C(=O)-NH-$, preferably $-C(=O)-NH-$ or $-NH-C(=O)-$.

According to another preferred embodiment of the invention, the functionalized polymer 10 has the structure $R^{21}-B^1-U^1-A^1-Q^1-A^1-U^1-B^1-R^{21}$ wherein $R^{21}$, $U^1$, $A^1$, and $B^1$ are as defined above, and $Q^1$ is a polyester segment with a number average molecular weight from 20'000 g/mol to 500'000 g/mol, in particular from 55'000 g/mol to 95'000 g/mol, preferably selected from the group consisting of poly(ethylene terephthalate) (PET), poly(butylene terephthalate) (PBT), poly(ethylene furanoate) (PEF), poly(butylene furanoate) (PBF), poly(trimethylene terephthalate) (PTT), poly(ethylene naphthalate) (PEN), poly(butylene adipate terephthalate) (PBAT), poly(butylene-sebacate-co-butylene terephthalate) (PBSeT), poly(butylene succinate) (PBS), poly(ethylene succinate) (PES), poly(butylene succinate adipate) (PBSA), poly(butylene succinate-co-butylene terephthalate) (PBST), poly(lactic acid) (PLA), poly(L-lactic acid) (PLLA), poly(D-lactic acid) (PDLA), poly(DL-lactic acid) (PDLLA), poly(glycolic acid) (PGA), poly(caprolactone) (PCL), poly(hydroxybutyrate) (P3HB), poly(hydroxybutyrate-co-hydroxyhexanoate) (PHBH), poly(3-hydroxybutyrate-co-3-hydroxyvalerate) (PHBV), and copolymers thereof. More preferably, $Q^1$ is a poly(epsilon-caprolactone) segment with a number average molecular weight from 20'000 g/mol to 500'000 g/mol, in particular from 55'000 g/mol to 95'000 g/mol.

According to another preferred embodiment of the invention, the functionalized polymer 10 has the structure $R^{21}-B^1-U^2-A^1-Q^1-A^1-U^2-B^1-R^{21}$, wherein $R^{21}$, $U^2$, $A^1$, $B^1$, and $Q^1$ are as defined above.

According to another preferred embodiment of the invention, the functionalized polymer 10 has the structure $R^{21}-B^2-U^3-A^2-Q^1-A^2-U^3-B^2-R^{21}$, wherein $R^{21}$, $U^3$, $A^2$, $B^2$, and $Q^1$ are as defined above.

According to another preferred embodiment of the invention, the functionalized polymer 10 has the structure $R^{21}-B^2-U^4-A^2-Q^1-A^2-U^4-B^2-R^{21}$, wherein $R^{21}$, $U^4$, $A^2$, $B^2$, and $Q^1$ are as defined above.

According to another preferred embodiment of the invention, the functionalized polymer 10 has the structure $(R^{22}-Z^1-)_2 D^1-Z^2-Q^1-Z^1-D^1(-Z^2-R^{22})_2$, wherein $R^{22}$, $Z^1$, $D^1$, and $Q^1$ are as defined above and $Z^2$ is selected from the group consisting of $-NH-C(=O)-$, $-C(=O)-NH-$, $-O-C(=O)-NH-$, $-NH-C(=O)-O-$, and $-NH-C(=O)-NH-$, preferably $-NH-C(=O)-$ or $-C(=O)-NH-$.

According to another preferred embodiment of the invention, the invention provides a composition that contains an aggregating additive 20 with the structure $R^{20}-A^1-U^1-C(=O)-R^{21}$, wherein $R^{20}$, $A^1$, $U^1$, and $R^{21}$ are as defined above, and a functionalized polymer 10 with the structure $R^{21}-B^1-U^1-A^1-Q^1-A^1-U^1-B^1-R^{21}$, wherein $R^{21}$, $U^1$, $A^1$, $B^1$, and $Q^1$ are as defined above.

According to another preferred embodiment of the invention, the invention provides a composition that contains an aggregating additive 20 with the structure $R^{20}-A^1-U^2-B^1-R^{21}$, wherein $R^{10}$, $A^1$, $B^1$, $U^2$, and $R^{11}$ are as defined above, and a functionalized polymer 10 with the structure $R^{21}-B^1-U^2-A^1-Q^1-A^1-U^2-B^1-R^{21}$, wherein $R^{21}$, $U^2$, $A^1$, $B^1$, and $Q^1$ are as defined above.

According to another preferred embodiment of the invention, the invention provides a composition that contains an aggregating additive 20 with the structure $R^{20}-A^2-U^3-B^2-R^{21}$, wherein $R^{20}$, $A^2$, $B^2$, $U^3$, and $R^{21}$ are as defined above, and a functionalized polymer 10 with the structure $R^{21}-B^2-U^3-A^2-Q^1-A^2-U^3-B^2-R^{21}$, wherein $R^{21}$, $U^3$, $A^2$, $B^2$, and $Q^1$ are as defined above.

According to another preferred embodiment of the invention, the invention provides a composition that contains an aggregating additive 20 with the structure $R^{20}-A^2-U^4-B^2-R^{21}$, wherein $R^{20}$, $A^2$, $B^2$, $U^4$, and $R^{21}$ are as defined above, and a functionalized polymer 10 with the structure $R^{21}-B^2-U^4-A^2-Q^1-A^2-U^4-B^2-R^{21}$, wherein $R^{21}$, $U^4$, $A^2$, $B^2$, and $Q^1$ are as defined above.

According to another preferred embodiment of the invention, the invention provides a composition that contains an aggregating additive 20 with the structure $D^1(-Z^1-R^{22})_3$, wherein $R^{22}$, $Z^1$, and $D^1$ are as defined above, and a functionalized polymer 10 with the structure $(R^{22}-Z^1-)_2 D^1-Z^2-Q^1-Z^1-D^1(-Z^2-R^{22})_2$, wherein $R^{22}$, $Z^1$, $Z^2$, $D^1$, and $Q^1$ are as defined above.

In the preferred embodiments of compositions according to the invention listed above, the composition may in particular also contain an additional polymer selected from the group consisting of poly(ethylene terephthalate) (PET), poly(butylene terephthalate) (PBT), poly(ethylene furanoate) (PEF), poly(butylene furanoate) (PBF), poly(trimethylene terephthalate) (PTT), poly(ethylene naphthalate) (PEN), poly(butylene adipate terephthalate) (PBAT), poly(butylene-sebacate-co-butylene terephthalate) (PBSeT), poly(butylene succinate) (PBS), poly(ethylene succinate) (PES), poly(butylene succinate adipate) (PBSA), poly(butylene succinate-co-butylene terephthalate) (PBST), poly(lactic acid) (PLA), poly(L-lactic acid) (PLLA), poly(D-lactic acid) (PDLA), poly(DL-lactic acid) (PDLLA), poly(glycolic acid) (PGA), poly(caprolactone) (PCL), poly(hydroxybutyrate)

(P3HB), poly(hydroxybutyrate-co-hydroxyhexanoate) (PHBH), poly(3-hydroxybutyrate-co-3-hydroxyvalerate) (PHBV), and mixtures and copolymers thereof. Preferably, the additional polymer is miscible with the polyester segment $Q^1$ or the same polymer. Thus, if for example $Q^1$ is poly(epsilon-caprolactone), the additional polymer is preferably also poly(epsilon-caprolactone).

Other Aspects of the Invention

The invention also provides for a functionalized polymer 10 that comprises at least one polyester segment 13 and at least two polymer aggregating segments 11, 12 capable of forming non-covalent bonds based on a supramolecular interaction, wherein the polymer aggregating segments 11, 12 are ditopic and designed such that they can form aggregates and wherein the polyester segment 13 has a number average molecular weight of from 10'000 g/mol to 500'000 g/mol. For this functionalized polymer 10, the provisions described above for the functionalized polymer 10 of the composition according to the invention apply correspondingly.

The invention also provides for a method for the preparation of sheets, films, fibers, or molded parts comprising providing the composition according to the invention or the functionalized polymer 10 according to the invention and forming the sheets, films, fibers, or molded parts by applying thermal and/or mechanical energy.

The method steps provided above may be conducted in any order, but are preferably conducted in the order given above.

According to an embodiment of the method of the invention, the sheets, films, fibers, or molded parts are prepared by the application of shearing and/or stretching forces.

Shearing and/or stretching forces may be applied in the method according to the invention by t-die sheet forming and/or subsequent sequential biaxial stretching or by subsequent thermoforming steps, in particular for the preparation of sheets.

Shearing and/or stretching forces may also be applied in the method according to the invention by film blowing method, in particular for the preparation of films.

Shearing and/or stretching forces may also be applied in the method according to the invention by melt spinning, in particular for the preparation of fibers.

Shearing and/or stretching forces may also be applied in the method according to the invention by injection molding, in particular for the preparation of molded parts.

During the preparation of the sheets, films, fibers, or molded parts in the method according to the invention, the polyester segment 13 is preferably oriented anisotropically. Thus, according to an embodiment of the method of the invention, the sheets, films, fibers, or molded parts have a polyester phase comprising the polyester segment (13), wherein the polyester phase has an orientation factor $<P_2>$ or 0.1 or more.

The orientation factor $<P_2>$ can be determined by means of wide-angle X-ray scattering (WAXS) from a crystallographic reflection or the amorphous halo. For example, in the case of the PCL, the reflections in the (110) planes are used. And the orientation factor for the reflection is calculated by the equation.

$$f_{110} = \frac{3\langle\cos^2\alpha_{110}\rangle - 1}{2} \quad (1)$$

Where $$\langle\cos^2\alpha_{110}\rangle = \frac{\int_0^\pi I(\alpha)\cos^2\alpha\, d\alpha}{\int_0^\pi I(\alpha)\cos\alpha\, d\alpha} \quad (2)$$

The above calculations are performed after correction the azimuthal angle of reflection for the flat detector using the following Polanyi equation $$\cos\alpha = \cos\theta_{110}\cos\vartheta \quad (3)$$

where $\theta_{110}$, $\vartheta$, and $\alpha$ denote the Bragg scattering angle of the 110 plane and the azimuthal angles before and after correction, respectively. By solving the eq 1, the $f_{110}$ values lies between the two extremes of −0.5 and 0. For a perfect orientation of the 110 plane with its normal perpendicular to the drawing direction, the $f_{110}$ would be −0.5, while for an isotropic sample in the randomly oriented state, the $f_{110}$ becomes 0.

Preferably, according to another embodiment of the method of the invention, the functionalized polymer 10, the aggregating additive 20 and, optionally, the non-functionalized polyester and/or a further additive such as a filler are mixed in solution or in the melt, in particular by applying thermal and/or mechanical energy, before forming the sheet, film, fiber, or molded part. Preferably, the mixing is conducted by extrusion, particular in the case of mixing in the melt.

According to another embodiment of the method of the invention, the composition is stretched unidirectionally or biaxially at elevated temperatures during the formation of the sheets, films, fibers, or molded parts.

Accordingly, the invention also provides for a sheet, film, fiber or molded part comprising the composition according to the invention or a functionalized polymer 10 according to the invention.

Preferably, the sheet, film, fiber, of molded part is foamed.

Preferably, in the sheet, film, fiber, or molded part, the polyester segment 13 is anisotropically oriented. Accordingly, the sheet, film, fiber, or molded part has a polyester phase comprising the polyester segment 13, wherein the polyester phase has an orientation factor $<P2>$ or 0.1 or more.

Specific examples of sheets, films, fibers, or molded parts in which the polyester segment 13 is anisotropically oriented can be found below.

The invention further provides for a sheet comprising a composition according to the invention or a functionalized polymer 10 according to the invention, wherein the sheet is prepared by, for example, t-die sheet forming and/or subsequent sequential biaxial stretching steps or subsequent thermoforming steps.

The invention further provides for a film comprising a composition according to the invention or a functionalized polymer 10 according to the invention, wherein the film is prepared by film blowing. In this case, the anisotropy of the polyester segment 13 can be controlled by changing the blow ratio.

The invention further provides for a fiber comprising a composition according to the invention or a functionalized polymer 10 according to the invention, wherein the fiber is prepared by melt spinning. The anisotropy of the polyester segment 13 can be controlled by changing the spinning speed and the subsequent drawing conditions.

The invention further provides for a molded part comprising a composition according to the invention or a functionalized polymer 10 according to the invention, wherein the molded part is prepared by injection molding. The anisotropy of the polyester segment 13 can be controlled by the shear flow alignment due to a velocity gradient of the resin in the mold.

The invention also provides for the use of the composition according to the invention or the functionalized polymer 10 according to the invention for the preparation of sheets, films, fibers, or molded parts.

The method of the present invention provides a general means of introducing reversible physical branching or physical crosslinking or physical chain extension into polyester-based materials without adverse consequences for flow properties. above a well-defined dissociation temperature of the aggregates of the aggregating segments 11, 12, 21, $T_d$, that may be chosen to be significantly higher than the upper solid-rubber or solid-liquid transition temperature of the base polyester, which may be a melting point or a glass transition temperature. This dissociation temperature $T_d$ lies preferentially in the range from 100° C. to 250° C. and more preferentially in the range from 150° C. to 250° C. to improve the thermomechanical properties and processing characteristics of the polyesters listed above.

The compositions according to the invention may have improved melt strength and/or melt elasticity over the corresponding unmodified base polyester, quantifiable as (i) an increase in the melt fracture strength at a fixed temperature above the melting point or the glass transition temperature of the base polyester using for example Gottfert "Rheotens" melt strength tester; (ii) the appearance of a rubbery plateau in oscillatory shear rheology at temperatures above the melting point or the glass transition temperature of the base polyester; (iii) an increase in the temperature of the crossover between the storage modulus and loss modulus characteristic of the high temperature limit of the rubbery plateau or melting transition in dynamic temperature scans at fixed frequency; (iv) an increase in the apparent extensional viscosity at a fixed temperature above the melting point or the glass transition temperature of the base polyester as determined by capillary rheometry; (v) any other technique that reflects the increased elastic character of the polyester in the temperature range from the melting point or the glass transition temperature of the base polyester to the dissociation temperature of the physical crosslinks or branch points.

The increased melt strength and/or melt elasticity of the compositions makes them more suitable for use in thermoforming applications than the unmodified base polyesters, whose linear forms in particular are well known from the state of the art to show poor melt strength and hence to be difficult to process by thermoforming, film blowing or physical and chemical foaming, for example. The benefits include a wider temperature processing window of the compositions according to the invention than for the base polyesters. The compositions according to the invention may be used in small and large part thermoforming such as in the production of items of food packaging such as margarine tubs, disposable beverage containers, or refrigerator liners, bathroom fittings and radar housing. They may show improved blow moulding characteristics, leading to reduced equipment costs, and facilitate the production of large blow moulded parts such as reservoirs and fuel tanks as an alternative to rotational moulding, for example. They may be foamed with a wider processing window than for the unmodified base polyesters using either physical or chemical blowing agents, providing foams with improved morphological and physical characteristics for insulation and packaging, such as reduced open cell content and reduced cell coalescence. Waste streams of many linear thermoplastic polyesters are presently difficult to recycle owing to a reduction in molecular weight during service. Use of the present invention to modify waste streams containing polyesters by improving their melt strength and/or melt elasticity, may facilitate the production of recycled objects by thermoforming, film blowing or physical and chemical foaming, for example.

The composition according to the invention can be used in particular for packaging, such as food packaging. The composition according to the invention can also be used for the manufacture of toys.

The introduction of reversible physical branching or physical crosslinking or physical chain extension into rigid or semi-rigid linear thermoplastic polymers provided by the present invention will hinder or prevent chain disentanglement under load at low loading rates at any temperature or at low to high loading rates in the upper range of service temperatures and during transient exposure to temperatures exceeding the range of service temperatures corresponding to long term use. Furthermore, the invention may extend the range of continuous use temperatures and resistance to transient temperature increases in amorphous thermoplastics as well as semicrystalline polymers. Introduction of reversible physical branching or physical crosslinking or physical chain extension that are thermally stable up to considerably higher temperatures than the base polyesters, may provide high temperature reinforcement, to temperature ranges from 100° C. to 250° C., preferably from 150° C. to 250° C., to thermoplastic polymers without compromising and possibly improving their processing characteristics. This will broaden their range of use in applications requiring exposure to high temperatures, such as under-hood automotive parts (semi-rigid hosing and ducts, manifolds, casings, gearwheels) sterilisable packaging and medical devices and electronics packaging, in which the use of thermoplastics is normally limited to more expensive and/or more expensive to process high temperature resistant polymers such as semiaromatic polycarbonates, polyamides, polysulphones, polyimides, polyesters or polyethers.

Improved heat resistance is important for elastomer applications such as O-ring seals and tubing in fuel, lubricant and hydraulic systems, radiator seals, valve stem seals, electrical connectors, hoses, diaphragms, gaskets and ducts, particularly in the automotive industry, where smaller, hotter engine compartments place increasingly stringent requirements on elastomer properties with respect both to continuous use temperatures and exposure to transient temperatures, but also in the electrical and electronics industries, biomedicine, aeronautics and other industries. The method of the present invention may provide a general means to introduce reversible physical crosslinking to chemically stable low glass transition polyesters, such that the resulting thermoplastic elastomer shows elastomeric behaviour in a temperature range whose lower limit is determined by the base polyester properties but whose upper limit is determined by the dissociation temperature of the low weight fraction of aggregates that give rise to the physical crosslinks, and lies preferably in a range from 100° C. to 250° C., in particular from 150° C. to 250° C., which is beyond the continuous use temperature of commodity heat resistant vulcanizates, exemplified by ethylene propylene diene monomer (EPDM, maximum continuous use temperature 150° C.) and competitive with more expensive high temperature vulcanizates, such as poly(dimethylsiloxane). Thanks to the well-defined dissociation temperature of the aggregates the improved thermoplastic elastomers may be advantageously processed using standard thermoplastic processing techniques, such as injection molding, extrusion, thermoforming or film blowing with short cycle times and recycled at temperatures above the dissociation temperature of the aggregates, contrary to permanently crosslinked vulcanizates, and may show improved high temperature compression set, strength and elongation at break compared with existing temperature resistant thermoplastic rubbers such as polyurethanes and polyamide elastomers that typically contain ill-defined rigid domains with broad dissociation transitions whose transition temperature depends on the volume of the domains, so that high temperature stability may only be obtained at the expense of the elastomeric properties.

FIG. 1 shows a schematic overview of how the composition according to the invention can be obtained from an exemplary combination of a functionalized polymer 10 that comprises a polyester segment 13 and two polymer aggregating segments 11, 12 capable of forming non-covalent bonds based on a supramolecular interaction as terminal groups and a matching aggregating additive 20 that comprises one additive aggregating segment 21 capable of forming non-covalent bonds based on the same supramolecular interaction as the polymer aggregating segments 11, 12 of the functionalized polymer 10. The polymer aggregating segments 11, 12 and the additive aggregating segment 21 are self-complementary in this case. The polymer aggregating segments 11, 12 and the additive aggregating segments 21 aggregate into aggregates 31 in the composition that contain both polymer aggregating segments 11, 12 of the functionalized polymer 10 and additive aggregating segments 21 of the aggregating additive 20. The aggregation is in this case cooperative.

EXAMPLES

The present invention will hereinafter be described in the form of examples. It should be borne in mind that the present invention is not limited to or by these examples without departing from the scope of the present invention. The characteristic values in the following examples were measured by the following methods.

Materials

Hydroxy-functional poly(epsilon-caprolactone) (HO-PCL-OH) ($M_n$=14'000, 80'000, Sigma-Aldrich); diisopropylethylamine (DIEA, TCI); benzotriazol-1-yl-oxytripyrrolidinophosphonium-hexafluorophosphat (PyBOP, GL Biochem (Shanghai) Ltd.); N-(9-Fluorenylmethoxycarbonyl)-glycine (GL Biochem (Shanghai) Ltd.); N-(9-Fluorenylmethoxycarbonyl)-L-alanine (GL Biochem (Shanghai) Ltd.); LiOH (Merck); 1-(3-dimethylaminopropyl)-3-ethylcarbodiimide hydrochloride (EDCl·HCl, Fluorochem); N,N'-dicyclohexylcarbodiimide (DCC, AlfaAesar); piperidine (Acros Organics). Solvents were of technical grade and distilled prior to use. Tetrahydrofuran (THF) was dried before use by a solvent purification system (PureSolv MD-5, Innovative Technology Inc.); dichloromethane (DCM); dimethylsulfoxide (DMSO); 1,1,2,2-tetrachloroethane (TCE); methanol (MeOH).

2-hexyldecylamine was synthesized according to a literature-known procedure [X. Guo, R. Ponce Ortiz, Y. Zheng, M.-G. Kim, S. Zhang, Y. Hu, G. Lu, A. Facchetti, T. J. Marks, J. Am. Chem. Soc. 2011, 133, 13685-13697]. 2-octyldodecylamine was synthesized according to a literature-known procedure [S. Liu, Z. Kan, S. Thomas, F. Cruciani, J-L. Brédas, P. M. Beaujuge, Angew. Chem. Int. Ed. 2016, 55, 12996-13000]; N-acetyl-L-alanyl-L-alanine and N-acetyl-glycyl-glycine were synthesized according to a literature-known procedure [R. J. Cox, H. Jenkins, J. A. Schouten, R. A. Stentiford, K. J. Wareing, J. Chem. Soc., Perkin Trans. 1 2000, 2023-2036]; 5-(methoxycarbonyl) isophthalic acid was synthesized according to a literature-known procedure [M. A. J. Veld, D. Haveman, A. R. A. Palmans, E. W. Meijer, Soft Matter 2011, 7, 524-531]; 4-(dimethylamino)pyridinium 4-toluenesulfonate (DPTS) was synthesized according to a literature-known procedure [J. S. Moore, S. I. Stupp, Macromolecules 1990, 23, 65-70].

Methods

Differential Scanning Calorimetry (DSC). DSC measurements were performed on a TA Instruments $Q^{100}$ calorimeter at a scanning rate of 10° C./min under a flow of nitrogen (50 mL/min). The data given for the polymer melting temperature, $T_m$, and the dissociation temperature of the aggregated segments, $T_d$, were obtained from the second heating scans. The corresponding polymer crystallization temperature, $T_c$, and the association temperature of the aggregated segments, $T_a$, were obtained from the first cooling scans.

Gel Permeation Chromatography (GPC). GPC measurements were performed on an Agilent 1260 Infinity GPC/SEC system with a refractive index detector. THF was used as the eluent.

Thermogravimetric Analysis (TGA). Thermogravimetric analyses were conducted on a PerkinElmer TGA 4000. Samples (3-11 mg) were dried under high vacuum for several days, and heated in the TGA chamber from 30 to 900° C. at a scanning rate of 10° C./min. The onset of decomposition is indicated by the temperature at which the mass loss was 10%.

Proton Nuclear Magnetic Resonance (H NMR) Spectroscopy. NMR spectroscopy was carried out at 298 K on a Bruker Avance III 400 spectrometer at a frequency of 400 MHz. The spectra were calibrated to the residual solvent peaks of DMSO-$d^6$ (2.50 ppm), $CDCl_3$ (7.26 ppm) or TCE-$d^2$ (6.00 ppm).

High-Resolution Mass Spectrometry (HRMS). HRMS was carried out on a Q-TOF Ultima (Waters) for ESI-TOF measurements.

Dynamic Shear Rheology. Rheology measurements were carried out on a parallel plate rheometer AR 2000 (TA Instruments). Aluminum plates of 15 mm were used, and the gap between the plates was in the range of 0.4-0.6 mm. All samples were loaded at temperatures in the range of 120-200° C. for 20 min in the rheometer prior to the measurements. Measurements were carried out from 200° C. to −60° C. at a cooling rate of 3° C./min, a fixed radial frequency of 1, 10, or 100 rad/s, and a strain amplitude of 0.1% during the complete measurements.

Ultimate Tensile Testing. All the samples were firstly subjected to a melt-extrusion process using a 5 mL microcompounder (MC 5, manufactured by Xplore) and then injection-molded to dogbone shaped tensile test bars using a 5.5 mL injection moulder 5.5 ml (IM 5.5, manufactured by Xplore).

Tensile tests were performed in accordance with ASTM D1708 standard at a cross-head speed of 25 mm/min on a Zwick Z10 Universal Testing Machine (UTM). At least three specimens were tested of a given composition. All tests were performed under ambient conditions. The following mechanical parameters were determined from the as-obtained stress-strain curves. The elastic modulus (E) was calculated as the slope of the linear region of the stress-strain curve. The yield strength (ay) is defined as the stress at which a specimen begins to deform plastically. The ultimate tensile strength (am) was determined as the maximum stress at which a specimen can withstand before failure. The strain at break (e) was determined as the ratio of extension to initial length. The tensile toughness (W) was determined by integration of the stress-strain curve until failure.

Orientation factor. The orientation factor <P2> of each specimen were determined by means of wide-angle X-ray scattering (WAXS) from the reflections in the (110) planes of the PCL crystal according to T. Kamal et al., *Macromolecules* 2012, 45, 8752.

Synthesis of Functionalized Polymers

Polymer 1: Ac-Ala$_3$-O-PCL-O-Ala$_3$-Ac ($M_n$=80'000

Synthesis: We synthesized the functional polymer Ac-Ala$_3$-O-PCL-O-Ala$_3$-Ac ($M_n$=80000), which comprises two polymer aggregating segments with the structure NH-Ala-Ala-Ac, by coupling amine-functionalized poly(ε-caprolactone) ($M_n$=80000) to N-acetyl-L-alanyl-L-alanine in a PyBOP-promoted peptide coupling reaction in THF as the solvent.

The amine-functionalized poly(ε-caprolactone) ($M_n$=80000) was synthesized by dissolving hydroxy-functional poly(ε-caprolactone) ($M_n$=80000) (30 g) in DCM (200 mL). N-(9-Fluorenylmethoxycarbonyl)-L-alanine (0.43 g, 1.41 mmol), DPTS (0.27 g, 0.94 mmol), and DCC (0.58 g, 2.82 mmol) were added, and the reaction mixture was stirred at room temperature for six days. The mixture was precipitated into MeOH. The precipitate was dried under high vacuum to yield Fmoc-Ala-O-PCL-O-Ala-Fmoc ($M_n$=80000) as a colorless solid (29 g, 97%). Characterization: 1H NMR (400 MHz, CDCl$_3$): δ=7.77 (d, 4H), 7.61 (m, 4H), 7.41 (m, 4H), 7.34 (m, 4H), 5.40 (d, 2H), 4.40 (m, 2H), 4.08 (t, 568H), 2.32 (t, 568H), 1.68 (m, 1148H), 1.41 (m, 568H) ppm.

Fmoc-Ala-O-PCL-O-Ala-Fmoc ($M_n$=80000) (28 g) was dissolved in DCM (200 mL) and piperidine (2.0 g) was added. The reaction mixture was stirred at room temperature for 1 day, then precipitated into MeOH (1.5 L) twice. The precipitate was washed with MeOH and hexane and was dried under high vacuum to yield H$_2$N-Ala-O-PCL-O-Ala-NH$_2$ ($M_n$=80000) as a colorless solid (26 g, 93%). Characterization: 1H NMR (400 MHz, CDCl$_3$): δ=8.70 (bs, 4H), 4.00 (t, 3725H), 2.23 (t, 3697H), 1.58 (m, 7572H), 1.35 (m, 3687H) ppm.

N-acetyl-L-alanyl-L-alanine (0.13 g, 0.66 mmol), DIEA (0.11 g, 0.83 mmol), and PyBOP (0.37 g, 0.72 mmol) were added to a solution of H$_2$N-Ala-O-PCL-O-Ala-NH$_2$ ($M_n$=80000) (22 g) in THF (380 mL). The reaction mixture was stirred at room temperature for 5 days, then precipitated twice into MeOH (1.5 L). The precipitate was collected, washed with hexane, and dried under high vacuum to yield Ac-Ala$_3$-O-PCL-O-Ala$_3$-Ac ($M_n$=80000) as a colorless solid (21 g, 95%). Characterization: 1H NMR (400 MHz, CDCl$_3$): δ=6.52 (m, 4H), 6.05 (m, 2H), 4.46 (m, 2H), 4.36 (m, 4H), 3.39 (t, 2273H), 2.24 (t, 2275H), 1.95 (s, 6H), 1.57 (m, 4667H), 1.34 (m, 2319H) ppm.

GPC: $M_n$=89500 g/mol; $M_w$=135600 g/mol; $D_M$=1.52. DSC: $T_m$=56.3° C., $T_c$=27.3° C.

Polymer 2: Ac-Gly$_3$-O-PCL-O-Gly$_3$-Ac ($M_n$=80000

Synthesis: We synthesized the functional polymer Ac-Gly$_3$-O-PCL-O-Gly$_3$-Ac ($M_n$=80000), which comprises two identical polymer aggregating segments with the structure NH-Gly-Gly-Ac, by coupling amine-functionalized poly(ε-caprolactone) ($M_n$=80000) to N-acetyl-glycyl-glycine in a PyBOP-promoted peptide coupling reaction in THF as the solvent.

The amine-functionalized poly(ε-caprolactone) ($M_n$=80000) was synthesized by dissolving hydroxy-functional poly(ε-caprolactone) ($M_n$=80000) (50 g) in DCM (300 mL). N-(9-Fluorenylmethoxycarbonyl)-glycine (0.61 g, 2.05 mmol), DPTS (0.29 g, 0.99 mmol), and a solution of EDCl·HCl (3.67 g, 19.1 mmol) in DCM (50 mL) were added, and the reaction mixture was stirred at room temperature for two days. The solution was concentrated in vacuum and precipitated into MeOH three times. The precipitate was dried under high vacuum to yield Fmoc-Gly-O-PCL-O-Gly-Fmoc ($M_n$=80000) as a colorless solid (46.6 g, 93%). Characterization: 1H NMR (400 MHz, CDCl$_3$): δ=7.76 (d, 4H), 7.59 (d, 4H), 7.39 (m, 4H), 7.30 (m, 4H), 5.35 (bs, 4H), 4.39 (d, 4H), 4.14 (m, 6H), 4.05 (t, 792H), 2.30 (t, 792H), 1.63 (m, 1612H), 1.36 (m, 792H) ppm.

Fmoc-Gly-O-PCL-O-Gly-Fmoc ($M_n$=80000) (45 g) was dissolved in DCM (800 mL) and piperidine (50 mL) was added. The reaction mixture was stirred at room temperature for 1 day, then concentrated under vacuum, and precipitated into MeOH (1.5 L) twice. The precipitate was washed with MeOH and Et$_2$O and was dried under high vacuum to yield H$_2$N-Gly-O-PCL-O-Gly-NH$_2$ ($M_n$=80000) as a colorless solid (43.4 g, 96%). Characterization: 1H NMR (400 MHz, CDCl$_3$): δ=9.39 (bs, 4H), 4.05 (t, 680H), 3.63 (m, 6H), 2.29 (t, 680H), 1.63 (m, 1356H), 1.36 (m, 680H) ppm.

N-Acetyl-glycyl-glycine (0.22 g, 1.26 mmol), DIEA (0.4 mL), and PyBOP (0.69 g, 1.33 mmol) were added to a solution of H$_2$N-Gly-O-PCL-O-Gly-NH$_2$ ($M_n$=80000) (10.0 g) in THF (200 mL). The reaction mixture was stirred at room temperature for 15 hours, then concentrated under vacuum, and precipitated twice into MeOH (1.5 L). The precipitate was collected, washed with MeOH, and dried under high vacuum to yield Ac-Gly$_3$-O-PCL-O-Gly$_3$-Ac ($M_n$=80000) as a colorless solid (7.92 g, 77%). Characterization: 1H NMR (400 MHz, CDCl$_3$): δ=6.98 (bs, 2H), 6.88 (bs, 2H), 6.56 (bs, 2H), 4.01 (t, 2292H), 3.62 (s, 4H), 2.26 (t, 22840H), 2.00 (s, 6H), 1.60 (m, 4618H), 1.34 (m, 2284H) ppm.

Polymer 3: BTA-O-PCL-O-BTA ($M_n$=80000

Synthesis: We synthesized the functional polymer BTA-O-PCL-O-BTA ($M_n$=80000), which comprises two identical polymer aggregating segments from the group of benzene-1,3,5-tricarboxamide, by coupling amine-functionalized poly(ε-caprolactone) ($M_n$=80000) to 3,5-bis(2-ethylhexyl)carbamoyl)benzoic acid in a PyBOP-promoted peptide coupling reaction in THF as the solvent.

3,5-bis(2-ethylhexyl)carbamoyl)benzoic acid was synthesized by suspending 5-(methoxycarbonyl)isophthalic acid (10.0 g, 44.0 mmol), 2-ethylhexan-1-amine (12.5 g, 96.3 mmol), and PyBOP (50.6 g, 97.2 mmol) in THF (250 mL). DIEA (40 mL) was added, and the reaction mixture was stirred at room temperature overnight and the volatiles were removed under vacuum. The residue was purified by column chromatography using hexane/ethyl acetate and DCM/MeOH (100:1) as eluent. The intermediate methyl 3,5-bis(2-ethylhexyl)carbamoyl)benzoate was obtained as a colorless solid. Characterization: 1H NMR (400 MHz, CDCl$_3$): δ=8.48 (d, 2H), 8.38 (t, 1H), 6.44 (t, 2H), 3.94 (s, 3H), 3.39 (m, 4H), 1.56 (m, 2H), 1.37 (m, 4H), 1.41-1.27 (m, 12H), 0.90 (m, 12H) ppm.

3,5-bis(2-ethylhexyl)carbamoyl)benzoate (5.58 g, 12.5 mmol) was dissolved in MeOH (60 mL). LiOH (6.84 g, 28.6 mmol) and water (10 mL) were added, and the reaction mixture was stirred at room temperature for 11 hours and then precipitated into 1 M HCl (0.4 L). The precipitate was collected, washed with water, and purified by column chromatography using ethyl acetate as eluent. The 3,5-bis(2-ethylhexyl)carbamoyl)benzoic acid was obtained as a colorless solid (5.22 g, 12.1 mmol, 97%). Characterization: 1H NMR (400 MHz, DMSO-d$^6$): δ=8.70 (t, 2H), 8.51 (s, 2H), 8.46 (s, 2H), 3.20 (t, 4H), 1.57 (m, 2H), 1.38-1.22 (m, 16H), 0.87 (m, 12H) ppm.

3,5-bis(2-ethylhexyl)carbamoyl)benzoic acid (0.27 g, 0.62 mmol), DIEA (0.4 mL), and PyBOP (0.71 g, 1.37 mmol) were added to a solution of H$_2$N-Gly-O-PCL-O-Gly-NH$_2$ (M$_n$=80000) (8.38 g) in THF (250 mL). The reaction mixture was stirred at room temperature for 4 days, then concentrated under vacuum, and precipitated twice into MeOH (1.25 L). The precipitate was collected, washed with MeOH, and dried under high vacuum to yield BTA-O-PCL-O-BTA (M$_n$=80000) as a colorless solid (8.4 g, >99%). Characterization: 1H NMR (400 MHz, CDCl$_3$): δ=8.33 (s, 4H), 8.32 (s, 2H), 7.13 (bs, 2H), 6.55 (bs, 4H), 4.02 (t, 1636H), 3.62 (s, 4H), 2.27 (t, 1640H), 1.61. (m, 3270H), 1.34 (m, 1652H), 0.87 (m, 24H) ppm.

Polymer 4: Ac-Ala$_3$-O-PCL-O-Ala$_3$-Ac (M$_n$=20000

Synthesis: We synthesized the functional polymer Ac-Ala$_3$-O-PCL-O-Ala$_3$-Ac (M$_n$=20000), which comprises two identical polymer aggregating segments with the structure NH-Ala-Ala-Ac, by coupling amine-functionalized poly(ε-caprolactone) (M$_n$=20000) to N-acetyl-L-alanyl in a PyBOP-promoted peptide coupling reaction in THF as the solvent.

To this end, the amine-functionalized poly(ε-caprolactone) (M$_n$=20000) was synthesized by dissolving hydroxy-functionalized poly(ε-caprolactone) (M$_n$=20000) (100 g) in THF (700 mL). N-(9-Fluorenylmethoxycarbonyl)-L-alanine (17.70 g, 113.6 mmol), DMAP (3.45 g, 28.2 mmol), and DCC (35.3 g, 170.9 mmol) were added, and the reaction mixture was stirred at room temperature for 3 days. The mixture was precipitated into MeOH. The precipitate was dried under high vacuum to yield Fmoc-Ala$_3$-O-PCL-O-Ala$_3$-Fmoc (M$_n$=20000) as a colorless solid (97 g, 97%). Characterization: 1H NMR (400 MHz, CDCl$_3$): δ=7.80 (d, 0.02H), 7.61 (m, 0.03H), 7.41 (m, 0.03H), 7.34 (m, 0.04H), 5.42 (bs, 0.01H), 4.40 (brs, 0.07H), 4.26 (brs, 0.10H), 4.08 (t, 1.98H), 2.32 (t, 2.00H), 1.68 (m, 4.26H), 1.41 (m, 2.13H) ppm.

Fmoc-Ala-O-PCL-O-Ala-Fmoc (M$_n$=20000) (95 g) was dissolved in DCM (400 mL) and piperidine (5.0 g) was added. The reaction mixture was stirred at room temperature for 1 day, then precipitated into MeOH (1.5 L) twice. The precipitate was washed with MeOH and hexane and was dried under high vacuum to yield H$_2$N-Ala-O-PCL-O-Ala-NH$_2$ (M$_n$=20000) as a colorless solid (79 g, 83%). Characterization: 1H NMR (400 MHz, CDCl$_3$): δ=4.09 (t, 1.94H), 3.92 (t, 0.03H), 3.57 (m, 0.02H), 2.33 (t, 2.00H), 1.67 (m, 4.26H), 1.41 (m, 2.16H) ppm.

N-(9-Fluorenylmethoxycarbonyl)-L-alanine (7.35 g, 47.2 mmol), DIEA (3.78 g, 28.5 mmol), and PyBOP (13.2 g, 25.7 mmol) were added to a solution of H$_2$N-Ala-O-PCL-O-Ala-NH$_2$ (M$_n$=20000) (70 g) in THF (700 mL). The reaction mixture was stirred at room temperature for 3 days, then precipitated twice into MeOH (1.2 L). The precipitate was collected, washed with hexane, and dried under high vacuum to yield Fmoc-Ala$_2$-O-PCL-O-Ala$_2$-Fmoc (M$_n$=20000) as a white solid (70 g, 99%). Characterization: 1H NMR (400 MHz, CDCl$_3$): δ=7.79 (d, 0.03H), 7.61 (d, 0.03H), 7.42 (m, 0.03H), 7.34 (m, 0.04H), 6.46 (brs, 0.01H), 5.45 (brs, 0.01H), 4.58 (t, 0.02H), 4.07 (t, 1.89H), 2.33 (t, 2.00H), 1.67 (m, 4.26H), 1.41 (m, 2.21H) ppm.

Fmoc-Ala$_2$-O-PCL-O-Ala$_2$-Fmoc (M$_n$=20000) (69 g) was dissolved in DCM (400 mL) and piperidine (5.0 g) was added. The reaction mixture was stirred at room temperature for 1 day, then precipitated into MeOH (1.5 L) twice. The precipitate was washed with MeOH and hexane and was dried under high vacuum to yield H$_2$N-Ala$_2$-O-PCL-O-Ala$_2$-NH$_2$ (M$_n$=20000) as a colorless solid (62 g, 90%). Characterization: 1H NMR (400 MHz, CDCl$_3$): δ=7.73 (brs, 0.01H), 4.59 (t, 0.01H), 4.09 (t, 2.06H), 2.34 (t, 2.00H), 1.67 (m, 3.98H), 1.41 (m, 2.34H) ppm.

N-acetyl-L-alanine (1.76 g, 13.4 mmol), DIEA (2.16 g, 16.7 mmol), and PyBOP (7.56 g, 14.5 mmol) were added to a solution of H$_2$N-Ala$_2$-O-PCL-O-Ala$_2$-NH$_2$ (M$_n$=20000) (40 g) in THF (500 mL). The reaction mixture was stirred at room temperature for 5 days, then precipitated twice into MeOH (1.5 L). The precipitate was collected, washed with hexane, and dried under high vacuum to yield Ac-Ala$_3$-O-PCL-O-Ala$_3$-Ac (M$_n$=20000) as a white solid (39 g, 98%). Characterization: 1H-NMR (400 MHz, CDCl$_3$): δ=6.60 (m, 0.02H), 6.13 (m, 0.01H), 4.47 (m, 0.04H), 4.09 (t, 1.90H), 2.33 (t, 2.00H), 2.04 (s, 0.07H), 1.67 (m, 3.94H), 1.41 (m, 2.14H) ppm; GPC: M$_n$=22200 g/mol; M$_w$=29300 g/mol; D$_M$=1.32. TGA: decomposition onset: 387° C. DSC: T$_m$=54.3° C., T$_c$=24.4° C., T$_d$=82° C. (determined from first heating curve), T$_a$=75° C.

Polymer 5: Ac-Ala$_2$-O-PCL-O-Ala$_2$-Ac (M$_n$=20000

Synthesis:

Acetyl chloride (0.88 g, 11.2 mmol), Pyridine (1.10 g, 13.9 mmol) were added to a solution of H$_2$N-Ala$_2$-O-PCL-O-Ala$_2$-NH$_2$ (M$_n$=20000) (20 g) in THF (300 mL). The reaction mixture was stirred at room temperature for 1 day, then precipitated into MeOH (0.8 L). The precipitate was collected, washed with MEOH, and dried under high vacuum to yield Ac-Ala$_2$-O-PCL-O-Ala$_2$-Ac (M$_n$=20000) as a colorless solid (17 g, 85%). Characterization: 1H-NMR (400 MHz, CDCl$_3$): δ=6.53 (m, 0.01H), 6.16 (m, 0.01H), 4.47 (m, 0.04H), 4.09 (t, 1.99H), 2.33 (t, 2.00H), 2.04 (s, 0.11H), 1.67 (m, 4.00H), 1.41 (m, 2.13H) ppm; GPC: M$_n$=22700 g/mol; M$_w$=29700 g/mol; D$_M$=1.31. TGA: decomposition onset: 384° C. DSC: T$_m$=54.5° C., T$_c$=30.3° C.

Polymer 6: Ac-Ala-O-PCL-O-Ala-Ac (M$_n$=20000

Synthesis: Ac-Ala-O-PCL-O-Ala-Ac (M$_n$=20000) was synthesized by dissolving hydroxy-functionalized poly(ε-caprolactone) (M$_n$=20000) (15 g) in THF (150 mL). N-acetyl-L-alanine (1.12 g, 8.5 mmol), DMAP (0.52 g, 4.3 mmol), and DCC (5.3 g, 25.7 mmol) were added, and the reaction mixture was stirred at room temperature for 5 days. The mixture was precipitated into MeOH. The precipitate was dried under high vacuum to yield Fmoc-Ala-O-PCL-O-Ala-Fmoc (M$_n$=20000) as a colorless solid (11 g, 73%). Characterization: 1H NMR (400 MHz, CDCl$_3$): δ=6.11 (bs, 0.004H), 4.60 (m, 0.02H), 4.09 (t, 1.93H), 2.33 (t, 2.00H), 2.04 (s, 0.07H), 1.68 (m, 4.16H), 1.41 (m, 2.27H) ppm.;

GPC: $M_n$=21100 g/mol; $M_w$=29000 g/mol; $D_M$=1.35. TGA: decomposition onset: 388° C. DSC: $T_m$=54.4° C., $T_c$=31.7° C.

Synthesis of Aggregating Additives

Additive 1: N-acetyl-L-alanyl-L-alanine (2-octyldodecyl)amide

Synthesis. We synthesized the aggregating additive N-acetyl-L-alanyl-L-alanine (2-octyldodecyl)amide, which comprises an aggregating segment with the structure NH-Ala-Ala-Ac, by a PyBOP-promoted peptide coupling reaction in THF as the solvent. To this end, 2-octyldodecan-1-amine (2.01 g, 6.72 mmol) was dissolved in THF (50 mL). N-acetyl-L-alanyl-L-alanine (1.64 g, 8.11 mmol), PyBOP (4.87 g, 9.36 mmol), and DIEA (3.5 mL) were added, and the reaction mixture was stirred at room temperature overnight. Then, the mixture was precipitated into 1 M HCl (1 L). The precipitate was re-dissolved in THF, and the solution was again precipitated into 1 M HCl. The precipitate was finally washed with water (50 mL) and acetone (50 mL) to yield the aggregating additive N-acetyl-L-alanyl-L-alanine (2-octyldodecyl)amide as a colorless solid (2.97 g, 6.16 mmol, 92%). Characterization: 1H NMR (400 MHz, CDCl$_3$): δ=7.51 (d, 1H), 7.09 (d, 1H), 6.77 (t, 1H), 4.71 (m, 1H), 4.60 (m, 1H), 3.23 (m, 1H), 3.15 (m, 1H), 2.08 (s, 3H), 1.51 (m, 1H), 1.38 (m, 6H), 1.25 (bs, 32H), 0.87 (m, 6H) ppm. HRMS (ESI-TOF, positive): m/z 504.4145 [M+Na]+, calculated for $C_{28}H_{55}N_3O_3Na$: 504.4141. DSC: $T_m$=186° C.

Additive 2: N-acetyl-L-alanyl-L-alanine (2-ethylhexyl)amide

Synthesis. We synthesized the aggregating additive N-acetyl-L-alanyl-L-alanine (2-ethylhexyl)amide, which comprises an aggregating segment with the structure NH-Ala-Ala-Ac, by a PyBOP-promoted peptide coupling reaction in THF as the solvent. To this end, N-acetyl-L-alanyl-L-alanine (6.00 g, 29.6 mmol), 2-ethylhexan-1-amine (4.23 g, 32.6 mmol), and PyBOP (18.4 g, 35.6 mmol) were suspended in THF (75 mL). DIEA (15 mL) was added, and a homogenous solution was obtained. The reaction mixture was stirred at room temperature overnight and then precipitated into 1 M HCl (1 L). The precipitate was collected, washed with H$_2$O (3×50 mL), and dried thoroughly under high vacuum to yield the aggregating additive N-acetyl-L-alanyl-L-alanine (2-ethylhexyl)amide as a colorless solid (5.91 g, 18.9 mmol, 64%). Characterization: 1H NMR (400 MHz, DMSO-d$^6$): δ=8.06 (d, 1H), 7.91 (t, 1H), 7.65 (t, 1H), 4.23 (m, 2H), 3.05 (m, 1H), 2.94 (m, 1H), 1.84 (s, 3H), 1.37 (m, 1H), 1.25-1.17 (bs, 14H), 0.87 (t, 3H), 0.83 (t, 3H) ppm. HRMS (ESI-TOF, positive): m/z 336.2268 [M+Na]+, calculated for $C_{16}H_{31}N_3O_3Na$: 336.2263. DSC: $T_m$=223° C.

Additive 3: N-acetyl-L-alanyl-L-alanine (2-hexyldecyl)amide

Synthesis. We synthesized the aggregating additive N-acetyl-L-alanyl-L-alanine (2-hexyldecyl)amide, which comprises an aggregating segment with the structure NH-Ala-Ala-Ac, by a PyBOP-promoted peptide coupling reaction in THF as solvent. To this end, N-acetyl-L-alanyl-L-alanine (0.40 g, 1.98 mmol) was dissolved in dry THF (200 mL) in an argon atmosphere. 2-Hexyldecan-1-amine (0.45 g, 1.88 mmol), DIEA (0.97 mL), and PyBOP (1.18 g, 2.26 mmol) were added. The reaction mixture was stirred at room temperature in argon atmosphere for 3 h. After concentrating the mixture in vacuum, it was precipitated into 1 M HCl. The precipitate was collected, and the precipitation into 1 M HCl was repeated two times. The precipitate was dissolved in DCM and dried over MgSO$_4$. After filtration and solvent evaporation, the aggregating additive N-acetyl-L-alanyl-L-alanine (2-hexyldecyl)amide was obtained as a colorless solid (0.71 g, 1.67 mmol, 89%). Characterization: 1H NMR (400 MHz, DMSO-d$^6$): δ=6.86 (d, 1H), 6.30 (d, 1H), 6.17 (bs, 1H), 4.55 (m, 1H), 4.47 (m, 1H), 3.22 (m, 2H), 2.05 (s, 3H), 1.50 (bs, 1H), 1.40 (m, 6H), 1.28 (bs, 24H), 0.91 (m, 6H) ppm. DSC: $T_m$=184° C.

Additive 4: N-acetyl-glycyl-glycine (2-octyldodecyl)amide

Synthesis. We synthesized the aggregating additive N-acetyl-glycyl-glycine (2-octyldodecyl)amide, which comprises an aggregating segment with the structure NH-Gly-Gly-Ac, by a PyBOP-promoted peptide coupling reaction in THF as the solvent. To this end, N-acetyl-glycyl-glycine (0.25 g, 1.24 mmol) was dissolved in DMF (25 mL). 2-Octyldodecan-1-amine (0.37 g, 1.24 mmol), DIEA (0.65 mL), and PyBOP (0.77 g, 1.48 mmol) were added. The reaction mixture was stirred at room temperature for 1 d and then precipitated into 1 M HCl (400 mL) to yield the aggregating additive N-acetyl-glycyl-glycine (2-octyldodecyl)amide as a colorless solid (0.31 g, 0.68 mmol, 55%). Characterization: 1H NMR (400 MHz, CDCl$_3$): δ=7.14 (t, 1H), 6.61 (t, 1H), 6.29 (t, 1H), 3.99 (d, 2H), 3.96 (d, 2H), 3.19 (m, 2H), 2.05 (s, 3H), 1.49 (m, 1H), 1.25 (bs, 32H), 0.88 (m, 6H) ppm. HRMS (ESI-TOF, positive): m/z 476.3835 [M+Na]+, calculated for $C_{26}H_{51}N_3O_3Na$: 476.3828. DSC: $T_m$=137° C.

Additive 5: $N^1,N^3,N^5$-tris(2-ethylhexyl) benzene-1,3,5-tricarboxamide

Synthesis. We synthesized the aggregating additive $N^1,N^3,N^5$-tris(2-ethylhexyl) benzene-1,3,5-tricarboxamide, which comprises an aggregating segment from the group of benzene-1,3,5-tricarboxamide derivatives. To this end, triethylamine (2.11 g) and 2-ethylhexan-1-amine (2.20 g, 17.0 mmol) were dissolved in dry DCM (10 mL) in an argon atmosphere. A solution of 1,3,5-benzenetricarboxylic acid chloride (1.01 g, 3.80 mmol) in dry DCM (2 mL) was added dropwise to the reaction mixture at 0° C. The reaction mixture was stirred at room temperature in an argon atmosphere overnight. The solvent was removed, and the resulting solid was washed with 1 M HCl (3×50 mL), and H$_2$O (3×50 mL). The aggregating additive $N^1,N^3,N^5$-tris(2-ethylhexyl) benzene-1,3,5-tricarboxamide was obtained as a colorless solid (2.01 g, 3.70 mmol, 97%). Characterization: 1H NMR (400 MHz, DMSO-d$^6$): δ=8.61 (t, 3H), 8.37 (s, 3H), 3.22 (m, 6H), 1.58 (m, 3H), 1.29 (bs, 24H), 0.88 (m, 18H) ppm. HRMS (ESI-TOF, positive): m/z 544.4485 [M+H]+, calculated for $C_{33}H_{58}N_3O_3$: 544.4478. DSC: $T_m$=289° C.

Additive 6: N-acetyl-glycyl-glycine (2-ethylhexyl)amide

Synthesis. We synthesized the aggregating additive N-acetyl-glycyl-glycine (2-ethylhexyl)amide, which comprises an aggregating segment with the structure NH-Gly-Gly-Ac, by a PyBOP-promoted peptide coupling reaction in THF as the solvent. To this end, N-acetyl-glycyl-glycine (4.30 g, 21.3 mmol) was dispersed in THF (250 mL). Water was gradually added until a clear solution was obtained. 2-ethylhexylamine (5.50 g, 42.5 mmol), DIEA (11 mL), and PyBOP (13.3 g, 25.5 mmol) were added. The reaction mixture was stirred at room temperature for 15 h. After concentrating the mixture in vacuum, it was precipitated into 1 M HCl (400 mL) to yield the aggregating additive N-acetyl-glycyl-glycine (2-ethylhexyl)amide as a colorless solid (3.70 g, 13.0 mmol, 61%). Characterization: 1H NMR (400 MHz, DMSO-d$^6$): δ=8.21 (t, 1H), 8.10 (t, 1H), 7.62 (t, 1H), 3.67 (m, 4H), 3.00 (m, 2H), 1.87 (s, 3H), 1.39 (m, 1H), 1.23 (m, 8H), 0.88 (t, 3H), 0.83 (t, 3H) ppm. HRMS (ESI-TOF, positive): m/z 308.1953 [M+Na]+, calculated for $C_{14}H_{27}N_3O_3Na$: 308.1950. DSC: $T_m$=187° C.

Additive 7: $N^1,N^3,N^5$-tris(2-octyldodecyl)benzene-1,3,5-tricarboxamide

Synthesis: We synthesized the aggregating additive $N^1,N^3,N^5$-tris(2-octyldodecyl)benzene-1,3,5-tricarboxamide, which comprises an aggregating segment from the group of benzene-1,3,5-tricarboxamide derivatives. To this end, triethylamine (3.40 g) and 2-octyldodecan-1-amine were dissolved in dry DCM (20 mL) in an argon atmosphere. A solution of 1,3,5-benzenetricarboxylic acid chloride (2.55 g, 9.60 mmol) in dry DCM (10 mL) was added dropwise to the reaction mixture at 0° C. The reaction mixture was stirred at room temperature in an argon atmosphere for two days. The solvent was removed, and the resulting solid was washed with 1 M HCl (2×50 mL), and H$_2$O (2×50 mL), and ether (25 mL), and purified by column chromatography using ethyl acetate/hexane (1:1) as eluent. The aggregating additive $N^1,N^3,N^5$-tris(2-octyldodecyl)benzene-1,3,5-tricarboxamide was obtained as a colorless solid. Characterization: 1H NMR (400 MHz, CDCl$_3$): δ=8.34 (s, 3H), 6.37 (t, 3H), 3.41 (m, 6H), 1.63 (m, 3H), 1.32-1.25 (m, 96H), 0.87 (m, 18H) ppm. HRMS (ESI-TOF, positive): m/z 1070.9932 [M+Na]+, calculated for $C_{69}H_{129}N_3O_3Na$: 1070.9932 DSC: $T_m$=200° C.

Preparation of Compositions
Polymer 1 and Additive 1

Preparation of the Compositions. We prepared a series of compositions based on the functionalized polymer 1 Ac-Ala$_3$-O-PCL-O-Ala$_3$-Ac ($M_n$=80000) and varying amounts of the aggregating additive 1 (N-acetyl-L-alanyl-L-alanine (2-octyldodecyl)amide). To this end, both Ac-Ala$_3$-O-PCL-O-Ala$_3$-Ac ($M_n$=80000) and N-acetyl-L-alanyl-L-alanine (2-octyldodecyl)amide were dissolved in TCE. The respective solutions were stirred at 100° C. for one hour. Then, the solvent was removed in vacuum.

Thermomechanical Behavior. We characterized the thermomechanical behavior of the as-prepared compositions by oscillatory shear-rheological temperature sweeps carried out from 200° C. to 25° C. at a cooling rate of 1° C./min. Prior to the measurement, the dissociation temperature, $T_d$, and the association temperature, $T_a$, of the aggregating segments Ac-Ala$_2$-NH in the material were determined by DSC (Table 1), and the specimens were loaded in the rheometer at a temperature chosen to be above the $T_a$.

TABLE 1

Thermal properties of a composition of the functionalized polymer 1 (Ac-Ala$_3$-O-PCL-O-Ala$_3$-Ac ($M_n$ = 80000)) and the aggregating additive 1 (N-acetyl-L-alanyl-L-alanine (2-octyldodecyl)amide) obtained by differential scanning calorimetry and oscillatory shear-rheological temperature sweeps.

| m (functionalized polymer) [wt %] | m (aggregating additive) [wt %] | c (Ac-Ala-Ala-NH) [wt %] | Dissociation temperature $T_d$ [° C.] | Softening temperature $T_s$ [° C.] |
|---|---|---|---|---|
| 100 | 0 | 0.5 | — | — |
| 99 | 1.0 | 0.9 | 107 | 71 |
| 98 | 2.0 | 1.3 | 125 | 94 |
| 97 | 3.0 | 1.7 | 130 | 108 |
| 96 | 4.0 | 2.2 | 141 | 114 |
| 95 | 5.0 | 2.6 | 142 | 115 |
| 0 | 100 | 42 | 186 | n. a. |

Figure 2:
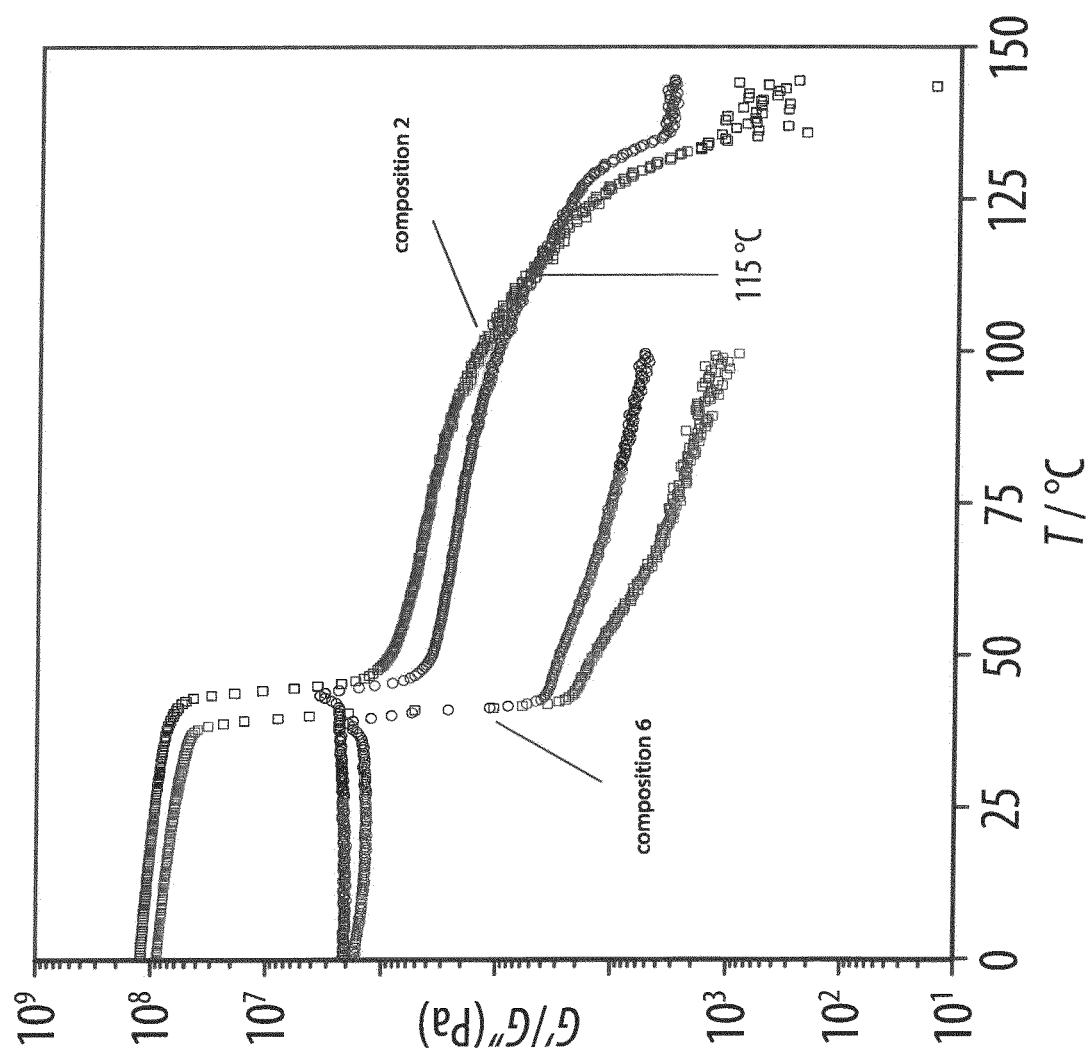
FIG. 2 shows oscillatory shear-rheological temperature sweeps of compositions according to the invention.

For instance, the pure functionalized polymer 1 (Ac-Ala$_3$-O-PCL-O-Ala$_3$-Ac ($M_n$=80'000 g/mol)) behaved as a polymer melt (G">G') at any temperature above the crystallization temperature of the polyester segment, $T_c$, indicating that its end groups comprising the aggregating segment Ac-Ala$_2$-NH did not show aggregate formation as a result of the chosen molecular weight of $M_n$=80000 g/mol. Upon the addition of the corresponding aggregating additive N-acetyl-L-alanyl-L-alanine (2-octyldodecyl)amide, self-assembly of the aggregating segment Ac-Ala$_2$-NH was induced, and the associated dissociation temperature increased monotonously towards higher temperatures as a function of the overall concentration of self-assembling segments and approached the melting temperature of the aggregating additive ($T_d$=186° C.). Consequently, these compositions behaved as a thermoplastic elastomer above $T_c$ with a rubbery phase extending up to the softening transition, $T_s$, defined as the temperature where the loss factor finally becomes tan δ≥1. For instance, at an overall concentration of the aggregating segment of 2.6 wt % the softening temperature was $T_s$=115° C., while the plateau modulus gradually increased to G'≈0.1 MPa (at 100° C.). This is depicted in FIG. 2 showing G' (squared) and G" (circles) of oscillatory shear-rheological temperature sweeps for composition 2 (extending over a temperature range from 0° C. to about 150° C.) and composition 1 (extending over a temperature range from 0° C. to about 100° C.). Measurements were carried out from 200° C. to 0° C. at a cooling rate of 1° C./min.

Polymer 1 and Additive 2

Preparation of the Compositions. We prepared a series of compositions based on the functionalized polymer 1 Ac-Ala$_3$-O-PCL-O-Ala$_3$-Ac ($M_n$=80000) and varying amounts of the aggregating additive 2 (N-acetyl-L-alanyl-L-alanine (2-ethylhexyl)amide). To this end, both Ac-Ala$_3$-O-PCL-O-Ala$_3$-Ac ($M_n$=80000) and N-acetyl-L-alanyl-L-alanine (2-ethylhexyl)amide were dissolved in TCE. The respective solutions were stirred at 100° C. for one hour. Then, the solvent was removed in vacuum.

Thermomechanical Behavior. We characterized the thermomechanical behavior of the as-prepared compositions by oscillatory shear-rheological temperature sweeps carried out from 200° C. to 25° C. at a cooling rate of 1° C./min. Prior to the measurement, the dissociation temperature, $T_d$, and the association temperature, $T_a$, of the aggregating segments Ac-Ala$_2$-NH in the material were determined by DSC (Table 2), and the specimens were loaded in the rheometer at a temperature chosen to be above the $T_a$.

TABLE 2

Thermal properties of a composition of the functionalized polymer 1 (Ac-Ala$_3$-O-PCL-O-Ala$_3$-Ac ($M_n$ = 80000)) and the aggregating additive 2 (N-acetyl-L-alanyl-L-alanine (2-ethylhexyl)amide) obtained by differential scanning calorimetry and oscillatory shear-rheological temperature sweeps.

| m (functionalized polymer) [wt %] | m (aggregating additive) [wt %] | c (Ac-Ala-Ala-NH) [wt %] | Dissociation temperature $T_d$ [° C.] | Softening temperature $T_s$ [° C.] |
|---|---|---|---|---|
| 100 | 0 | 0.5 | — | — |
| 97 | 3.0 | 2.3 | 170 | n. d. |
| 95 | 5.0 | 3.7 | 182 | 154 |
| 90 | 10 | 6.8 | No data | 187 |
| 0 | 100 | 64 | 223 | n. a. |

Figure 3:
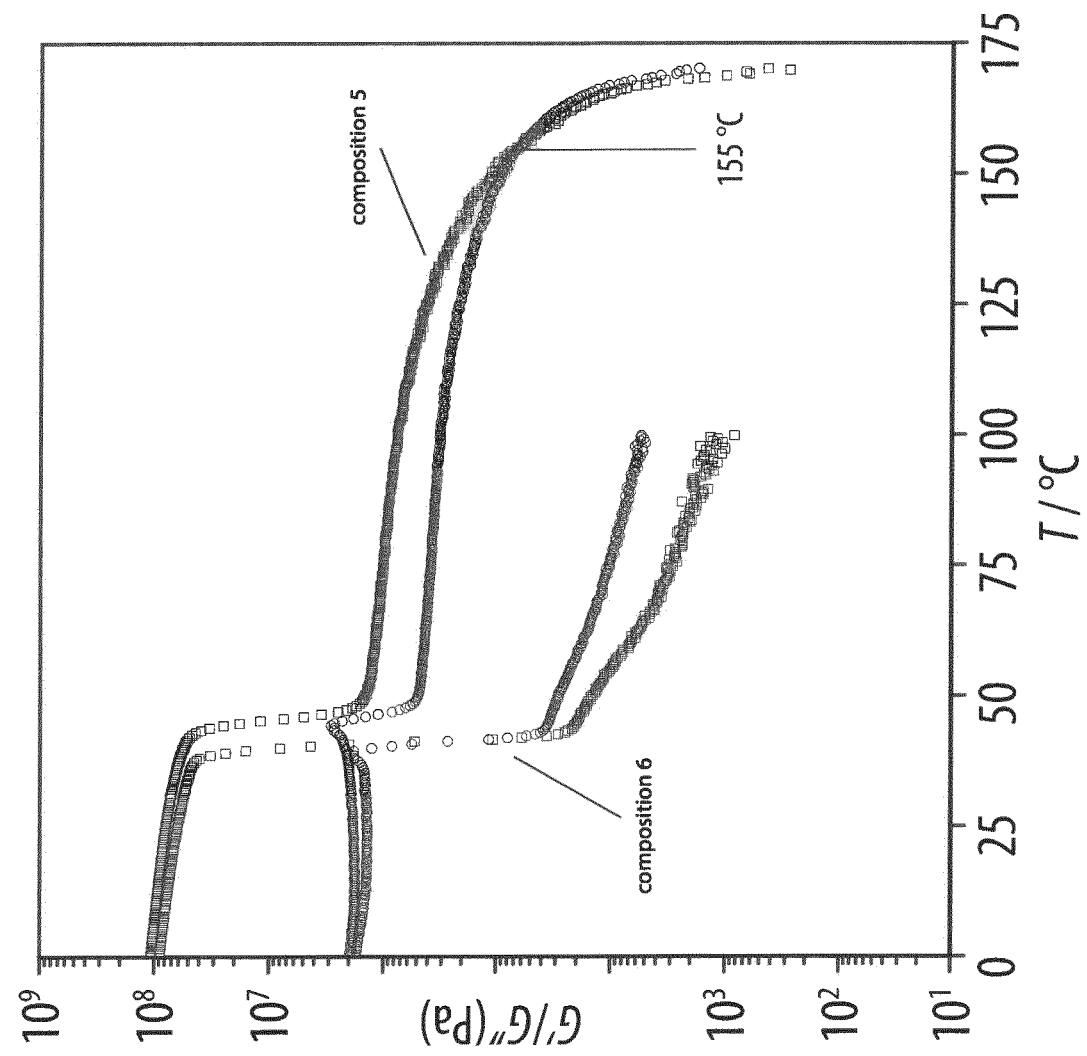
FIG. 3 shows oscillatory shear-rheological temperature sweeps of compositions according to the invention.

For instance, the pure functionalized polymer 1 (Ac-Ala$_3$-O-PCL-O-Ala$_3$-Ac ($M_n$=80000)) behaved as a polymer melt (G">G') at any temperature above the crystallization temperature of the polyester segment, $T_c$, indicating that its end groups comprising the aggregating segment Ac-Ala$_2$-NH did not show aggregate formation as a result of the chosen molecular weight of $M_n$=80'000 g/mol. Upon the addition of the corresponding aggregating additive N-acetyl-L-alanyl-L-alanine (2-ethylhexyl)amide, self-assembly of the aggregating segment Ac-Ala$_2$-NH was induced, and the associated dissociation temperature increased monotonously towards higher temperatures as a function of the overall concentration of self-assembling segments and approached the melting temperature of the aggregating additive ($T_d$=223° C.). Consequently, these compositions behaved as a thermoplastic elastomer above $T_c$ with a rubbery phase extending up to the softening transition, $T_s$, defined as the temperature where the loss factor finally becomes tan δ≥1. For instance, at an overall concentration of the aggregating segment of 3.7 wt % the dissociation temperature was $T_s$=154° C., while the plateau modulus gradually increased to G'≈1.0 MPa (at 100° C.). This is depicted in FIG. 3 showing G' (squared) and G" (circles) of oscillatory shear-rheological temperature sweeps for composition 5 (extending over a temperature range from 0° C. to about 175° C.) and composition 6 (extending over a temperature range from 0° C. to about 100° C.). Measurements were carried out from 200° C. to 0° C. at a cooling rate of 1° C./min.

Polymer 4 and Additive 2

Preparation of the Compositions. We prepared a series of compositions based on the functionalized polymer 4 Ac-Ala$_3$-O-PCL-O-Ala$_3$-Ac ($M_n$=20000) and varying amounts of the aggregating additive 2 (N-acetyl-L-alanyl-L-alanine (2-ethylhexyl)amide). To this end, both Ac-Ala$_3$-O-PCL-O-Ala$_3$-Ac ($M_n$=20000) and N-acetyl-L-alanyl-L-alanine (2-ethylhexyl)amide were dissolved in TCE. The respective solutions were stirred at 100° C. for one hour. Then, the solvent was removed in vacuum.

Thermomechanical Behavior. We characterized the thermomechanical behavior of the as-prepared compositions by oscillatory shear-rheological temperature sweeps carried out from 200° C. to 0° C. at a cooling rate of 1° C./min. Prior to the measurement, the dissociation temperature, $T_d$, and the association temperature, $T_a$, of the aggregating segments Ac-Ala$_2$-NH in the material were determined by DSC (Table 3), and the specimens were loaded in the rheometer at a temperature chosen to be above $T_a$.

TABLE 3

Thermal properties of a composition of the functionalized polymer 4 (Ac-Ala$_3$-O-PCL-O-Ala$_3$-Ac ($M_n$ = 20000)) and the aggregating additive 2 (N-acetyl-L-alanyl-L-alanine (2-ethylhexyl)amide) obtained by differential scanning calorimetry and oscillatory shear-rheological temperature sweeps.

| m (functionalized polymer) [wt %] | m (aggregating additive) [wt %] | c (Ac-Ala-Ala-NH) [wt %] | Dissociation temperature $T_d$ [° C.] | Softening temperature $T_s$ [° C.] |
|---|---|---|---|---|
| 100 | 0 | 2.0 | 82 | 100 |
| 99 | 1.0 | 2.6 | 123 | 114 |
| 95 | 5.0 | 5.2 | 162 | 159 |
| 0 | 100 | 64 | 223 | n. a. |

Figure 4:
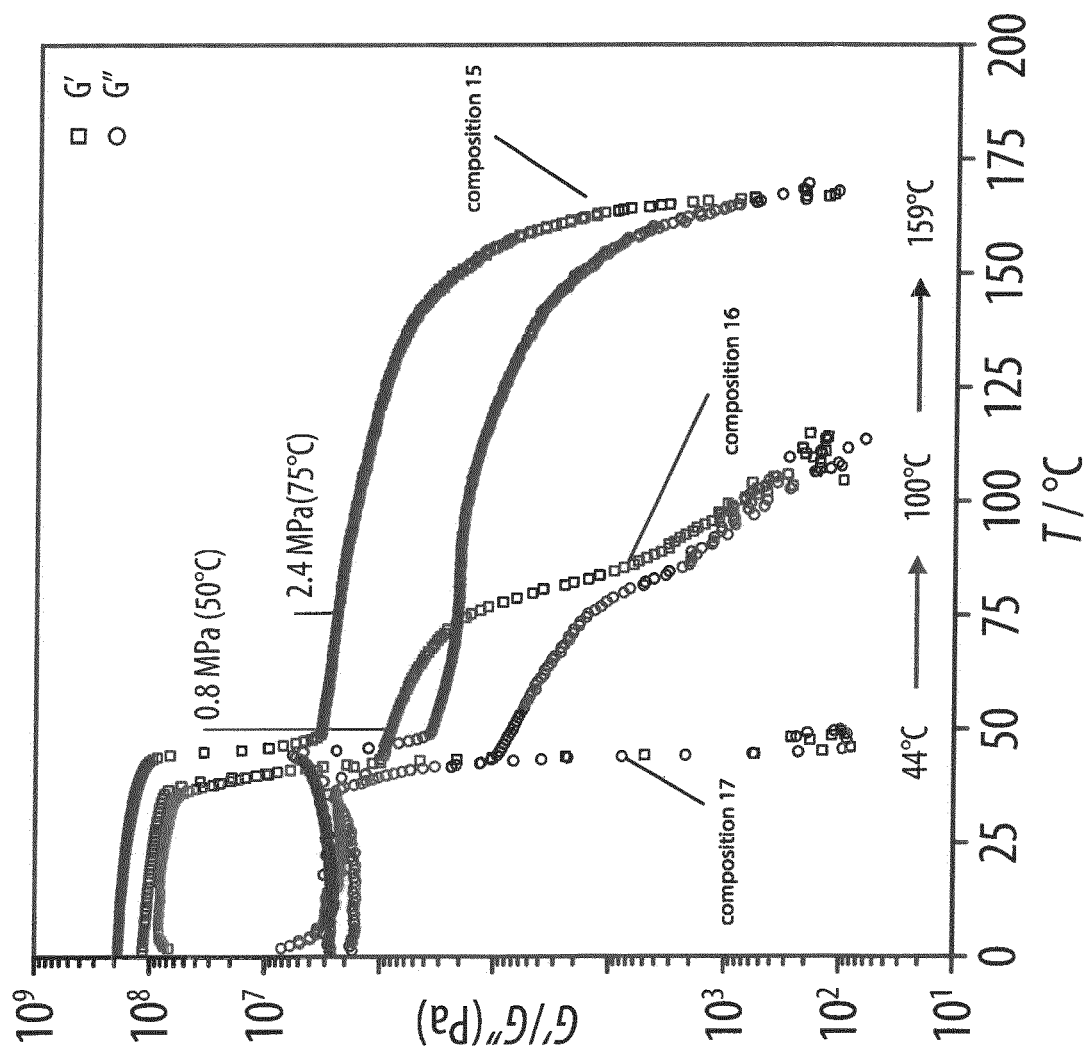
FIG. 4 shows oscillatory shear-rheological temperature sweeps of compositions according to the invention, the functionalized polymer according to the invention, and PCL (20 k).

For instance, the pure functionalized polymer 4 (Ac-Ala$_3$-O-PCL-O-Ala$_3$-Ac ($M_n$=20000)) behaved as a thermoplastic elastomer at temperatures above the crystallization temperature that showed a plateau modulus G'≈0.8 MPa and a fairly broad dissociation transition associated with an association temperature, $T_a$, centered at around 82° C. as determined by DSC (first heating curve). Upon the addition of the corresponding aggregating additive N-acetyl-L-alanyl-L-alanine (2-ethylhexyl)amide, the association temperature increased monotonously towards higher temperatures as a function of the overall concentration of self-assembling segments and approached the melting temperature of the aggregating additive ($T_d$=223° C.). For instance, at an overall concentration of the aggregating segment of 5.2 wt % the association temperature was $T_a$=162° C., while the plateau modulus increased significantly (G'≈2.4 MPa) This is reflected by a shift of the softening transition, $T_s$, defined as the temperature where the loss factor finally becomes tan δ≥1, from 100° C. for the pure functionalized polymer Ac-Ala$_3$-O-PCL-O-Ala$_3$-Ac ($M_n$=20000) to 159° C. for this composition. This is depicted in FIG. 4 showing G' (squared) and G" (circles) of oscillatory shear-rheological temperature sweeps for composition 15 (extending over a temperature range from 0° C. to about 175° C.), composition 16 (extending over a temperature range from 0° C. to about 120° C.), and composition 17 (extending over a temperature range from 0° C. to about 50° C.). Measurements were carried out from 200° C. to 0° C. at a cooling rate of 1° C./min.

Preparation of Compositions and Investigation of their Mechanical Properties

Examples 1-17: Tensile Testing of Specimens Prepared by Injection Molding

Compositions of the polymers and additives were prepared in accordance with the respective mixing ratios (wt. %) shown in Table 4. These compositions were prepared at a kneading temperature of 200° C. by using a 5 mL micro-compounder (MC 5, manufactured by Xplore). Each composition was injection molded as a dogbone-shaped tensile test bar (thickness of the test area 1 mm, width 5 mm) at a cylinder temperature of 200° C. (except Example 9 and 10 where a cylinder temperature of 250° C. was used) and at a mold temperature of 30° C. by using a 5.5 mL Injection moulder (IM 5.5), manufactured by Xplore. Tensile testing results are shown in Table 4.

Thermomechanical characterization: We prepared a series of compositions by dissolving polymers and additives in TCE and stirred at 100° C. for an hour before the solvent was removed in vacuum. We characterized the thermomechanical behavior of the as-prepared compositions by oscillatory shear-rheological temperature sweeps carried out from 200° C. to 25° C. at a cooling rate of 1° C./min and a constant frequency of 1 rad/s. Prior to the measurement, the dissociation temperature, $T_d$, and the association temperature, $T_a$, of the aggregating segments Ac-Ala$_2$-NH in the material were determined by DSC, and the specimens were loaded in the rheometer at a temperature chosen to be above the $T_a$. Table 4 shows the tan δ values of the compositions at 70° C. as a representative value.

Tensile Testing: The tensile properties at room temperature were determined by stress-strain analyses, and the Young's modulus, E, yield strength, $\sigma_y$, ultimate strength, am, strain at break, e, and energy at break, W, are listed in Table 5. For Examples 14-17, it must be noted that test specimens for tensile testing experiments could not be prepared by conventional processing methods such as injection molding, hot pressing, or solvent casting of films, as the resulting material were too brittle as a result of the chosen molecular weight of the polyester segment of only $M_n$=20'000 g/mol.

All Examples relating to compositions 11, 12, 13, and 17 are comparative examples.

TABLE 4

Compositions used in Examples 1-17, along with the thermomechanical properties represented by tan δ values at 70° C. obtained from oscillatory shear-rheological temperature sweeps. Loss factor values tan δ < 1 indicate the presence of a rubbery plateau, whereas values tan δ > 1 indicate the absence of a rubbery phase.

| Example | Composition | Polymer | Additive | Additive Content [wt %] | tan δ at 70° C. |
|---|---|---|---|---|---|
| Example 1 | Composition 1 | Polymer 1 | Additive 1 | 10 | n. d. |
| Example 2 | Composition 2 | Polymer 1 | Additive 1 | 5 | 0.5 |
| Example 3 | Composition 3 | Polymer 1 | Additive 1 | 3 | 0.5 |
| Example 4 | Composition 4 | Polymer 1 | Additive 1 | 1 | 1.0 |
| Example 5 | Composition 5 | Polymer 1 | Additive 2 | 5 | 0.4 |
| Example 6 | Composition 6 | Polymer 1 | — | — | 3.3 |
| Example 7 | Composition 7 | Polymer 2 | Additive 4 | 5 | n. d. |
| Example 8 | Composition 8 | Polymer 2 | — | — | n. d. |
| Example 9 | Composition 9 | Polymer 3 | Additive 5 | 5 | n. d. |
| Example 10 | Composition 10 | Polymer 3 | — | — | n. d. |
| Example 11 | Composition 11 | PCL (80k) | Additive 1 | 5 | 0.9 |
| Example 12 | Composition 12 | PCL (80k) | Additive 2 | 5 | 1.0 |
| Example 13 | Composition 13 | PCL (80k) | — | — | 3.5 |
| Example 14 | Composition 14 | Polymer 4 | Additive 1 | 5 | 0.1 |
| Example 15 | Composition 15 | Polymer 4 | Additive 2 | 5 | n. d. |
| Example 16 | Composition 16 | Polymer 4 | — | — | 0.1 |
| Example 17 | Composition 17 | PCL (20k) | — | — | too low viscosity |

TABLE 5

Tensile testing results of dogbone-shaped specimens of compositions 1-17 that were prepared by injection molding.

| Example | E [MPa] | $\sigma_y$ [MPa] | $\sigma_m$ [MPa] | ε [%] | W [MJ m$^{-3}$] |
|---|---|---|---|---|---|
| Example 1 | 201 (±13.4) | 22.4 (±0.31) | 42.7 (±0.31) | 853 (±14.6) | 249 (±6.79) |
| Example 2 | 220 (±25.3) | 23.4 (±0.81) | 41.8 (±3.11) | 834 (±65.0) | 241 (±22.3) |
| Example 3 | 163 (±16.3) | 22.8 (±0.62) | 44.0 (±0.07) | 859 (±9.51) | 254 (±2.97) |
| Example 4 | 162 (±4.24) | 23.2 (±0.02) | 37.8 (±0.17) | 769 (±18.0) | 205 (±4.38) |
| Example 5 | 217 | 24.6 | 48 | 676 | 241 |
| Example 6 | 137 (±11.8) | 22.0 (±0.73) | 35.5 (± 1.62) | 779 (±86.4) | 198 (±20.0) |
| Example 7 | 180 | 19.8 | 42.7 | 1234 | 336 |
| Example 8 | 126 | 22.5 | 47.3 | 1341 | 384 |
| Example 9 | 158 | 20.3 | 43.4 | 1260 | 351 |
| Example 10 | 139 | 16.0 | 33.8 | 1075 | 230 |
| Example 11 | 252 (±3.54) | 17.1 (±0.64) | 30.5 (±0.24) | 693 (±9.84) | 135 (±0.92) |
| Example 12 | 367 (±1.41) | 14.6 (±0.52) | 30.7 (±1.35) | 702 (±11.7) | 134 (±9.40) |
| Example 13 | 201 (±10.1) | 14.0 (±1.34) | 27.7 (±2.81) | 658 (±191) | 119 (±34.7) |
| Example 14 | brittle | brittle | brittle | brittle | brittle |
| Example 15 | brittle | brittle | brittle | brittle | brittle |
| Example 16 | brittle | brittle | brittle | brittle | brittle |
| Example 17 | brittle | brittle | brittle | brittle | brittle |

Discussion: Compositions of modified PCL and corresponding additives showed a new rubbery plateau (Examples 2-5), as can be seen from the tan δ values taken at 70° C. and listed in Table 4, loss factor values tan δ<1 indicate the presence of a rubbery plateau, whereas values tan δ>1 indicate the absence of a rubbery phase. For composition 11, no rubbery plateau was detected despite the value for tan δ<1. For composition 11, additive 1 forms a transient network resulting in a highly viscous melt and thereby a value for tan δ<1. This behavior is known from other composites. However, this transient network in composition 11 is very weak and can be destroyed easily, which is why the processability of composition 11 is not improved. This means that the end groups co-assembled with the additive to give rise to a network in the materials that persisted beyond the melting temperature of the PCL matrix. This new rubbery plateau is considered to improve the formability of the composition using forming methods established for PCL, but also allow it to be processed by methods conventionally not applicable for PCL, such as processes involving a deformation above the melting temperature of PCL, for example, fiber spinning and drawing, film blowing, or foaming. At the same time, the yield strength and energy at break (toughness) were significantly improved compared with non-functionalized PCL and its mixtures with the additive (Table 5).

By contrast, materials obtained from PCL 20K showed a new rubbery plateau in shear rheology but were too brittle at room temperature to even prepare test samples for tensile testing (Table 5, Example 14-16), as a result of the chosen PCL molecular weight of only $M_n$=20'000 g/mol. Thus, there appears to be a minimum molecular weight of the polyester segment above which the compositions show improvement of mechanical properties at room temperature.

Examples 18-20 Tensile Testing of Fibers Prepared by Fiber Drawing

In Examples 18-20, fibers were formed from compositions 2, 6, and 13 (Table 6) by using a 5 mL microcompounder (MC 5, manufactured by Xplore) at a forming temperature of 200° C. and manual drawing of the melt strand, and their mechanical properties were investigated. The fibers had a thickness of 10-100 m. The mechanical properties were evaluated by tensile testing experiments using a single fiber, and the results are summarized in Table 7.

TABLE 6

Compositions used in Examples 18-20.

| Example | Composition | Polymer Additive | Additive Content [wt %] |
|---|---|---|---|
| Example 18 | Composition 2 | Polymer 1 Additive 1 | 5 |
| Example 19 | Composition 6 | Polymer 1 | — |
| Example 20 | Composition 13 | PCL (80k) | — |

Table 7

Tensile testing results of specimens of compositions 2, 6, and 13 that were prepared by fiber drawing.

| Example | E [MPa] | $\sigma_y$ [MPa] | $\sigma_m$ [MPa] | ε [%] | W [MJ m$^{-3}$] |
|---|---|---|---|---|---|
| Example 18 | 1,200 | 76 | 336 | 387 | 706 |
| Example 19 | 950 | 33 | 96 | 485 | 188 |
| Example 20 | 500 | 26 | 81 | 397 | 160 |

Discussion: Fibers from composition 6 (Example 19), which does not contain any additive, show a significant improvement over fibers from unmodified PCL with a molecular weight $M_n$=80'000 g/mol (Example 20). Fibers from composition 2 (Example 18), which contains Additive 1, showed a further, drastic improvement over both unmodified PCL and over composition 6 in the mechanical properties at room temperature, especially in the energy at break (toughness). The improvement in the mechanical properties of compositions 2 and 6 compared to composition 13 may be considered to be due to the fact that the rubbery network with the aggregates as physical cross-links in composition 6, and in particular in composition 2 comprising the additive, allows for shear alignment during fiber spinning, resulting in a highly oriented structure in the fiber.

Examples 21-26 Tensile Testing of Sheets Prepared by a Hot Press

In Examples 21-26, sheets with a thickness of 400 μm were formed from compositions 2, 6, and 13-16 (Table 8) by using a hot press at a forming temperature of 200° C., and the mechanical properties were evaluated on dogbone-shaped test specimens punched out of the sheets. The results are summarized in Table 9.

Table 8

Compositions used in Examples 21-26.

| Example | Composition | Polymer | Additive | Additive Content [wt %] |
|---|---|---|---|---|
| Example 21 | Composition 2 | Polymer 1 | Additive 1 | 5 |
| Example 22 | Composition 6 | Polymer 1 | — | — |
| Example 23 | Composition 13 | PCL (80k) | — | — |
| Example 24 | Composition 14 | Polymer 4 | Additive 1 | 5 |
| Example 25 | Composition 15 | Polymer 4 | Additive 2 | 5 |
| Example 26 | Composition 16 | Polymer 4 | — | — |

TABLE 9

Tensile testing results of dogbone-shaped specimens punched out of Compositions 2, 6, and 13 to 16 that were prepared by hot pressing into sheets with a thickness of 400 μm.

| Example | E [MPa] | $\sigma_y$ [MPa] | $\sigma_m$ [MPa] | ε [%] | W [MJ m$^{-3}$] |
|---|---|---|---|---|---|
| Example 21 | 282 | 16 | 34 | 1012 | 194 |
| Example 22 | 253 | 16 | 35 | 1035 | 211 |
| Example 23 | 188 | 12 | 30 | 1103 | 192 |
| Example 24 | brittle | brittle | brittle | brittle | brittle |
| Example 25 | brittle | brittle | brittle | brittle | brittle |
| Example 26 | brittle | brittle | brittle | brittle | brittle |

Discussion: Sheets of compositions 2 and 6 (Examples 21 and 22) showed a significantly higher Young's modulus, E, compared with a sheet of pure PCL with a molecular weight $M_n$=80'000 g/mol (composition 13, Example 23). In Examples 24, 25 and 26, a stable sheet that could be subjected to tensile testing could not be obtained, as a result of the chosen molecular weight of the PCL polyester segment of only $M_n$=20'000 g/mol.

Examples 27-33: Tensile Testing of Films Prepared by Solvent Casting

In Examples 27-33, films with a thickness of 150 μm were formed from compositions 2, 6, and 11-16 (Table 10) by casting solutions of the polymers or the polymers and additives dissolved in dichloromethane onto a glass petri dish. The petri dishes were covered with a glass lid and kept at room temperature overnight until the dichloromethane had evaporated. Then, the films were dried in vacuum overnight. The mechanical properties were evaluated on dogbone-shaped test specimens punched out of the films. The results are summarized in Table 11.

TABLE 10

Compositions used in Examples 27-33.

| Example | Composition | Polymer | Additive | Additive Content [wt %] |
|---|---|---|---|---|
| Example 27 | Composition 2 | Polymer 1 | Additive 1 | 5 |
| Example 28 | Composition 6 | Polymer 1 | — | — |
| Example 29 | Composition 13 | PCL (80k) | — | — |
| Example 30 | Composition 14 | Polymer 4 | Additive 1 | 5 |
| Example 31 | Composition 16 | Polymer 4 | — | — |
| Example 32 | Composition 11 | PCL (80k) | Additive 1 | 5 |

TABLE 11

Tensile testing results on dogbone-shaped specimens punched out of films with a thickness of 150 μm that were prepared from Compositions 2, 6, and 13 to 16 by casting solutions of the polymers or the polymers and additives dissolved in DCM onto a glass petri dish.

| Example | E [MPa] | $\sigma_y$ [MPa] | $\sigma_m$ [MPa] | ε [%] | W [MJ m$^{-3}$] |
|---|---|---|---|---|---|
| Example 27 | 283 | 14 | 24 | 813 | 154 |
| Example 28 | 262 | 9 | 24 | 795 | 108 |
| Example 29 | 210 | 11 | 25 | 843 | 155 |
| Example 30 | brittle | brittle | brittle | brittle | brittle |
| Example 31 | brittle | brittle | brittle | brittle | brittle |
| Example 32 | | | non-uniform film | | |

Discussion: Solvent-cast films of Compositions 2 and 6 (Examples 27 and 28) showed a significantly higher Young's modulus, E, compared with a solvent-cast film of pure PCL with a molecular weight $M_n$=80'000 g/mol (Example 29). Compositions 14 and 16 processed by solvent casting resulted in films that were too brittle to even subject them to tensile testing (Examples 30 and 31), as a result of the chosen PCL with a molecular weight of only $M_n$=20'000 g/mol. Composition 2 produced a homogeneous film, but composition 11 (Example 32) provided only a heterogeneous film with large, optically visible particles of the additive, which could not be evaluated for its mechanical properties. This result can be considered to be due to the fact that, in the composition 2, the polymer aggregating segment and additive aggregating segment interact, resulting in a better dispersion of the additive in the polymer matrix and thus a homogeneous film.

Examples 34-39: Tensile Testing of Thin Films Prepared by Solvent Casting

In Examples 34-39, films with a thickness of 50 μm were prepared from Compositions 2, 6, 11, 13, 14, and 16 (Table 12) following the same protocol as described for Examples 27-33. The mechanical properties were evaluated on dogbone-shaped test specimens punched out of the films. The results are summarized in Table 13.

TABLE 12

Compositions used in Examples 34-39.

| Example | Composition | Polymer | Additive | Additive Content [wt %] |
|---|---|---|---|---|
| Example 34 | Composition 2 | Polymer 1 | Additive 1 | 5 |
| Example 35 | Composition 6 | Polymer 1 | — | — |
| Example 36 | Composition 13 | PCL (80k) | — | — |
| Example 37 | Composition 14 | Polymer 4 | Additive 1 | 5 |
| Example 38 | Composition 16 | Polymer 4 | — | — |
| Example 39 | Composition 11 | PCL (80k) | Additive 1 | 5 |

TABLE 13

Tensile testing results on films with a thickness of 50 μm that were prepared from Compositions 2, 6, 11, 13, 14, and 16 by casting solutions of the polymers or the polymers and additives dissolved in DCM onto a glass petri dish.

| Example | E [MPa] | W [MJ m$^{-3}$] |
|---|---|---|
| Example 34 | 533 | 154 |
| Example 35 | 337 | 108 |
| Example 36 | 280 | 3 |
| Example 37 | brittle | brittle |
| Example 38 | brittle | brittle |
| Example 39 | 197 | 1 |

Discussion: Compositions 2 and 6 (Examples 34 and 35) showed a significant improvement of all mechanical properties at room temperature compared with pure PCL with a molecular weight $M_n$=80'000 g/mol (Example 36). This is considered to be the result of the differences in the microstructure of the processed compositions. The solvent cast film of pure PCL with a molecular weight $M_n$=80'000 g/mol (Example 36) exhibited large spherulitic crystals, and it was observed that these induced defects in tensile testing, resulting in macroscopic failure. On the other hand, solvent-cast films from Compositions 2 and 6 (Examples 34 and 35) were homogeneous. This is thought to be due to the co-assembled aggregates of polymer aggregating segment and additive aggregating segment nucleating the crystallization of the PCL, resulting in smaller PCL crystallites and thus a more homogeneous film. Example 39 produced a heterogeneous film comprising large particles of additives and mechanical properties inferior to pure PCL. This is thought to result from the lack of an interaction between the PCL matrix and the additive, resulting in macroscopic phase segregation of additive crystals that serve as defects in the film that initiate failure mechanisms during tensile testing.

Comparison of the Effects of Molding Process

Table 14 summarizes the tensile testing results of Compositions 2 and 13 prepared by different processes.

TABLE 14

Tensile test results of Compositions 2 and 13, along with information on the preparation method and the orientation factor $P_2$ of the polymer in the initial state (FD = fiber drawing; IM = injection molding; HP = hot pressing; SC = solvent casting).

| Example (Ex) | Preparation method | $P_2$ | E [MPa] | $\sigma_y$ [MPa] | $\sigma_m$ [MPa] | ε [%] | W [MJ m$^{-3}$] |
|---|---|---|---|---|---|---|---|
| Ex 18 | FD | No data | — | 76 | 336 | 387 | 706 |
| Ex 2 | IM | 0.55 | 220 (±25.3) | 23.4 (±0.80) | 41.8 (±3.11) | 834 (±65.0) | 241 (±22.3) |
| Ex 21 | ZP | no data | 282 | 16 | 34 | 1012 | 194 |
| Ex 27 | SC | 0.11 | 283 | 14 | 24 | 813 | 154 |
| Ex 20 | FD | No data | — | 26 | 81 | 397 | 160 |
| Ex 13 | IM | 0.48 | 201 (±10.1) | 14.0 (±1.34) | 27.7 (±2.81) | 658 (±191) | 119 (±34.7) |
| Ex 23 | SP | No data | 188 | 12 | 30 | 1103 | 192 |
| Ex 29 | SC | no data | 210 | 11 | 25 | 843 | 155 |

Discussion: Fibers (Example 18) and injection-molded samples (Example 2) of Composition 2 showed a more drastic improvement of mechanical properties over the corresponding pure unmodified PCL with a molecular weight of 80'000 g/mol as reference Examples (Examples 20, 13, 23, and 29) using unmodified PCL, than a pressed sheet (Examples 21) and a cast film (Example 27) of compositions of end-modified PCL and additive over their corresponding reference Examples 23 and 29 using pure unmodified PCL with a molecular weight of 80'000 g/mol. This is thought to be due to the effect of shear alignment on the orientation of molecules and aggregates which is more pronounced during fiber drawing or injection molding than during hot pressing.

The invention also includes, to the extent not already described, the following uses and compositions.

1. Use of a composition as described, or a functionalized polymer (10) for the preparation of sheets, films, fibers, or molded parts.
2. Composition containing
   a. a functionalized polymer (10) that comprises at least one polyester segment (13) and at least one, in particular at least two, polymer aggregating segment (11, 12) capable of forming non-covalent bonds based on a supramolecular interaction,
   b. an aggregating additive (20) that comprises at least one additive aggregating segment (21) capable of forming non-covalent bonds based on the same supramolecular interaction as the polymer aggregating segment (11, 12),
   wherein the polymer aggregating segment (11, 12) and the additive aggregating segment (21) are ditopic,
   wherein the polymer aggregating segment (11, 12) and the additive aggregating segment (21) are designed such that they can form aggregates (31) that contain polymer aggregating segments (11, 12) and additive aggregating segments (21),
   wherein the polyester segment (13) has a number average molecular weight of from 10'000 g/mol to 500'000 g/mol, and
   wherein the composition contains the functionalized polymer (10) in an amount of from 10 wt. % to 99.9 wt. %, based on the total weight of the composition.
3. Composition containing
   a. a functionalized polymer (10) that comprises at least one polyester segment (13) and at least one, in particular at least two, polymer aggregating segment (11, 12) capable of forming hydrogen bonds,
   b. an aggregating additive (20) that comprises at least one additive aggregating segment (21) capable of forming hydrogen bonds,
   wherein the polymer aggregating segment (11, 12) and the additive aggregating segment (21) are preferably ditopic,
   wherein the polymer aggregating segment (11, 12) and the additive aggregating segment (21) are designed such that they can form aggregates (31) that contain polymer aggregating segments (11, 12) and additive aggregating segments (21),
   wherein the polyester segment (13) has a number average molecular weight of from 10,000 g/mol to 500'000 g/mol,
4. Composition containing
   a. a functionalized polymer (10) that comprises at least one polyester segment (13) and at least one, in particular at least two, polymer aggregating segment (11, 12) capable of forming non-covalent bonds based on a supramolecular interaction,
   b. an aggregating additive (20) that comprises at least one additive aggregating segment (21) capable of forming non-covalent bonds based on the same supramolecular interaction as the polymer aggregating segment (11, 12),
   wherein the polymer aggregating segment (11, 12) and the additive aggregating segment (21) are ditopic,
   wherein the polymer aggregating segment (11, 12) and the additive aggregating segment (21) are designed such that they can form aggregates (31) that contain polymer aggregating segments (11, 12) and additive aggregating segments (21),
   wherein the polyester segment (13) has a number average molecular weight of from 10'000 g/mol to 500'000 g/mol, and
   wherein the polyester segment (13) is poly(epsilon-caprolactone).
5. Composition containing
   a. a functionalized polymer (10) that comprises at least one polyester segment (13) and at least one, in particular at least two, polymer aggregating segment (11, 12) capable of forming non-covalent bonds based on a supramolecular interaction,
   b. an aggregating additive (20) that comprises at least one additive aggregating segment (21) capable of forming non-covalent bonds based on the same supramolecular interaction as the polymer aggregating segment (11, 12),
   wherein the polymer aggregating segment (11, 12) and the additive aggregating segment (21) are ditopic,
   wherein the polymer aggregating segment (11, 12) and the additive aggregating segment (21) are designed such that they can form aggregates (31) that contain polymer aggregating segments (11, 12) and additive aggregating segments (21), wherein the polyester segment (13) has a number average molecular weight of from 55'000 g/mol to 95'000 g/mol.

6. Composition containing
   a. a functionalized polymer (10) that comprises at least one polyester segment (13) and at least one, in particular at least two, polymer aggregating segment (11, 12) capable of forming non-covalent bonds based on a supramolecular interaction,
   b. an aggregating additive (20) that comprises at least one additive aggregating segment (21) capable of forming non-covalent bonds based on the same supramolecular interaction as the polymer aggregating segment (11, 12), wherein the polymer aggregating segment (11, 12) and the additive aggregating segment (21) are ditopic, wherein the polymer aggregating segment (11, 12) and the additive aggregating segment (21) are designed such that they can form aggregates (31) that contain polymer aggregating segments (11, 12) and additive aggregating segments (21), wherein the polyester segment (13) has a number average molecular weight of from 10'000 g/mol to 500'000 g/mol, and wherein the composition contains a non-functionalized polyester.

7. Composition containing
   a. a functionalized polymer (10) that comprises at least one polyester segment (13) and at least one, in particular at least two, polymer aggregating segment (11, 12) capable of forming non-covalent bonds based on a supramolecular interaction,
   b. an aggregating additive (20) that comprises at least one additive aggregating segment (21) capable of forming non-covalent bonds based on the same supramolecular interaction as the polymer aggregating segment (11, 12), wherein the polymer aggregating segment (11, 12) and the additive aggregating segment (21) are ditopic, wherein the polymer aggregating segment (11, 12) and the additive aggregating segment (21) are designed such that they can form aggregates (31) that contain polymer aggregating segments (11, 12) and additive aggregating segments (21), wherein the polyester segment (13) has a number average molecular weight of from 10'000 g/mol to 500'000 g/mol, and wherein the composition contains a further additive selected from the group consisting of inorganic fillers, organic fillers, pigments, dyes, flame retardants, weathering agents, antioxidants and mixtures thereof.

The invention claimed is:

1. A composition containing:
   a functionalized polymer that comprises at least one polyester segment and at least one polymer aggregating segment capable of forming non-covalent bonds based on a supramolecular interaction,
   an aggregating additive that comprises at least one additive aggregating segment capable of forming non-covalent bonds based on the same supramolecular interaction as the polymer aggregating segment,
   wherein the polymer aggregating segment and the additive aggregating segment are ditopic,
   wherein the polymer aggregating segment and the additive aggregating segment are designed such that they can form aggregates that contain polymer aggregating segments and additive aggregating segments, and
   wherein the polyester segment has a number average molecular weight of from 55,000 g/mol to 500,000 g/mol.

2. The composition according to claim 1, wherein the functionalized polymer comprises two polymer aggregating segments.

3. The composition according to claim 1, wherein the polyester segment has a molecular weight of from 55,000 to 300,000 g/mol.

4. The composition according to claim 1, wherein the functionalized polymer contains 5 or less polyester segment(s).

5. The composition according to claim 1, wherein the polyester segment is an aromatic-aliphatic copolyester, an aliphatic copolyester, an aliphatic polyester, a polylactone, or a polyhydroxyalkanoate.

6. The composition according to claim 1,
   wherein the polyester segment is an aromatic-aliphatic copolyester or an aliphatic polyester; or
   wherein the polyester segment is an aromatic-aliphatic copolyester or an aliphatic polyester that is biodegradable according to DIN EN 13432; or
   wherein the polyester segment is an aliphatic polyester.

7. The composition according to claim 1, wherein the polyester segment is a poly(caprolactone).

8. The composition according to claim 1, wherein the aggregating additive contains exactly one additive aggregating segment.

9. The composition according to claim 1, wherein the aggregating additive has a molecular weight of from 50 g/mol to 2,000 g/mol, and/or wherein the aggregating additive is monodisperse.

10. The composition according to claim 1, wherein the aggregating additive has a melting point that is:
    at least 10° C. higher than the melting point of the polyester segment, if the polyester segment (13) is semicrystalline and/or has a melting point, or
    at least 10° C. higher than the glass transition temperature of the polyester segment, if the polyester segment is amorphous and/or has a glass transition temperature and no melting point.

11. The composition according to claim 1, wherein the supramolecular interaction is hydrogen bonding interaction and/or wherein the additive aggregating segment and the polymer aggregating segment each comprise at least one hydrogen bond donor and at least one hydrogen bond acceptor.

12. The composition according to claim 1, wherein the additive aggregating segment and/or the polymer aggregating segment independently comprise(s) at least one chemical functional group selected from the group consisting of peptide (—C(═O)—NH—), amide (—C(═O)—NH—), urethane (—O—C(═O)—NH—), urea (—NH—C(═O)—NH—), thiopeptide (—C(═S)—NH—), thioamide (—C(═S)—NH—), thiourethane (—O—C(═S)—NH—), thiourea (—NH—C(═S)—NH—), —C(═NH)—NH—, —C(═NH)—NH—, —O—C(═NH)—NH—, and —NH—C(═NH)—NH—.

13. The composition according to claim 1, wherein the composition comprises 20 wt. % or less, based on the total weight of the composition, of the aggregating additive.

14. The composition according to claim 1, wherein the composition contains a non-functionalized polyester.

15. The composition according to claim 14, wherein the non-functionalized polyester is miscible with or identical to the polyester segment or wherein the non-functionalized polyester is selected from the group consisting of poly(ethylene terephthalate) (PET), poly(butylene terephthalate) (PBT), poly(ethylene furanoate) (PEF), poly(butylene furanoate) (PBF), poly(trimethylene terephthalate) (PTT), poly(ethylene naphthalate) (PEN), poly(butylene adipate terephthalate) (PBAT), poly(butylene-sebacate-co-butylene terephthalate) (PBSeT), poly(butylene succinate) (PBS), poly(ethylene succinate) (PES), poly(butylene succinate adipate) (PBSA), poly(butylene succinate-co-butylene terephthalate) (PBST), poly(lactic acid) (PLA), poly(L-lactic acid) (PLLA), poly(D-lactic acid) (PDLA), poly(DL-lactic acid) (PDLLA), poly(glycolic acid) (PGA), poly(caprolactone) (PCL), poly(hydroxybutyrate) (P3HB), poly(hydroxybutyrate-co-hydroxyhexanoate) (PHBH), poly(3-hydroxybutyrate-co-3-hydroxyvalerate) (PHBV), and mixtures and copolymers thereof.

16. A method for the preparation of sheets, films, fibers, or molded parts comprising:
providing the composition according to claim 1 and
forming the sheets, films, fibers, or molded parts applying thermal and/or mechanical energy.

17. The method according to claim 16, wherein the sheets, films, fibers, or molded parts are prepared by the application of shearing and/or stretching forces.

18. The method according to claim 16, wherein the polyester segment is oriented anisotropically during the preparation of the sheets, films, fibers, or molded parts and/or wherein the sheets, films, fibers, or molded parts have a polyester phase comprising the polyester segment, wherein the polyester phase has an orientation factor $<P_2>$ of 0.1 or more.

19. A sheet, film, fiber, or molded part comprising the composition according to claim 1.

20. The sheet, film, fiber, or molded part according to claim 19, wherein the polyester segment is anisotropically oriented and/or wherein the sheet, film, fiber, or molded part has a polyester phase comprising the polyester segment, wherein the polyester phase has an orientation factor $<P_2>$ of 0.1 or more.

21. A sheet comprising the composition according to claim 1, wherein the sheet is prepared by t-die sheet forming and/or subsequent sequential biaxial stretching steps or subsequent thermoforming steps.

22. A film comprising the composition according to claim 1, wherein the film is prepared by film blowing.

23. A fiber comprising the composition according to claim 1, wherein the fiber is prepared by melt spinning.

24. A molded part comprising the composition according to claim 1, wherein the molded part is prepared by injection molding.

* * * * *